US008306638B2

(12) United States Patent
Jung et al.

(10) Patent No.: US 8,306,638 B2
(45) Date of Patent: Nov. 6, 2012

(54) MOTE PRESENTATION AFFECTING

(75) Inventors: Edward K. Y. Jung, Bellevue, WA (US);
Royce A. Levien, Lexington, MA (US);
Robert W. Lord, Seattle, WA (US);
Mark A. Malamud, Seattle, WA (US);
John D. Rinaldo, Jr., Bellevue, WA (US)

(73) Assignee: The Invention Science Fund I, LLC, Bellevue, WA (US)

( * ) Notice: Subject to any disclaimer, the term of this patent is extended or adjusted under 35 U.S.C. 154(b) by 652 days.

(21) Appl. No.: 11/291,534

(22) Filed: Nov. 30, 2005

(65) Prior Publication Data

US 2007/0046498 A1      Mar. 1, 2007

(51) Int. Cl.
*G01V 3/00* (2006.01)
(52) U.S. Cl. ............................ 700/66; 340/524; 702/150
(58) Field of Classification Search .................... 700/65, 700/66, 94, 95, 122, 150, 187; 702/127, 702/150; 340/500, 602, 539.1, 853.1, 870.28, 340/539.13, 524
See application file for complete search history.

(56) References Cited

U.S. PATENT DOCUMENTS

| | | | |
|---|---|---|---|
| 4,595,914 A | 6/1986 | Siegel | |
| 5,052,854 A | 10/1991 | Correa et al. | |
| 5,287,113 A | 2/1994 | Meier | |
| 5,349,330 A | 9/1994 | Diong et al. | |
| 5,415,645 A | 5/1995 | Friend et al. | |
| 5,485,163 A | 1/1996 | Singer et al. | |
| 5,608,412 A * | 3/1997 | Welles et al. | ................. 342/457 |
| 5,650,800 A | 7/1997 | Benson | |
| 5,673,028 A | 9/1997 | Levy | |
| 5,673,039 A | 9/1997 | Pietzsch et al. | |
| 5,721,535 A | 2/1998 | Ikefuji | |
| 5,731,691 A | 3/1998 | Noto | |
| 5,947,637 A | 9/1999 | Neuling | |
| 6,091,959 A | 7/2000 | Souissi et al. | |
| 6,206,610 B1 | 3/2001 | Neuling | |
| 6,208,247 B1 | 3/2001 | Agre et al. | |
| 6,305,874 B1 | 10/2001 | Custers et al. | |
| 6,321,067 B1 | 11/2001 | Suga et al. | |
| 6,485,978 B1 | 11/2002 | Kirckof et al. | |
| 6,559,774 B2 * | 5/2003 | Bergan et al. | ................. 340/908 |
| 6,650,800 B2 | 11/2003 | Litvin | |
| 6,735,630 B1 | 5/2004 | Gelvin et al. | |
| 6,816,862 B2 | 11/2004 | Mulgund et al. | |
| 6,900,740 B2 * | 5/2005 | Bloomquist et al. | .......... 340/905 |

(Continued)

OTHER PUBLICATIONS

U.S. Appl. No. 11/285,767, Jung et al.

(Continued)

*Primary Examiner* — Charles Kasenge

(57) ABSTRACT

One aspect of this disclosure relates to locating at least one position of at least one mote device; and affecting at least one presentation based at least in part on the at least one position of the at least one mote device. Another aspect of this disclosure relates to sensing at least one position of an item at least partially using at least one mote device; and affecting at least one indication of the at least one position at least partially using the at least one mote device based at least in part on the sensing the at least one position of the item. Yet another aspect of this disclosure relates to causing the at least one mobile mote device to displace itself; and affecting at least one presentation with the at least one mobile mote device based at least in part on the causing at least one mobile mote device to displace itself.

33 Claims, 17 Drawing Sheets

U.S. PATENT DOCUMENTS

| | | | |
|---|---|---|---|
| 6,975,229 B2 | 12/2005 | Carrender | |
| 6,989,753 B1 | 1/2006 | Lamming et al. | |
| 7,021,857 B2 | 4/2006 | Van Der Poel | |
| 7,025,525 B2 | 4/2006 | Van Der Poel | |
| 7,030,757 B2* | 4/2006 | Matsuhira et al. | 340/541 |
| 7,030,777 B1* | 4/2006 | Nelson et al. | 340/933 |
| 7,039,421 B2 | 5/2006 | Couronne et al. | |
| 7,051,115 B2 | 5/2006 | Chen et al. | |
| 7,075,455 B2* | 7/2006 | Nishimura et al. | 340/602 |
| 7,109,875 B2 | 9/2006 | Ota et al. | |
| 7,136,782 B1* | 11/2006 | Araki et al. | 702/188 |
| 7,147,400 B2 | 12/2006 | Van Der Poel | |
| 7,177,643 B2 | 2/2007 | Howard | |
| 7,271,736 B2* | 9/2007 | Siegel et al. | 340/902 |
| 7,276,703 B2 | 10/2007 | Berkcan et al. | |
| 7,313,405 B2 | 12/2007 | Tanabe | |
| 7,378,962 B2* | 5/2008 | Odenwald et al. | 340/539.22 |
| 7,400,594 B2* | 7/2008 | Pereira et al. | 707/104.1 |
| 7,406,399 B2 | 7/2008 | Furem et al. | |
| 7,429,936 B2* | 9/2008 | Paradiso et al. | 340/539.13 |
| 7,446,801 B2* | 11/2008 | Iizuka | 348/211.4 |
| 7,516,848 B1* | 4/2009 | Shakes et al. | 209/34 |
| 7,526,944 B2* | 5/2009 | Sabata et al. | 73/49.1 |
| 7,593,690 B2 | 9/2009 | Song et al. | |
| 7,750,803 B2* | 7/2010 | Matsuhira et al. | 340/541 |
| 2002/0040639 A1 | 4/2002 | Duddleson et al. | |
| 2002/0138602 A1 | 9/2002 | Vinberg | |
| 2003/0012168 A1 | 1/2003 | Elson et al. | |
| 2003/0016834 A1 | 1/2003 | Blanco et al. | |
| 2003/0164763 A1 | 9/2003 | Hisano et al. | |
| 2003/0172221 A1 | 9/2003 | McNeil | |
| 2003/0236856 A1 | 12/2003 | Bird et al. | |
| 2003/0236866 A1* | 12/2003 | Light | 709/220 |
| 2004/0002798 A1 | 1/2004 | Simons et al. | |
| 2004/0005889 A1* | 1/2004 | Nishimura et al. | 455/423 |
| 2004/0029558 A1* | 2/2004 | Liu | 455/404.2 |
| 2004/0082341 A1* | 4/2004 | Stanforth | 455/456.1 |
| 2004/0113777 A1* | 6/2004 | Matsuhira et al. | 340/541 |
| 2004/0128097 A1* | 7/2004 | LaMarca et al. | 702/104 |
| 2004/0139110 A1* | 7/2004 | LaMarca et al. | 707/104.1 |
| 2004/0215750 A1 | 10/2004 | Stilp | |
| 2005/0062603 A1 | 3/2005 | Fuerst et al. | |
| 2005/0104973 A1* | 5/2005 | Iizuka | 348/211.1 |
| 2005/0122231 A1* | 6/2005 | Varaiya et al. | 340/870.01 |
| 2005/0204438 A1* | 9/2005 | Wang et al. | 455/67.7 |
| 2005/0210340 A1 | 9/2005 | Townsend et al. | |
| 2005/0222933 A1 | 10/2005 | Wesby | |
| 2005/0275532 A1 | 12/2005 | Ferri et al. | |
| 2005/0285740 A1* | 12/2005 | Kubach et al. | 340/572.1 |
| 2006/0046664 A1* | 3/2006 | Paradiso et al. | 455/96 |
| 2006/0049940 A1* | 3/2006 | Matsuhira et al. | 340/541 |
| 2006/0062154 A1 | 3/2006 | Choy et al. | |
| 2006/0109084 A1* | 5/2006 | Yarvis | 340/10.1 |
| 2006/0126501 A1 | 6/2006 | Ramaswamy | |
| 2006/0176169 A1* | 8/2006 | Doolin et al. | 340/521 |
| 2006/0206235 A1 | 9/2006 | Shakes et al. | |
| 2006/0247844 A1* | 11/2006 | Wang et al. | 701/117 |
| 2007/0042716 A1* | 2/2007 | Goodall et al. | 455/67.11 |
| 2007/0046497 A1* | 3/2007 | Jung et al. | 340/853.1 |
| 2007/0052543 A1* | 3/2007 | Albarado | 340/679 |
| 2007/0058634 A1* | 3/2007 | Gupta et al. | 370/392 |
| 2007/0111735 A1* | 5/2007 | Srinivasan et al. | 455/456.1 |
| 2007/0182362 A1 | 8/2007 | Trainor et al. | |
| 2008/0123581 A1 | 5/2008 | Wells et al. | |
| 2008/0174410 A1 | 7/2008 | Sarangapani et al. | |
| 2009/0168305 A1 | 7/2009 | Fleig et al. | |

OTHER PUBLICATIONS

Berkely Webs: Wireless Embedded Systems, "Building Sensor Networks with TinyOS" May 5, 2003 Mobisys Tutorial, San Francisco Powerpoint Presentation, Culler, David; Levis, Phil; Szewczyk, Rob; Polastre, Joe; pp. 1-41 located at http://webs.cs.berkeley.edu, printed on Apr. 15, 2004.

Berkeley Webs: Wireless Embedded Systems, "Publications", p. 1-3, located at http://webs.cs.berkeley.edu/publications.html, printed on Apr. 12, 2004.

Buonadonna, Phillip; Hill, Jason; Culler, David; "Active Message Communication for Tiny Networked Sensors," pp. 1-11, printed on Mar. 8, 2004.

Center for the Built Environment, "XYZ on a Chip: Integrated Wireless Sensor Networks for the Control of the Indoor Environment in Buildings" pp. 1-2, located at http://www.cbe.berkeley.edu/research/briefs-wirelessxyz.htm, bearing a date of 2002, printed on Jan. 27, 2004.

Citris, "Brainy Buildings Conserve Energy" p. 1-3 located at http://www.citris.berkeley.edu/applications/energy/smartbuildings.html, printed on Jan. 27, 2004.

Citris, "The Real World as One Giant Database" pp. 1-3 located at http://www.citris.berkeley.edu/newsletter/2003_Newsletters/december_2003/feature.htm, bearing a date of 2003, printed on Apr. 9, 2004.

Gay, David; Levis, Phil; Von Behren, Robert; Welsh, Matt; Brewer, Eric; and Culler, David, "The nesCLanguage: A Holistic Approach to Network Embedded Systems," pp. 1-10; Intel Research Berkeley, The Intel Corporation, Nov. 2002.

Gelsinger, Pat; Intel.com, "Expanding Moore's Law with Convergance" pp. 1-4 located at http://www.intel.com/labs/features/em101031.htm, printed on Apr. 9, 2004.

Gibson, William; "U2's City of Blinding Lights"; Wired Magazine 13.08; pp. 1-7; located at http://wired-vig.wired.com/wired/archive/13.08/u2_pr.html; The CondéNast Publications Inc. and Lycos, Inc.; bearing copyright dates of 1993-2005 and 2005, printed on Nov. 29, 2005.

Grabowski, Bob; Navarro-Serment, Luis; Bererton, Curt; "Localization—Millibots"; Carnegie Mellon University; located at http://www.contrib.andrew.cmu.edu/~rjg/millibots/millibot_localization.html.

Hill, Jason; Szewczyk, Robert; Woo, Alec; Hollar, Seth; Culler, David; Pister, Kristofer, "System Architecture Directions for Networked Sensors," ASPLOS 2000, Cambridge, Nov. 2000.

INTEL.COM, "Exploratory Research Deep Networking" pp. 1-10 located at http://www.intel.com/research/exploratory/heterogenerous.htm, printed on Mar. 25, 2004.

INTEL.COM; "Intel Research Seattle Handheld RFID Reader and Glove"; pp. 1-4; located at http://seattleweb.intel-research.net/projects/guide/projects/iglove/RFIDglove.htm; printed on Aug. 18, 2005.

ISIS NEST: Institute for Software Integrated Systems; "People: The NEST Group", pp. 1 of 1, located at http://www.isis.vanderbilt.edu/projects.nest/people.html, printed on Apr. 14, 2004.

Jenkins, Chad; "Actuated Sensor Networks"; Brown Computer Science WiCS Lunch; Nov. 3, 2004; Brown University; located at www.cs.brown.edu/~cjenkins/tmp/actuated_sensornets.pdf.

Jiang, Xiaofan; Polastre, Joseph; Culler, David; "Perpetual Environmentally Powered Sensor Networks"; pp. 1-6; University of California, Berekely Computer Science Department, Berkeley, CA 94720.

Johnson, R. Colin, "Companies test prototype wireless-sensor nets" EE Times, pp. 1-3, printable version of article located at http://www.eet.com/article/showArticle.jhtml?articleID=9900910, bearing a date of Jan. 29, 2003, printed on Jan. 27, 2004.

Kahn, Kevin C.; Culler, David E.; "Ad Hoc Sensor Networks a New Frontier for Computing Applications" bearing a date of Apr. 2002, printed on Apr. 9, 2004.

Kling, Ralph, "Intel® Research Mote" pp. 1-13, Powerpoint Presentation, located at http://webs.cs.berkeley.edu/retreat-1-03/slides/imote-nest-q103-03-dist.pdf , Intel Corporation Research, Santa Clara, CA, printed on Apr. 13, 2004.

Levis, Philip; Culler, David; "Maté: A Tiny Virtual Machine for Sensor Networks", pp. 1-11, printed on Apr. 12, 2004.

Levis, Philip; Madden, Sam; Gay, David; Polastre, Joseph; Szewczyk, Robert; Woo, Alec; Brewer, Eric; Culler, David; "The Emergence of Networking Abstractions and Techniques in TinyOS" pp. 1-14, printed on Apr. 13, 2004.

Levis, Philip; Patel, Neil; Culler, David; Shenker, Scott; "Trickle: A Self-Regulating Algorithm for Code Propagation and Maintenance in Wireless Sensor Networks", printed on Apr. 13, 2004.

Levis, Philip, "Viral Code Propagation in Wireless Sensor Networks," EECS Department, University of California at Berkeley, printed on Mar. 8, 2004.

Liscano, Ramiro, "Service Discovery in Sensor Networks: An Overview" Powerpoint Presentation; pp. 1-51; School of Information Technology and Engineering, University of Ottawa, Ottawa, Canada, bearing a date of 2003, printed on Mar. 8, 2004.

"Localization Distributed Embedded Systems" UCLA Computer Science 213: Localization Systems Powerpoint Presentation, pp. 1-61, bearing a course name of: CS 213/Estrin/Winter 2003, bearing a speaker name of: Lewis Girod, bearing a date of Feb. 4, 2003, printed on Mar. 15, 2004.

Lorincz, Konrad; Welsh, Matt; "MoteTrack: A Robust, Decentralized Approach to RF-Based Location Tracking"; Harvard University Division of Engineering and Applied Sciences, Cambridge, MA, USA.

Madden, Samuel, "Acquisitional Query Processing in TinyDB" Powerpoint Presentation, pp. 1-51; NEST Winter Retreat 2003, printed on Mar. 8, 2004.

Madden, Samuel, "Challenges in Sensor Network Query Processing" Powerpoint Presentation at the Jan. 15, 2002 NEST Retreat, printed on Mar. 8, 2004.

Madden, Samuel; Szewczyk, R.; Franklin, Michael; and Culler, David "Supporting Aggregate Queries Over Ad-Hoc Wireless Sensor Networks," pp. 1-10, printed on Mar. 8, 2004.

Madden, Samuel; Szewczyk, R.; Franklin, Michael; Culler, David "Supporting Aggregate Queries Over Ad-Hoc Wireless Sensor Networks" Powerpoint Presentation, pp. 1-47, $4^{th}$ IEEE Workshop on Mobile Computing, dated Jun. 21, 2002.

Madden, Samuel; Franklin, Michael J.; Hellerstein, Joseph; M., and Hong, Wei, "The Design of an Acquisitional Query Processor for Sensor Networks," pp. 1-14, SIGMOD, Jun. 2003.

Marks, Paul; "Living Camera Uses Bacteria to Capture Image"; NewScientist.com; pp. 1-2; located at http://www.newscientist.com/article.ns?id=dn8365&print=true; bearing a date of Nov. 23, 2005, printed on Nov. 29, 2005.

Niculescu, Dragos; Nath, Badri; "Ad Hoc Positioning System (APS) Using AOA"; DATAMAN Lab Rutgers University; IEEE INFOCOM 2003.

Raghunathan, Vijay; Kansal, Aman; Hsu, Jason; Friedman, Jonathan; Srivastava, Mani; "Design Considerations for Solar Energy Harvesting Wireless Embedded Systems"; pp. 1-6; Networked and Embedded Systems Lab (NESL), Department of Electrical Engineering, University of California, Los Angeles, CA 90095.

Raghunathan, Vijay; Schurgers, Curt; Park, Sung; Srivastava, Mani B.; "Energy Aware Wireless Sensor Networks" pp. 1-17; Department of Electrical Engineering, University of California, Los Angeles; printed on Mar. 15, 2004.

Roundy, Shad; Steingart, Dan; Frechette, Luc; Wright, Paul; Rabaey, Jan; "Power Sources for Wireless Sensor Networks"; pp. 1-24.

Ryer, Alex; Light Measurement Handbook, http://www.intl-light.com/handbook; pp. 1-64, copyright 1997, printed on Mar. 8, 2004.

SEARCHNETWORKING.COM Definitions, "Jini" pp. 1-3 located at http://searchnetworking.techtarget.com/sDefinition/0,,sid7_gci212422,00.html, bearing a date of Apr. 10, 2003, printed on Mar. 8, 2004.

Service, Robert F.; "Materials and Biology: Nanotechnology Takes Aim At Cancer"; Science; pp. 1132-1134; vol. 310; AAAS; located at www.sciencemag.org; bearing a date of Nov. 18, 2005.

Spyropoulos, Akis; Raghavendra, C.S., "Energy Efficient Communications in Ad Hoc Networks Using Directional Antennas," Dept. of Electrical Engineering-Systems, University of Southern California, bearing a date of 2002, printed on Feb. 23, 2004.

Steingart, Dan; "Micro Power Systems Overview"; pp. 1-24; located at www.cs.berkeley.edu/~binetude/NEST/feb6.ppt.

Viswanath, Kumar, "Adaptive, Integrated Multicast Routing for Group Communications in Ad-Hoc Networks" Powerpoint Presentation, pp. 1-12; Computer Engineering Department, University of California, Santa Cruz, printed on Mar. 8, 2004.

Whitehouse, Kamin; Jiang, Xiaofan; "Calamari: a sensor field localization system"; University of California at Berkeley; located at www.cs.berkeley.edu/~kamin/calamari/.

Woo, Alec; Tong, Terence; and Culler, David, "Taming the Underlying Challenges of Reliable Multihop Routing in Sensor Networks,"pp. 1-14, SenSys '03, Nov. 5-7, 2003, Los Angeles, California, USA.

Zapisek, John; "Energy-Efficient Methods for Wireless Sensor Networks"; pp. 1-17; located at http://www.ics.uci.edu/~jzap/243e/proj/jzapisek_final.html; bearing a date of Spring 2004; printed on Aug. 18, 2005.

Zhao, Feng; Guibas, Leonidas J.; *Wireless Sensor Networks: An Information Processing Approach*. San Francisco: Morgan Kaufmann Publishers-Elsevier Inc., bearing a copyright date of 2004.

Ahamed, Sheikh I.; Vyas, Avinash; Zulkernine, Mohammad; "Towards Developing Sensor Networks Monitoring as a Middleware Service"; 2004 International Conference on Parallel Processing Workshops; Aug. 2004; pp. 1-7; ICCPP 2004 Workshops.

Hsin, Chih-Fan; "A Distributed Monitoring Mechanism for Wireless Sensor Networks"; $1^{st}$ ACM workshop in Wireless Security; Proceedings; Sep. 2002; pp. 1-39.

Minhas, Abid Ali; Steger, Christian; Wei, Reinhold; Ehsan, Sarwar; "Node Failure Detection and Path Repairing Scheme in Virtual Circuit Routing Algorithm for Wireless ad hoc Micro Sensor Networks"; IEEE International Conference on Emerging Technologies, Sep. 2005; pp. 86-91.

Turon, Martin; "MOTE-VIEW: A Sensor Network Monitoring and Management Tool"; Embedded Networked Sensors; May 2005; pp. 11-17; EmNetS-II. Proceedings.

Zou, Yi; Chakrabarty, Krishnendu; "Fault-tolerant Self-organization in Sensor Networks"; Lecture Notes in Computer Science; Jul. 29, 2005; pp. 191-205; Springer-Berlin/Heidelberg.

Turon, Martin; "MOTE-VIEW: A Sensor Network Monitoring and Management Tool"; EmNetS-II Proceedings; 2005; pp. 11-17; IEEE.

* cited by examiner

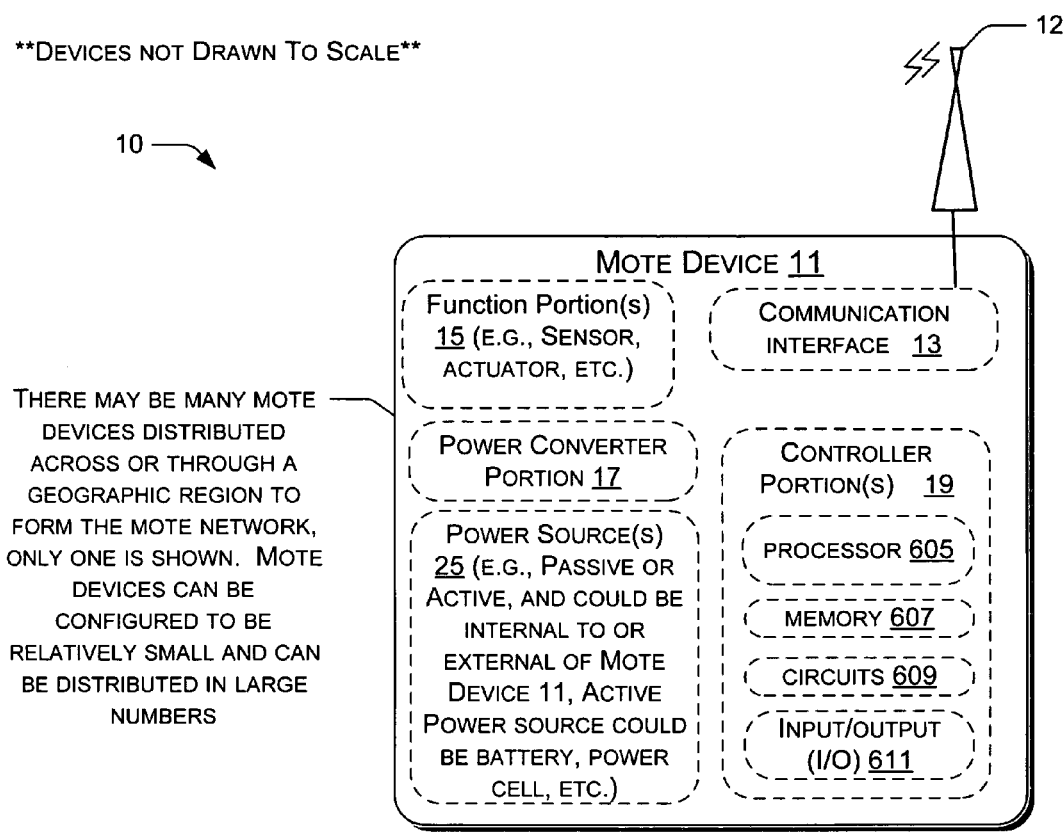
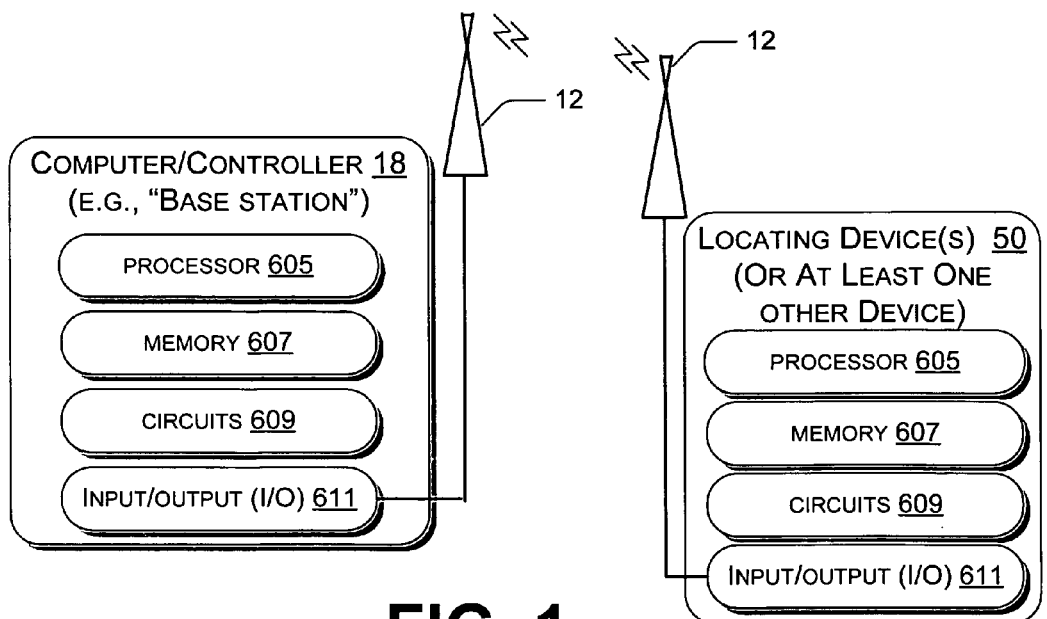
FIG. 1

FIG. 12a locating at least one position of at least one mote device 2002

- locating the position of the at least one mote device with respect to at least one other device 2020
- locating the at least one position of the at least one mote device with respect to at least one other device 2022
- locating the at least one position of the at least one mote device with respect to at least one other computer / controller device 2024
- locating the at least one position of the at least one mote device with respect to at least one other locating device 2026
- locating the at least one position of the at least one mote device with respect to at least one absolute spatial location 2028
- locating the at least one position of the at least one mote device with respect to at least one structure 2030
- locating the at least one position of the at least one mote device with respect to at least one landmark 2032
- locating an at least one absolute position of the at least one mote device 2034
- locating an at least one relative position of the at least one mote device 2036

2000

A

Key To FIG. 12

| 12a |
| 12b |
| 12c |

FIG. 12b affecting at least one presentation based at least in part on the at least one position of the at least one mote device 2004

- affecting the at least one presentation to a person based at least in part on the at least one position of the at least one mote device 2050
- affecting the at least one presentation to an organism based at least in part on the at least one position of the at least one mote device 2052
- affecting the at least one presentation to an inanimate object based at least in part on the at least one position of the at least one mote device 2054
- producing a pattern using multiple ones of the at least one mote device 2056
- producing a temporally variable pattern using multiple ones of the at least one mote device 2060
- sequencing multiple ones of the at least one mote device 2062

| 12a |
|-----|
| 12b |
| 12c |

Key To FIG. 12

2000

```
| 12a |
| 12b | Key To FIG. 12
| 12c |
```

(B)

⟵ 2000 wherein the at least one mote device includes a plurality of mote devices that have non-uniform distribution  2006 wherein the at least one mote device includes a plurality of mote devices that have non-uniform operative capabilities  2008 wherein the at least one mote device can determine their location with respect to a type of enumerated property or feature  2012 wherein the at least one mote device can determine their location with respect to a type of enumerated property or feature, wherein the at least one mote device is informed about the type of enumerated property or feature  2014 wherein the at least one mote device can determine their location with respect to a type of enumerated property or feature, wherein the at least one mote device determines the type of enumerated property or feature  2016

MOTE PRESENTATION AFFECTING

CROSS-REFERENCE TO RELATED APPLICATIONS

The present application is related to, claims the earliest available effective filing date(s) from (e.g., claims earliest available priority dates for other than provisional patent applications; claims benefits under 35 USC §119(e) for provisional patent applications), and incorporates by reference in its entirety all subject matter of the following listed application(s) (the "Related Applications") to the extent such subject matter is not inconsistent herewith; the present application also claims the earliest available effective filing date(s) from, and also incorporates by reference in its entirety all subject matter of any and all parent, grandparent, great-grandparent, etc. applications of the Related Application(s) to the extent such subject matter is not inconsistent herewith. The United States Patent Office (USPTO) has published a notice to the effect that the USPTO's computer programs require that patent applicants reference both a serial number and indicate whether an application is a continuation or continuation in part. (see CITATION). The present applicant entity has provided below a specific reference to the application(s) from which priority is being claimed as recited by statute. Applicant entity understands that the statute is unambiguous in its specific reference language and does not require either a serial number or any characterization such as "continuation" or "continuation-in-part." Notwithstanding the foregoing, applicant entity understands that the USPTO's computer programs have certain data entry requirements, and hence applicant entity is designating the present application as a continuation in part of its parent applications, but expressly points out that such designations are not to be construed in any way as any type of commentary and/or admission as to whether or not the present application contains any new matter in addition to the matter of its parent application(s).

1. U.S. patent application Ser. No. 11/213,315, entitled "STIMULATING A MOTE NETWORK FOR CUES TO MOTE LOCATION AND LAYOUT", naming Alexander J. Cohen; Edward K. Y. Jung; Royce A. Levien; Robert W. Lord; Mark A. Malamud and John D. Rinaldo, Jr. as inventors, filed 26 Aug. 2005.
2. U.S. patent application Ser. No. 11/245,492, entitled "MAINTAINING OR IDENTIFYING MOTE DEVICES", naming Edward K. Y. Jung; Royce A. Levien; Robert W. Lord; Mark A. Malamud and John D. Rinaldo, Jr. as inventors, filed 6 Oct. 2005.
3. U.S. patent application Ser. No. 11/254,231, entitled "MOTE SERVICING", naming Edward K. Y. Jung; Royce A. Levien; Robert W. Lord; Mark A. Malamud and John D. Rinaldo, Jr. as inventors, filed 19 Oct. 2005.
4. U.S. patent application Ser. No. 11/262,553, entitled "MOTE ENERGY SIGNAL ASPECTS", naming Edward K. Y. Jung; Royce A. Levien; Robert W. Lord; Mark A. Malamud and John D. Rinaldo, Jr. as inventors, filed 27 Oct. 2005.
5. United States patent application Not Yet Assigned, entitled "Mote Device Locating Using Impulse-Mote-Position-Indication", naming Edward K. Y. Jung; Royce A. Levien; Robert W. Lord; Mark A. Malamud and John D. Rinaldo, Jr. as inventors, filed 22 Nov. 2005.

TECHNICAL FIELD

Certain aspects of the present application relate, in general, to presentation affecting by mote device(s) based at least in part on locating the mote device(s). Certain embodiments of the locating of the mote device(s) can be performed with respect to some geographic location, address, some structure, some other device from the mote device(s), or any other desirable, identifiable, and/or suitable location.

In certain aspects, a method can include, but is not limited to, locating at least one position of at least one mote device; and affecting at least one presentation based at least in part on the at least one position of the at least one mote device. In addition to the foregoing, other method aspects are described in the claims, drawings, and text forming a part of the present application.

In certain aspects, a method can include, but is not limited to, determining at least one position of an item at least partially using at least one mote device; and affecting at least one presentation of the at least one position at least partially using the at least one mote device based at least in part on the determining the at least one position of the item. In addition to the foregoing, other method aspects are described in the claims, drawings, and text forming a part of the present application.

In certain aspects, a method can include, but is not limited to, causing at least one mobile mote device to displace itself; and affecting at least one presentation with the at least one mobile mote device based at least in part on the causing the at least one mobile mote device to displace itself. In addition to the foregoing, other method aspects are described in the claims, drawings, and text forming a part of the present application.

In certain aspects, an apparatus can include, but is not limited to, locating portion operable to locate at least one position of at least one mote device; and presentation affecting portion operable to affect at least one presentation based at least in part on the locating portion operable to locate the at least one position of the at least one mote device. In addition to the foregoing, other apparatus aspects are described in the claims, drawings, and text forming a part of the present application.

In certain aspects, an apparatus can include, but is not limited to, locating portion configurable to determine at least one position of an item at least partially using at least one mote device; and presentation affecting portion configurable to affect at least one presentation of the at least one position at least partially in response to the locating portion configurable to determine the at least one position of the item at least partially using the at least one mote device. In addition to the foregoing, other apparatus aspects are described in the claims, drawings, and text forming a part of the present application.

In certain aspects, an apparatus can include, but is not limited to a movable mote device configurable to displace itself; and the movable mote device configurable to affect at least one presentation based at least in part on the movable mote device configurable to displace itself. In addition to the foregoing, other apparatus aspects are described in the claims, drawings, and text forming a part of the present application.

In certain aspects, an apparatus can include, but is not limited to, locating means for locating at least one position of at least one mote device; and presentation affecting means for affecting at least one presentation based at least in part on the locating means for locating the at least one position of the at least one mote device. In addition to the foregoing, other apparatus aspects are described in the claims, drawings, and text forming a part of the present application.

In certain aspects, an apparatus can include, but is not limited to, locating means for determining at least one position of an item at least partially using at least one mote device; and presentation affecting means for affecting at least one presentation of the at least one position at least partially in response to the locating means for determining the at least one position of the item at least partially using the at least one mote device. In addition to the foregoing, other apparatus aspects are described in the claims, drawings, and text forming a part of the present application.

In one or more various aspects, related apparatus and systems include but are not limited to circuitry and/or programming for affecting the herein-referenced method aspects; the circuitry and/or programming can be virtually any combination of hardware, software, electromechanical system, and/or firmware configured to effect the herein-referenced method aspects depending upon the design choices of the system designer.

In addition to the foregoing, various other method and/or system aspects are set forth and described in the text (e.g., claims and/or detailed description) and/or drawings of the present application.

The foregoing contains, by necessity, simplifications, generalizations and omissions of detail; consequently, those skilled in the art will appreciate that the foregoing is illustrative only and not intended to be in any way limiting. Other aspects, features, and advantages of the devices and/or processes and/or other subject matter described herein should become apparent in the text set forth herein.

BRIEF DESCRIPTION OF THE FIGURES

FIG. 1 shows a block diagram of one embodiment of a mote network including at least one mote device;

FIG. 12, that includes FIGS. 12a, 12b, and 12c is a flow diagram of one embodiment of a mote locating technique;

DETAILED DESCRIPTION

Figure 2:
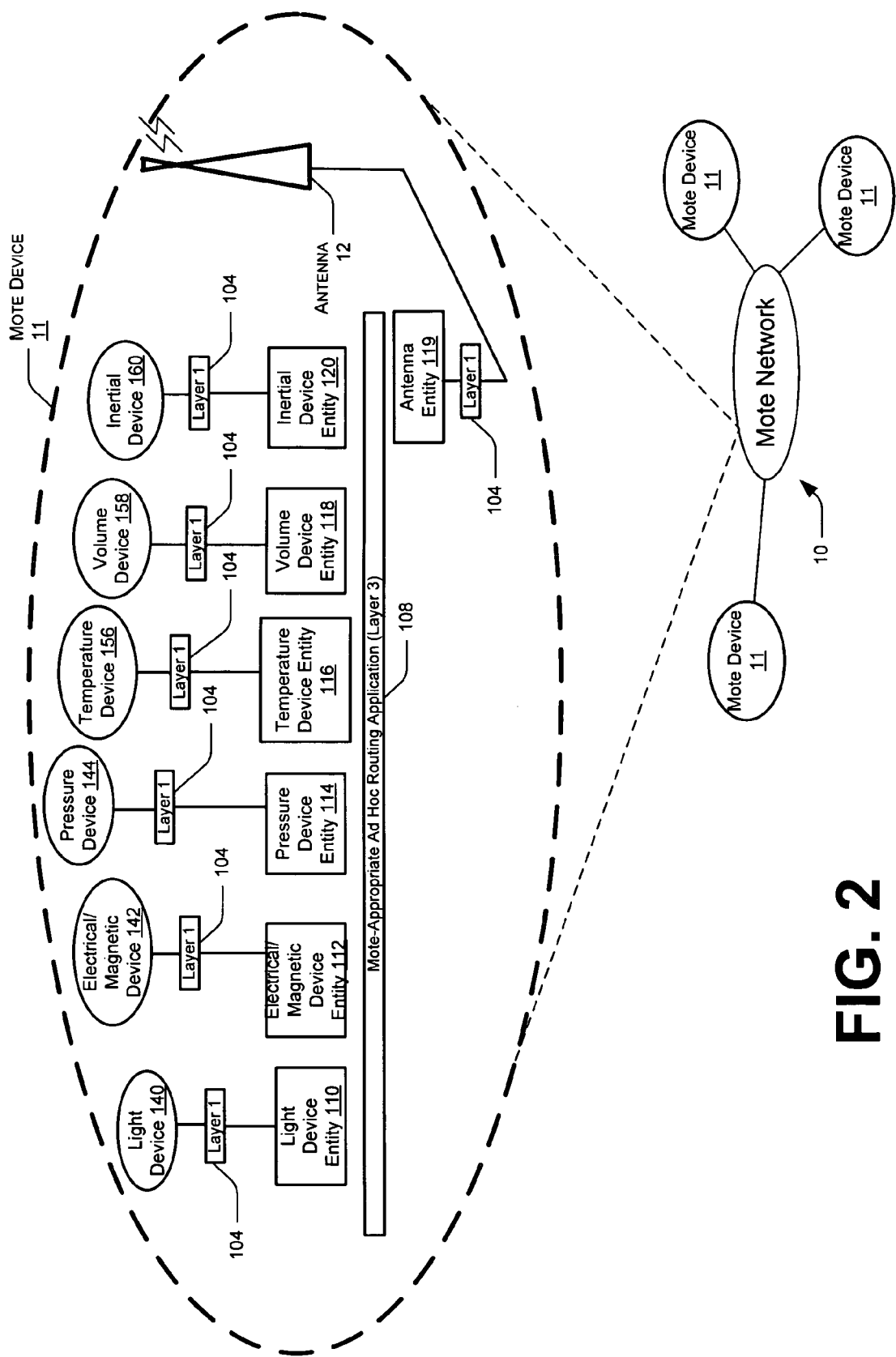
FIG. 2 shows a block diagram of one embodiment of the mote device.

I. Examples of Mote Devices and/or Technique(s)

As used in this disclosure, the term "mote device" (or simply "motes") applies to devices that typically can perform semi-autonomous parameter sensing applications, as described in the mote literature (e.g., Intel Corporation's mote literature), as well as equivalent devices recognized by those having skill in the art (e.g., Intel Corporation's smart dust projects). Certain embodiments of mote devices can also perform other operations, such as, but not limited to: actuating other devices (possibly including other mote devices), controlling or serving as display elements, etc. The present disclosure pertains in general to energy and/or power conversion considerations for mote device(s).

Certain aspects of this disclosure involve affecting a presenting with the mote device(s) based at least in part on locating (or determining a location of) the mote device(s), or alternatively to another object or feature, such as a device, an organism, or an individual, with respect to the mote device, or alternately the other object with respect to the mote device(s). Certain embodiments of the affecting the presentation by a mote device can include, but are not limited to: guiding, directing, contracting, affecting, repulsing, redirecting, and/or blocking the presentation of the mote device(s). Certain embodiments of the affecting the presentation (by the mote device(s)) include, but not limited to, generating light, sound, voice, and/or other electromagnetic radiation that can be detected by the person, organisms, or inanimate objects. In many embodiments as described in this disclosure, the mote device(s) that are affecting the presentation can be stationary with respect to certain supporting background or member. In certain embodiments as described in this disclosure, the mote device(s) that are affecting the presentation can move with respect to the supporting background or member.

In this disclosure, the term "organism" can include, but is not limited to: living organisms, animals, humans, viruses, mote devices(s), bacteria, computers or controllers (including hardware, firmware, and/or software), insects, robots, etc. When the location or position of mote devices (or other object with respect to the mote device) can be determined with sufficient accuracy, then the location of those mote device(s) that are contained in one mote network can be utilized in a variety of mote network computations. For example, if a particular mote network senses a parameter (e.g., temperature), then the position information derived by the different mote device(s) within that particular mote network could, for example, derive a temperature gradient across the mote network. If certain embodiments of the mote device(s) are being used to actuate a device (such as a display element within a display, or other device), then the location of the mote device or display elements within the mote network become important to determine the intensity, and/or color, etc. to apply to each display element. As such, it should be evident that a variety of mote device(s)/mote network(s) can be used to derive a variety of positional information using a variety of operations and/or techniques. Certain embodiments of the positional or locational information can be provided relative to a template (not shown). It would be possible to signal a component of the template that can be utilized by the mote device (or another device) that indicates the mote device(s) position with respect to the template.

Certain embodiments of mote device(s) can be configured to sense one or more parameter(s) including, but not limited to: temperature, pressure, position (e.g., by using Global Positioning System (GPS), RADAR, LORAN, and/or other position-determining equipment), reception of light or other electromagnetic radiation, etc. A variety of motes are commercially available from different companies including, for example, Crossbow Technology, Inc.

Certain embodiments of this disclosure relate to the mote device(s) affecting at least one presentation based at least in part on the at least one position of the at least one mote device. Within this disclosure, in some instances the term "affecting a presentation" is intended to apply to directing, guiding, or attracting an organism (e.g., a person, an animal, an insect) or an object (a vehicle, a robot, a processor-based device, etc.) in some direction unless context dictates otherwise. As such, affecting a presentation for a person (e.g., the mote device(s) emitting light of the desired pattern that can be detected by a person) may utilize a different mechanism than affecting a presentation for the robot or processor-based device (e.g., the mote device(s) emitting a signal that can be detected by the robot or processor-based devices). Affecting a presentation can thereby be utilized to guide a person, a robot, an animal, an insect, a vehicle, or any similar mobile object or mechanism.

Certain embodiments of mote device(s) can be configured to be able to sense a variety of parameters. Additionally, certain embodiments of mote device(s) can be configured to actuate a device, control or serve as a display element, and/or transmit a signal. As such, certain embodiments of mote devices can both be configured to transmit a signal or field and sense a return (either a return-responded signal are a reflected-responded signal) indication to that signal or field.

Certain embodiments of the mote device(s) can also be configured to actuate a variety of other devices such as (but not limited to): turning off one or more: light emitting diode(s), liquid crystal display element(s), plasma display element(s), or other display element(s); controlling or serving as a piece of machinery or equipment, etc.; operating a device that is associated with the mote device(s) such as a camera, one or more display elements, a sensor, etc. Certain embodiments of the mote device(s) can be configured to at least partially control or serve as at least one display element including a number of controllable light elements (e.g., pixels). Certain embodiments of mote networks can be adaptable such as by having their mote device(s) being configured to perform different or varied operations (such as by having the mote device(s) or other devices within the mote network being operationally modified, re-programmed, functionally altered, etc.).

Certain embodiments of mote device(s) can be configured to perform multiple operations simultaneously. For example, one mote device can be configured to sense temperature and pressure, in addition to being able to actuate an imaging device (e.g., a camera), and/or being able to display. Certain embodiments of mote device(s) can be configured using hardware, software, firmware, mechanical, electromechanical, and/or other techniques. Certain embodiments of mote device(s) can also be configured to act as a controller for, or serving as, a variety of devices as described in this disclosure.

Energy and/or power represent an important aspect for many embodiments of mote device(s). Within this disclosure, the terms "energy", "power", and/or "energy or power" may be considered as describing that entity that is used by the mote device(s) to perform some intended action, activity, operation computation, actuation, motion, etc, unless otherwise indicated by the context. This disclosure is intended to pertain to mote networks utilizing active mote device(s) and/or passive mote device(s). Within this disclosure, the term "conversion" can apply to converting energy and/or power from one form into another form that can be used by the mote device(s), unless otherwise indicated by the context.

Certain embodiments of a mote network 10 can include a number of mote device(s) 11, as described, with respect to FIG. 1, and at other locations throughout this disclosure and the associated figures. Certain embodiments of the mote device(s) 11, as described operationally with respect to FIG. 1, can be configured as an analog based or digital based processor-driven device that can perform a variety of operations. There may be an advantage to fabricate the device(s) 11 to be relatively small, light, unobstrusive, etc. depending upon their particular application. The operations that can be performed by the mote device(s) 11 can include (but are not limited to): sensing a variety of parameters, actuating at least a part of one or more device(s), and/or controlling or serving as at least a part of the display element. Certain embodiments of the mote network 10 can integrate interrelated functions and/or operations of up to hundreds, or thousands, of mote devices 11 within and out of the mote network 10. Within this disclosure, the mote devices, locating devices, computer/controllers or base stations, and/or other devices, etc. are not necessarily drawn to scale, and may contain components that are illustrative in nature and not limiting in scope. As such, considering the number of mote device(s) 11 that may be included within certain embodiments of mote networks, it would be desirable to greatly simplify locating of many embodiments of mote device(s) (such as would be desired for maintaining or locating the mote device(s), or considering the level of the power or energy in the mote device(s) 11).

Certain embodiments of the mote device(s) 11 can be fabricated to be relatively small (often a fraction of an inch). Certain embodiments of mote device(s) 11 can also be relatively inexpensive to fabricate or produce. Based on these aspects, it is envisioned that certain mote networks may be configured with a large number of mote device(s) that can transmit data therebetween. Certain embodiments of the mote device(s) can also be designed to effectively operate within relatively isolated, harsh, and/or external environments.

Certain passive or active embodiments of the mote device(s) 11 as described in this disclosure can rely on the application of an outside energy to perform some activity. It may be desirable to obtain sensing of one or more parameters for at least one passive mote device(s) at a particular instant. A signal containing sufficient energy could be applied to the at least one mote device(s) at a particular instant, and the passive embodiments of mote device(s) could sense the parameters and/or return the values for the sensed parameters to another device utilizing the outside energy of the signal. As such, each mote device(s) that is desired to be controlled can be actuated at a particular desired time(s) based upon an application of the signal to those desired mote device(s).

Energy or power aspects concerning the operation(s) performed by the mote device(s) (e.g., sensing, actuating, displaying, etc.) should be considered. While many embodiments of mote device(s) 11 do consume relatively little energy or power compared with more conventional computer-based and/or controller-based systems, there often can be a large number of mote devices in a mote network, and the large number of mote devices can consume considerable energy or power. It may also be difficult to provide power to the mote device(s) as a result of the location, isolation, or other factor of the mote device. As such, a considerable number of the maintenance or locating aspects for mote device(s) concern power and/or energy considerations. Many embodiments of mote device(s) can be configured to consume relatively little power and/or energy since providing the power and/or energy to the mote device(s) can be challenging.

Figure 3:
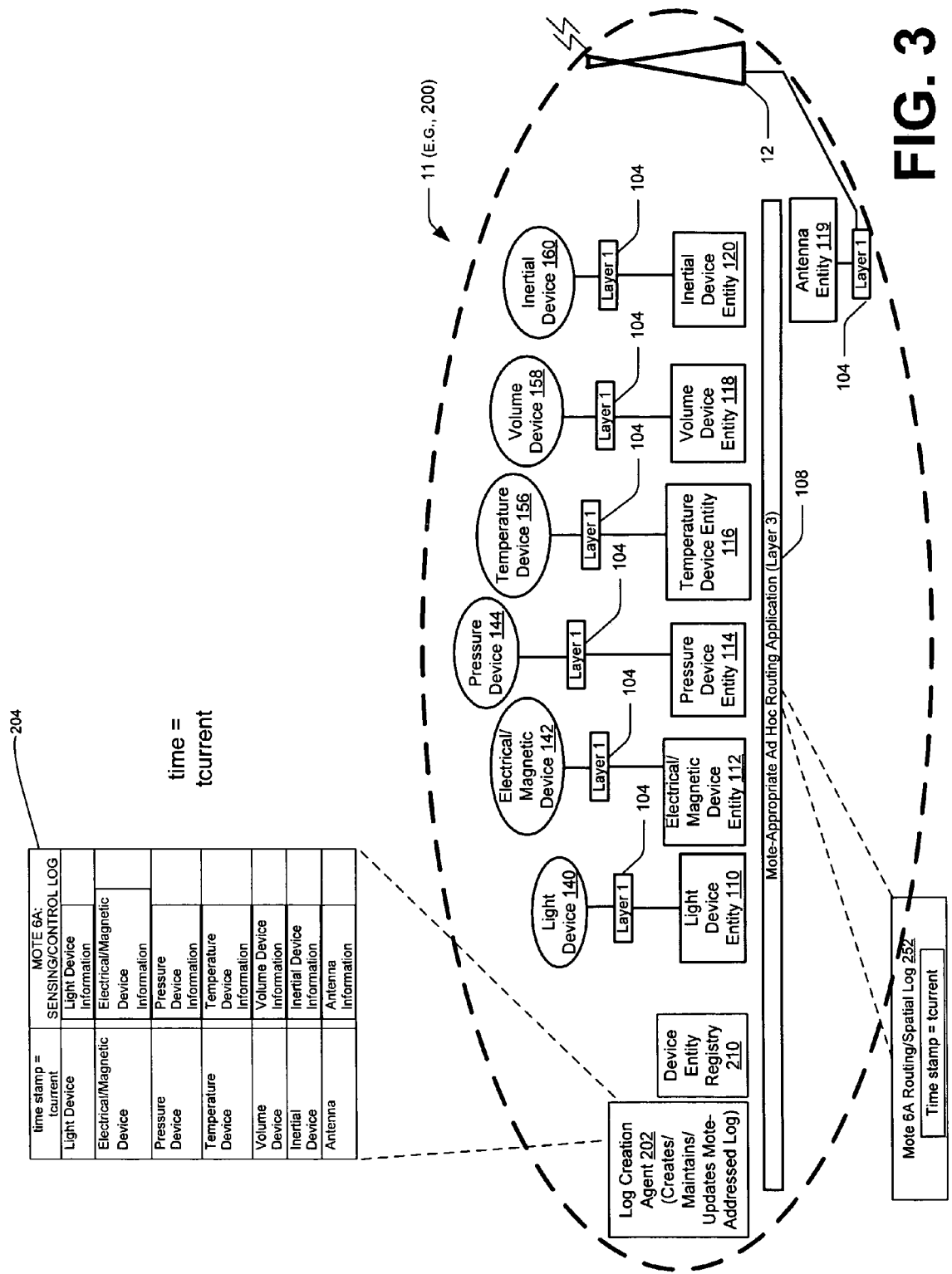
FIG. 3 shows a block diagram of another embodiment of the mote device.

Certain aspects of the present application can therefore relate to positional and/or geographic locating of the mote device(s) 11, as described with respect to FIGS. 1 to 3. The mote devices can be configured to allow for a variety of sensing, actuating, and/or displaying operations. It is envisioned that certain embodiments of the mote device(s) 11 within the mote network 10 can transmit data to other mote devices, as well as perhaps other non-mote devices. Many embodiments of the mote devices 11 can utilize wireless communications (e.g., in certain embodiments at radio frequencies).

In certain embodiments, it is also possible to affect the presentation of the mote device(s) with respect to a surface or structure to which the mote device(s) is secured and that can be displaced (not shown, such as a moving flag or surface of a moving object) based, at least in part, on the location (ephemeral or permanent) of the mote device(s). For example, consider the mote device(s) being affixed to a surface of a flag that is waving in the wind (or some other, possibly slower, motion being applied to the mote device(s)). As such, the mote device can indicate motion of the surface that it is affixed to. In a similar fashion, the mote device(s) can be inserted within a medium, and generally indicate some information about the motion of that medium such as flow of air, pollutants, gasses, etc. The dimension and/or weight of the mote device(s) should be suitable to allow the surface, the object, or the medium to move, while not weighing it down or causing an irregular flow to deflect the surface, object, or medium.

As used herein, the term "mote device" typically relates to a semi-autonomous computing, communication, displaying, actuating, and/or sensing device as described in the mote literature (e.g., Intel Corporation's mote literature and/or "smart dust" projects), those motes made commercially available by Crossbow Technologies, Inc., as well as equivalents recognized by those having skill in the art. For example, the motes produced by Crossbow Technologies, Inc., and/or Intel Corporation's smart dust projects, can be considered to have many similarities to certain embodiments of the mote device(s) as illustrated with respect to FIG. 1. It is to be understood, however, that mote device(s) represents an evolving technology, and the concepts described herein should be applicable to modernized versions of mote device(s). The mote network 10 may be at least partially formed by a number of mote device(s) 11 that can interact and/or transmit data between themselves, another device, and or a computer/controller 18 as described in this disclosure. The computer/controller 18 as described with respect to FIG. 1 can also be referred to as a "base station" among those familiar with or skilled in the mote device technologies. Such base stations may, in many embodiments of mote networks, have considerably greater processing and storage capabilities. The term "mote device" can be broadly interpreted to also include a variety of larger and/or smaller devices than those particularly described in this disclosure.

Certain embodiments of the mote devices can be produced having relatively small dimensions and/or relatively inexpensively. As such, it is envisioned that many embodiments of the mote devices could be affordably distributed in relatively dense configurations for a variety of applications (as sensors, actuators, displays, etc.). Hand-distribution of a number of mote devices (e.g., to establish a mote network) may result in the precise location of each mote device being somewhat uncertain. To precisely position each mote device in a mote network can, in certain instances, be quite expensive and difficult to perform. As such, this disclosure provides a number of techniques by which the location, or relative locations, of certain mote device(s) can be determined.

The present disclosure includes a number of formal outline headings for clarity of presentation. However, the outline headings are for presentation purposes, and different types of subject matter may be discussed throughout the different portions of the disclosure. For example, certain device(s)/structure(s) may be described under process(es)/operations heading(s) and/or vice versa. Also, descriptions of single topics may span two or more topic headings. Hence, the use of the formal outline headings is intended to be illustrative in nature and not in any way limiting in scope. The numbering of the various elements in the disclosure is intended to improve readability and understandability of the disclosure with respect to the drawing, and is not intended to be limiting in scope.

Certain ones of the mote device(s) 11 may perform a variety of controller and/or communication operations utilizing computer and/or networking techniques as described herein. One embodiment of the mote device(s) 11, as configured with respect to FIG. 1, can include a communication interface 13, a function portion 15, a power converter portion 17, a power source 25, and a controller portion 19. In certain embodiments, the communication interface 13 can be configured to provide communication of signals and/or transfer of sensed data with other mote device(s) 11, the locating device 50, and/or the computer/controller 18. In one embodiment, the communication interface 13 can include an antenna 12. Certain embodiments of the antenna 12 may be configured to transmit/receive electromagnetic radiation at selected electromagnetic radiation frequencies (that include, but are not limited to: radio frequencies, optical frequencies, infrared frequencies, etc.) to provide a wireless link between mote device(s), computer/controllers 18, etc. Such antennas can thereby be used to transfer signals and/or information to other mote device(s) 11, the locating device 50, and/or the computer/controller 18.

In certain embodiments, a user interface can allow user input to effectively control one or more operation(s) of the computer/controller 18. In different embodiments, the user interface can be, or may not be, physically separated from the computer/controller. The computer/controller 18 can also be referred to as a base station with respect to the mote network. In these embodiments, the user interface can be operationally connected to the computer/controller 18 using either a wireless, a wired-based, and/or another networking data-transfer technique.

Certain embodiments of the function portion 15 (for those mote devices that are configured at least partially to sense parameters) can be configured to sense one or more parameters and/or actuate some device to provide some operability of the mote device(s) 11. Other embodiments of the function portion 15 (for those mote devices that are configured at least partially to actuate one or more devices) can be configured to actuate the one or more devices, and thereupon provide some of the operability of the mote device(s) 11. Yet other embodiments of the function portion 15 (for those mote devices that are configured at least partially to control or serve as the display element) can be configured to control or serve as the display element, and thereupon provide some operability of the mote device(s) 11. A variety of such parameters or devices that can be sensed or actuated are described with respect to the various devices 140, 142, 144, 156, 158, and/or 160, as described with respect to FIGS. 2 and 3. Those parameters or devices to be respectively sensed or actuated are intended to be illustrative in nature, and not limiting in scope. It is envisioned that the rate at which each of these individual parameters or devices are sensed or actuated may depend upon the particular configuration of the mote device(s) 11 that can include, but is not limited to: sensed parameters for the mote device, actuation characteristics of the mote device, user input to the mote device, etc. In certain embodiments, the mote sensing or actuating rate of any mote device(s) 11 can be controlled and/or determined by the computer/controller 18.

Certain embodiments of the controller portion(s) 19 that are located within each one of certain embodiments of the mote device(s) 11 can include, but are not limited to: a processor 605, a memory 607, a circuit 609, and an input/output (I/O) 611. The controller portion 19, as well as its components and/or any programs, routines, or templates associated therewith, can rely on computing architecture and technologies, such as utilized by a microprocessor or microchip. FIG. 1 also illustrates two other devices (the computer/controller 18 and the locating device 50) that include similarly referenced components: 605, 607, 609, and 611. The devices 11, 18, and 50 are each provided with similar component reference characters 605, 607, 609, and 611 that pertain to computer/controller components that are included in each of the devices 11, 18, or 50, and can rely on similar computer architecture to provide their computer and/or controller technology. For example, each device 11, 18, and 50 can rely on any combination of hardware, software, and/or firmware as is generally understood by those of ordinary skill in the computer and/or controller technologies. As such, certain mote sensing and/or operation processes can be performed by any one of, or any combination of, the devices 11, 18, and/or 50.

Certain embodiments of the mote device(s) 11, as described with respect to FIGS. 1 to 3, can also be used for communication, computing, actuating, and/or displaying applications. Such parameter sensing, communication, computing, actuating, and/or displaying applications may rely on computer-based techniques, electromechanical techniques, magnetic sensing techniques, and/or other similar and suitable techniques.

Certain embodiments of mote device(s) can be located at remote, hostile, external, or inaccessible location(s), which can make access to the mote device(s) for such purposes as locating, repair, or replacement difficult, expensive, hazardous and/or even virtually impossible. As a result of difficulty in gaining access to the mote device(s), it may be desired to increase an energy level and/or power level of the power source (e.g., battery and/or power cell) within the mote device(s), and thereby allow for the mote device(s) to perform one or more energy-based operations. The energy-based operations may thereupon be capable of some type of operation (e.g., sensing, transmitting, receiving, actuating, displaying, etc.) that could utilize the increase in the energy level. Within this disclosure, the term "energy level" can indicate the energy the mote device can expend, unless otherwise indicated by the context. The term "power level" can indicates the power that the mote device can expend, unless otherwise indicated by the context.

One embodiment of locating, as described in this disclosure, includes monitoring and/or increasing energy and/or power of the power source that is providing power to the mote device. By increasing the energy or power of the mote device, the mote device(s) may be able to increase or extend its energy-limited normal operating duration to perform one or more operations. By applying a suitable electric current and/or voltage to a rechargeable power source, the rechargeable power source can increase its energy or power, and thereby extend its energy-limited normal operating duration. Within this disclosure, the energy-limited normal operating duration of certain embodiments of the power source for the mote device(s) typically decreases as the energy level of the power source 25 decreases.

Consider, for example, that certain mote device(s), such as those located in or on concrete, within or on flooring, within or on structures or other "permanent" or temporary location, may be difficult to access for locating, monitoring, etc. Such difficult to access mote device(s) 11 will have to have power or energy supplied thereto, to be able to operate or perform effectively. It may be desired in certain applications (such as to sense the structural integrity of a building, a dam, etc.), to locate at least one mote device(s) in such a difficult to access or semi-permanent location. With those difficult to access mote device(s), locating may have to be performed (e.g., by a locating device or person) remotely from the mote device(s). Certain embodiments of the mote device(s) can indicate that they should undergo locating using a location indication, such as by changing a surface color of the mote device(s), changing a surface reflectivity of the mote device(s), generating an acoustic signal from the mote device(s), generating a vibration at the mote device(s), etc.

It is also likely that motes can be applied to within the body of a human, an animal, a fish, or another organism. Depending upon the type of the organism; the location of the mote device within the organism; or the difficulty, cost, or potential damage in physically retrieving the mote device(s), it may be desirable to be able to locate the mote device(s) (or affect a presentation of the mote device(s)) externally to the organism. Depending upon the physical size of the mote device(s), they may be inserted by surgery, using ectoscopic, endoscopic, or other such techniques. It is thereby envisioned that the mote device(s) could be actuated to perform some desired operation within the body soon after (or some time after) the insertion into the body. As such, the mote device(s) can be viewed as capable of performing some desired operation within the body following the insertion, or operation. It is thereby also possible to use such inserted mote device(s) within some organism (or human) body to monitor health parameters or medications.

Certain embodiments of the locating device 50, as described with respect to FIG. 1, can provide a signal (that contains energy or power) that can be received by the mote device(s) 11. The energy or power received by the mote device(s) 11 can thereupon be converted by the power converter portion 17 into a different energy or power form that can be contained within the power source 25 (e.g., for rechargeable power sources). Other devices than the locating device 50 (e.g., the computer/controller 18 or base station, or another device) can provide the signal to be received by the mote device. In certain embodiments, such signals provided by devices at the mote device 11 can utilize directionality, in such a manner that only one or certain mote devices can increase their energy or power. In other embodiments, certain devices can provide such signal to a large number of mote devices, and thereby increase the power level or energy level or the mote device(s) in a mote network in general, for example.

This disclosure describes a number of embodiments of location indications that are associated with the mote device(s) 11. Each location indication can be used to indicate whether its associated mote device(s) is operating outside a normal operating parameter, such as having a reduced power or energy. In this disclosure, the term "normal", as included in "normal operating parameter", relates to that particular mote device (e.g., a normal energy level or power level to achieve a desired operation). In certain embodiments, multiple location indications can be associated with at least one mote device(s) to indicate whether each mote device(s) is operating outside of a plurality of respective prescribed normal operating parameters. For example, those mote device(s) that are operating outside a first normal operating parameter (such as having insufficient power or energy, etc.) can be color-coded, or include color coded location indications such as color-coded tags with a first color, or alternatively output a first signal, etc. Those mote device(s) that are operating outside a second normal operating parameter (such as operating incorrectly or containing desired data, etc.) can be color-coded or include color coded location indications such as color-coded tags with a second color, or alternatively output a second signal, etc. As such, those mote device(s) that are for operating outside a first normal operating parameter can be easily differentiated from those mote device(s) that are to be located for operating outside a second normal operating parameter by using color-coding, differentiating tags, differentiating reflectiveness, differentiating signals, etc. within the normal operating parameters.

A number of locating devices, locating persons, and/or presentation affecting devices may be associated with the same mote network, or be located by an individual locating person. Each locating device or presentation affecting device can be configured to perform one or more locating operations including, but not limited to: collecting, repairing, discarding, and/or reconfiguring, etc. of the at least one mote device(s) within that mote network. Mote device(s) can be installed within, (or distributed across) a variety of different environments and/or applications including, but not limited to: across the field, within a structure such as a building, bridge, highway, or dam, underwater, within a vehicle (e.g., to sense an engine parameter or operate a vehicle actuator), within a human body or body of an other organism, etc.

In this disclosure, a variety of techniques can allow the mote device(s) to achieve some type of "goal" with respect to the mote network. The mote device(s) is considered as being able to perform some operation, presenting some affect, or other such operation, which in turn can achieve some goal with respect to the mote network. Examples of such a goal can include, for example, maintaining or locating the mote device(s) to maintain the power level or energy level of the power source within the mote device(s), maintaining the performance of the mote device(s), affecting some presentation using the mote device(s), improving reliability in the mote device(s) (and/or their power sources) across a mote network, monitoring a particular percentage of the mote device(s) do not fail (e.g., due to insufficient energy, power, or other reason), etc. Ensuring that certain embodiments of the mote device(s) meet or exceed certain goals relative to the mote network can provide a considerable challenge and/or expense to the mote network designer, operator, user, or owner. Additionally, balancing data stored in the various mote device(s) across a mote network in a desired fashion (e.g., such that all data can be readily and reliably accessed) can represent another goal for the mote device(s) within the mote network. Also, ensuring that at least one mote device(s) (or a certain percentage of mote devices) is operating properly or providing proper output can represent another mote device(s) goal with respect to the mote network.

While certain mote device(s) applications could pertain to sensing one or more parameters, it is also envisioned that mote device(s) 11 can activate a variety of actuators. For example, in one embodiment, at least one of the mote device(s) 11 can be configured to control an electric current that could be applied to an actuator. The actuator can, in turn, actuate a device such as a light, a portion of a display such as a picture element (pixel), an electronically actuatable device, an electromechanically actuatable device, a computer-based actuatable device, a mechanically actuatable device, etc. As such, another mote device(s) goal with respect to mote networks can be ensuring that certain mote device(s) 11 can perform certain actuating operations effectively and/or efficiently.

Power and/or energy can represent a considerable design consideration that would be useful to locating and/or control operations relative to certain embodiments of mote device(s). This disclosure provides a variety of techniques and mechanisms by which power and/or energy levels of at least certain ones of the mote device(s) 11 can be monitored, determined, and/or enhanced. For example, certain mote device(s) require a prescribed power/energy level to perform a particular sensing operation(s), and/or other operation(s). As such, it may be important to consider whether one or more mote device(s) located across a particular mote network have sufficient power and/or energy levels to perform the particular operation(s). If an energy level or other condition of the mote device(s) varies from a prescribed level, it may be desired in certain embodiments to locate the mote device(s) and/or identify those mote device(s) 11 to be located.

The embodiments of mote device(s) 11 that are described in this disclosure are intended to be illustrative in nature, but not limiting in scope. The concepts, techniques, etc. as described herein with respect to the mote device(s) can also be applied to other embodiments of mote device(s) that would be ascertainable to those skilled in the art. As described in this disclosure, the mote device(s) 11 as described with respect to FIG. 1 may be considered, by their operating within normal operating parameters, as achieving their individual goal(s). When certain one(s) of the mote device(s) are operating outside normal operating parameters (e.g., by running out of power or energy, or storing too much or too little data), those mote device(s) may not be able to achieve their individual goal(s) with respect to the mote network.

In certain embodiments, those mote device(s) 11 should thereby either be identified to be located, identified (within the mote network) as operating outside normal operating parameters (e.g., operating improperly), and/or be located utilizing, e.g., a locating device and/or a locating person. It is envisioned that certain mote device(s) 11 within the mote network 10 can transmit data to the mote device(s), as well as perhaps other non-mote device(s). Many embodiments of the mote device(s) 11 can utilize wireless communications (e.g., in certain embodiments of radio frequencies). A variety of wireless communication techniques can be utilized in a variety of networking devices, including but not limited to mote device(s). In general, different embodiments of mote device(s) 11 can be configured to sense a variety of parameters that can include, but are not limited to: temperature; pressure; certain electrical/magnetic characteristics; position; velocity; inertia; presence or absence of individual persons, items, or vehicles; moisture, etc. Such data or information can relate to sensed parameters which can be transmitted (utilizing wireless communication techniques), between one or more mote device(s) 11 and/or one or more computers/controllers 18 as described with respect to FIG. 1.

Many embodiments of the mote device(s) 11 can be configured to be quite small (e.g., in many embodiments less than an inch), and thereby mote device(s) can be distributed in relatively large numbers within an area to be sensed. Integrated circuit technology can also be applied to mote device technology, such that motes can be further miniaturized, such as being fabricated in the nanoscale, proscale, etc. As such, the mote device(s) can be configured to perform their sensing or other operation functionality relatively unobtrusively. Additionally, many embodiments of mote device(s) 11 may be powered by the power source(s) 25, which may in certain instances utilize a battery or a power cell. As the expense of mote devices further diminishes, mote devices can densely spread over a relatively large area, such as a highway, a field, a building, etc. if so desired.

Providing power to many types of mote device(s) 11 in a manner that can ensure a relatively long and reliable operation of certain embodiments of a mote device(s) can be challenging, especially considering many applications of mote device(s). As such, maintaining power to mote device(s) represents a design goal for many embodiments of mote networks. It may be difficult to service or maintain the power and/or energy to such mote device(s), or alternatively service such mote device(s) by ensuring that they are operating properly, can be properly configured, and can be capable of sensing a variety of parameters or performing a variety of operations. Certain embodiments of the mote device(s) can be located at various difficult (or dangerous) to reach locations such as an internal or external portion of an operating automobile or aircraft; within a building, dam, roadway, or a nuclear power plant; at various locations in an organism including (but not limited to) the human body such as may be desired to access during surgery or to monitor health parameters or medications; underseas; deep in a forest; or high on a mountain, etc. As such, many embodiments of mote device(s) can, in general, sense a variety of parameters, actuate a number of devices, locate their position or a relative location of at least one other mote device, and/or control or serve as one or more display elements. Such applications indicated the wide functionality of mote devices. Such operations may utilize some power and/or energy from the power source 25 that could be at least partially provided utilizing the power converter portion 17.

Due to the relatively low cost of a variety of certain embodiments of the mote device(s) as compared to other larger and operationally complex sensor, locator, display element, and/or actuator devices; it is envisioned that the mote device(s) can be distributed in relatively large numbers to provide a gradient of sensed parameters or provide a variety of operations, or alternatively across a relatively large area. It is envisioned that as the use of mote device(s) and their associated networks becomes more commonplace and the costs of mote devices drop (largely as a result of miniaturization and/or reasonable production and commercial acceptance), the number of mote device(s) within certain mote networks might become so large that locating individual mote device(s) could provide a challenge. As such, in many embodiments, it may be preferred to "automate" many operations associated with the mote device(s) within the mote networks such as, but not limited to: locating mote device(s), mote device(s) set-up, mote device(s) operation, mote device(s) locating, and/or identification of mote device(s) to be located, etc. Many of the applications for mote device(s) can demand a relatively high degree of reliability from the power source 25 and/or it can be exceedingly difficult to locate the mote device(s) and/or its power source 25.

Certain embodiments of the power converter portion 17, (depending upon its intended use and design), can be configured to provide power to the mote device(s) 11, as well as the communication interface 13 and the sensor portions contained therein. In certain illustrative active embodiments, the power converter portion 17 can be configured as a battery (e.g., chargeable and/or disposable that may be internal to, or external to, the mote device) and/or a power supply that outputs power to an active embodiment of the mote device. In certain illustrative passive embodiments of the mote device(s), the power converter portion 17 can be configured as a power reception device that can receive power from outside of the mote device. Other embodiments of the power converter portion 17 can, for example, receive power from a solar panel that is attached to the mote device(s) 11, and the energy received from the solar panel that is converted into a form that can be used to power the mote device. Certain embodiments of the power converter portion 17 can include active as well as passive components that can interact under a variety of different scenarios. Certain embodiments of the power converter portion can be considered to convert the power received by passive and/or active embodiments of the mote device(s) 11. In certain embodiments, energy contained in a received signal can be converted into a frequency and/or a form such that the energy of the signal can be utilized by the mote device(s) 11 to power the mote device(s). Certain embodiments of mote device(s) can even rely on the passive energy source (e.g., solar panel). These and other operational configurations of the communication interface 13, the function portion 15 (determining whether the mote device(s) acts as a sensor, a device actuator, or a display controller), and the power converter portion 17, are provided as illustrated within this disclosure, and are not intended to be limiting in scope. As such, it is to be understood that many reasons for locating mote device(s) may be for purposes other than locating their power source, such as presenting an affect. Furthermore, affecting the presentation (e.g. indicating location or state of a mote or neighboring motes, or conveying an aggregate feature of the mote network or part of the network) may serve to locate or identify mote device(s) in one or more states or having one or more attributes, for a variety of purposes, which may include but are not limited to locating their power source(s) for the mote device(s).

In certain embodiments, the computer/controller 18 can be configured as a variety of computers and/or controllers to control at least some sensing operations of the mote device(s) 11 (and/or the other devices 18 or 50, as described with respect to FIG. 1), and/or receive, store, or otherwise process at least some sensed output parameters from the mote device(s) 11 and/or the other devices 18 or 50. The computer/controller 18 can, e.g., be configured as a standalone computer, a laptop computer, a desktop computer, a microprocessor, a microcomputer, a mainframe computer, and/or any other type of computer that can process data or other information relating to sensed parameters such as provided by the mote device(s) 11 and/or the other devices 18 or 50. In certain embodiments, the computer/controller 18 can monitor and/or control energy or power levels of the mote device(s) 11 (or other device). The configuration of the computer/controller 18, as described with respect to FIG. 1, is intended to be illustrative in nature and not limiting in scope; more detail relating to the devices 11, 18, and/or 50 are provided in this disclosure.

The positioning of the mote device(s) 11 can be determined by the user, owner, other person, machine, computer, etc. depending upon the particular desired parameters to be sensed, device to be actuated, or display element to be actuated. In certain embodiments, after the mote device(s) 11 have been positioned, the location of certain mote device(s) can be determined using a variety of techniques as described herein. The derived position can be utilized to provide communications between the particular mote device(s). In certain embodiments, for example, mote device(s) 11 can be distributed within a building, house, or other structure to determine particular sensed parameters with respect to that structure. In certain embodiments, it may be desired to locate other devices 18 or 50 that are associated with the mote device(s) 11 and in operational proximity to the mote device(s) 11 (as described with respect to FIG. 1).

In other embodiments, for example, mote device(s) 11 can be distributed in a variety of locations including, but not limited to: in or on fields, in or on floors, attached to or integrated in a positioning or supportive or levitating device such as a balloon, along or within roadways or walkways, positioned to determine sensed parameters relating to vehicles or persons travelling thereupon, etc. In certain embodiments, an air curtain, an electromagnetic waveguide, a suspending liquid or fluid, lack of gravity (e.g., in outer space), or other similar levitating technique could be used to support the mote device(s). Such levitating techniques are generally well understood, are commercially available, and will not be further described in this disclosure. For example, certain embodiments of the mote device(s) 11 could be laid upon or deposited at least partially in the ground, a floor, a walkway, etc.; integrated into structures that are laid upon or deposited at least partially in the ground, a floor, a road, a walkway, etc.; or physically embedded within the ground, a floor, a road, or a walkway, etc. In other embodiments, for example, the mote device(s) 11 can be distributed across a field, a crop area, in the ground, in a garden, around a family's yard, around a secured business area, within a forest, etc. to sense parameters or perform some functionality with respect to each particular area. Mote device(s) can, in certain embodiments, therefore be utilized to sense a variety of parameters and/or perform a variety of operations as described within this disclosure.

FIGS. 2 and 3 illustrate two illustrative embodiments of the mote device(s) 11 that may be used for affecting the presentation. FIG. 2 shows an example of a functional structure of the mote device(s) 11 of the mote network 10 that may serve as a context for introducing one or more mote processes and/or mote device(s) described herein. These descriptions of the internal components of the mote device(s) 11 are intended to be illustrative and enabling, and the concepts and techniques described in this disclosure could be applied to any mote device(s) (or mote) that is not inconsistent with the scope of the description. Certain embodiments of mote device(s) can, in general, be configured to act as sensors, actuators, display controllers, presentation affectors, computational entities, and/or communications entities, etc. with associated devices, or by themselves. The mote device(s) 11, as described with respect to FIGS. 2 and 3, can represent a specific example of the mote device of FIG. 1. The embodiment of the mote device(s) 11 of FIGS. 2 and/or 3 is illustrated as including certain embodiments of the antenna 12, a physical layer 104, an antenna entity 119, a network layer 108 (shown for sake of example as a mote-appropriate ad hoc routing application), a light device entity 110, electrical/magnetic device entity 112, a pressure device entity 114, a temperature device entity 116, a volume device entity 118, and an inertial device entity 120. The particular entities 110, 112, 114, 116, 118, and 120, as well as the other components in these figures, are intended to be illustrative in nature and not limiting in scope. Those entities that are selected can determine those parameters that the mote device(s) can sense, as well as those operations that the mote device(s) can perform. Additionally, the mote device(s) 11 can be configured to provide a variety of operations (e.g., actuating and/or sensing) and/or functions.

Many embodiments of the physical layer 104, as provided within the mote device(s) 11, can provide for data transfer to/from a number of devices (140, 142, 144, 156, 158, and/or 160, etc. as described with respect to FIGS. 2 and/or 3) that allow for sensing a variety of parameters with the devices, or alternately providing a variety of actuation to the devices. Each one of the respective light device entity 110, the electrical/magnetic device entity 112, the pressure device entity 114, the temperature device entity 116, the volume device entity 118, the antenna entity 119, and the inertial device entity 120, as depicted, can couple through the physical layers 104 using the respective light device 140, electrical/magnetic device 142, pressure device 144, temperature device 156, volume device 158, antenna 12, and inertial device 160. Those skilled in the art will appreciate that the herein described entities and/or devices are illustrative, and that other entities and/or devices consistent with the teachings herein may be substituted and/or added.

Those skilled in the art will appreciate that herein the term "device," as used for data transmitting or receiving applications in the context of the "mote device", or "mote", is intended to represent but is not limited to transmitting devices and/or receiving devices dependent on context. In some exemplary lighting contexts, for example, the light device 140 can be implemented using one or more light transmitters (e.g., coherent light transmission devices or non-coherent light transmission devices) and/or one or more light receivers (e.g., coherent light reception devices or non-coherent light reception devices) and/or one or more supporting devices (e.g., optical filters, hardware, firmware, and/or software). As such, the light device 140 can be configured to perform a variety of light operations, upon actuation. In some exemplary implementations, the electrical/magnetic device 142 can be implemented using one or more electrical/magnetic transmitters (e.g., electrical/magnetic transmission devices) and/or one or more electrical/magnetic receivers (e.g., electrical/magnetic reception devices) and/or one or more supporting devices (e.g., electrical/magnetic filters, supporting hardware, firmware, and/or software). In some exemplary implementations, the pressure device 144 can be implemented using one or more pressure transmitters (e.g., pressure transmission devices) and/or one or more pressure receivers (e.g., pressure reception devices) and/or one or more supporting devices (e.g., supporting hardware, firmware, and/or software).

In some exemplary implementations, the temperature device 156 can be implemented using one or more temperature transmitters (e.g., temperature transmission devices) and/or one or more temperature receivers (e.g., temperature reception devices) and/or one or more supporting devices (e.g., supporting hardware, firmware, and/or software). In some exemplary implementations, the volume device 158 can be implemented using one or more volume transmitters (e.g., gas/liquid transmission devices) and/or one or more volume receivers (e.g., gas/liquid reception devices) and/or one or more supporting devices (e.g., supporting hardware, firmware, and/or software). The use of certain parameter sensing devices (e.g., temperature, pressure, etc.) is considered illustrative and non-limiting in scope.

Certain embodiments of mote device(s) 11 can also be configured to display at least portions of images, similar to those varied displays, screens, etc. that can be used as computer monitors, televisions, movie-theater screens, signs, billboards, personal display assistants (PDAs), etc. In certain embodiments of mote device(s), each mote device(s) can actuate one or more picture elements (pixels) (in certain instances, all the colors that are desired to be used) for one or more colors for the display. In certain embodiments of mote device(s), the color properties (e.g. hue, saturation, luminance) and/or color levels of each one or more picture elements can be adjusted by the mote device(s) to provide a suitable image depending upon the resolution, or quality, of the display. As such, certain embodiments of the mote device(s) can act as an actuator for the display element.

In some exemplary implementations, the inertial device 160 can be implemented using one or more inertial transmitters (e.g., inertial force transmission devices) and/or one or more inertial receivers (e.g., inertial force reception devices) and/or one or more supporting devices (e.g., supporting hardware, firmware, and/or software). Those skilled in the art will recognize that although a quasi-stack architecture can be utilized herein for clarity of presentation, other architectures may be substituted in light of the teachings herein. In addition, although not expressly shown, those having skill in the art will appreciate that entities and/or functions associated with concepts underlying Open System Interconnection (OSI) layer 2 (data link layers) and OSI layers 4-6 (transport-presentation layers) are present and active to allow/provide communications consistent with the teachings herein. Those having skill in the art will appreciate that these layers are not expressly shown/described herein for sake of clarity, and are not intended to be limiting in scope.

Many embodiments of the mote device(s) 11 can be configured to sense a number of sensed parameters. For example, the mote device(s) 11, as illustrated in FIGS. 2 and 3, can be configured to sense light, electrical/magnetic level, pressure, temperature, volume, and/or inertia. These particular parameters as described with respect to FIGS. 2 and/or 3 (or throughout this disclosure), are intended to be illustrative in nature and not limiting in scope. Sensors for mote device(s) can be configured to sense a wide variety of parameters, actuate a wide range of device(s) or control or serve as a large variety of displays. Certain embodiments of mote device(s) 11 can be configured during device configurations (e.g., by the mote device(s) designer and/or user) to sense particular prescribed parameters, and that mote device(s) will sense only those prescribed parameters during its intended lifetime. By comparison, certain embodiments of mote device(s) 11 can be reconfigured during normal operation to sense different prescribed parameters. During configuration and/or reconfiguration, certain embodiments of mote device(s) 11 can be connected to or modified to a particular sensing device, such as providing a new hardware, software, firmware, etc. During reconfiguration, other embodiments of mote device(s) 11 can be reconfigured such that certain sensing devices that had previously been integrated in, or associated with, the mote device(s) can be actuated, such as by reconfiguring the hardware, software, firmware, etc.

FIG. 3, depicts an exploded view of an embodiment of the mote device(s) 11 or 200 (that represents one example of the mote device(s) 11, as described herein with respect to FIG. 1). The mote device(s) 11 or 200 can form a part of a mote-appropriate network. The mote device(s) 11 or 200 as described with respect to FIG. 3 is illustrated as similar to mote device(s) 11 (e.g., described with respect to FIG. 2), but with the addition of certain embodiments of a log creation agent 202, a mote-addressed sensing/control log 204, and a mote-addressed routing/spatial log 252.

One embodiment of a mote-addressed sensing/control log 204, as described with respect to FIG. 3, can be configured to sense particular illustrative but non-limiting parameters of: entries of light device information, electrical/magnetic device information, pressure device information, temperature device information, volume device information, inertial device information, and antenna information. Examples of light device information can include, but is not limited to, measures or productions or light based on brightness, saturation, intensity, color, hue, power (e.g., watts), flux (e.g., lumens), irradiance (e.g., Watts/cm$^2$), illuminance (lumens/m$^2$, lumens/ft$^2$), pixel information (e.g., numbers of pixels (e.g., a very small mote image capture device), relative pixel orientation, etc. Examples of electrical/magnetic device information can include measures of field strength, flux, current, voltage, etc. Examples of pressure device information include measures of gas pressure, fluid pressure, radiation pressure, mechanical pressure, etc. Examples of temperature device information include measures of temperature such as Kelvin, Centigrade, and Fahrenheit, etc. Examples of inertial device information include measures of force, measures of acceleration, deceleration, etc. Examples of antenna information include measures of signal power, antenna element position, relative phase orientations of antenna elements, delay line configurations of antenna elements, beam directions, field of regard directions, antenna types (e.g., horn, biconical, array, Yagi, log-periodic, etc.), etc.

In the implementation, as described with respect to FIG. 3, a log creation agent 202 can utilize a computer program that can be resident in the mote device(s) 11 or 200, that executes on a processor of the mote device(s) 11 or 200 and that constructs and/or stores mote-addressed sensing/control log 204, and/or mote-addressed routing/spatial log 252 in the memory of mote device(s) 11 or 200. In certain implementations, log creation agent 202 is pre-installed on mote device(s) 11 or 200 prior to mote device(s) 11 or 200 being added to a mote-appropriate network, while in other implementations log creation agent 202 crawls and/or is transmitted to mote device(s) 11 or 200 from another location (e.g., a log creation agent at another mote or another networked computer—not shown—that may be used to thereby replicate or clone itself, and transmits that log clone to mote device(s) 11 or 200). In yet other implementations, the log creation agent 202 can be installed at a proxy (not shown) for mote device(s) 11 or 200. Such logs can be accessed, with certain embodiments of the locating devices, to determine whether the individual mote device(s) are achieving their goals as per the mote network.

The structure and operation of each mote device(s) 200 or 11, as described with respect to FIGS. 1, 2, and/or 3, is intended to be illustrative in nature and represents a number of illustrative embodiments of mote device(s) structure and operation. Mote device(s) continue to undergo development, and it is to be understood that other mote structures and operations (such as is described in the articles, publications, and research as described herein) are also intended to be within the scope of the present disclosure as long as such mote structures and operations satisfy the claim limitations of the present application, as interpreted based on the present disclosure.

In certain embodiments of this disclosure, the systems and/or processes transfer their instructions in a piecewise fashion over time. In some applications, motes can be considered as relatively low-power and/or low bandwidth devices, and thus in some implementations the system(s) and process(es) described herein allow seconds, minutes, hours, days, or even weeks for the herein described agents and/or processes to migrate to and establish themselves at various motes depending upon the particular application. The same can be true for transmission of information among motes in that in some implementations such transmission may be done over the course of various durations (e.g., milliseconds, seconds, hours, days, or even weeks) depending upon bandwidth, power, and/or other constraints. In other implementations, the migrations and/or transmissions are accomplished more rapidly, and in some cases may be accomplished as rapidly as possible. As such, the mote network 10 may be configured with mote device(s) that act according to desired or designed operational characteristics.

Figure 8:
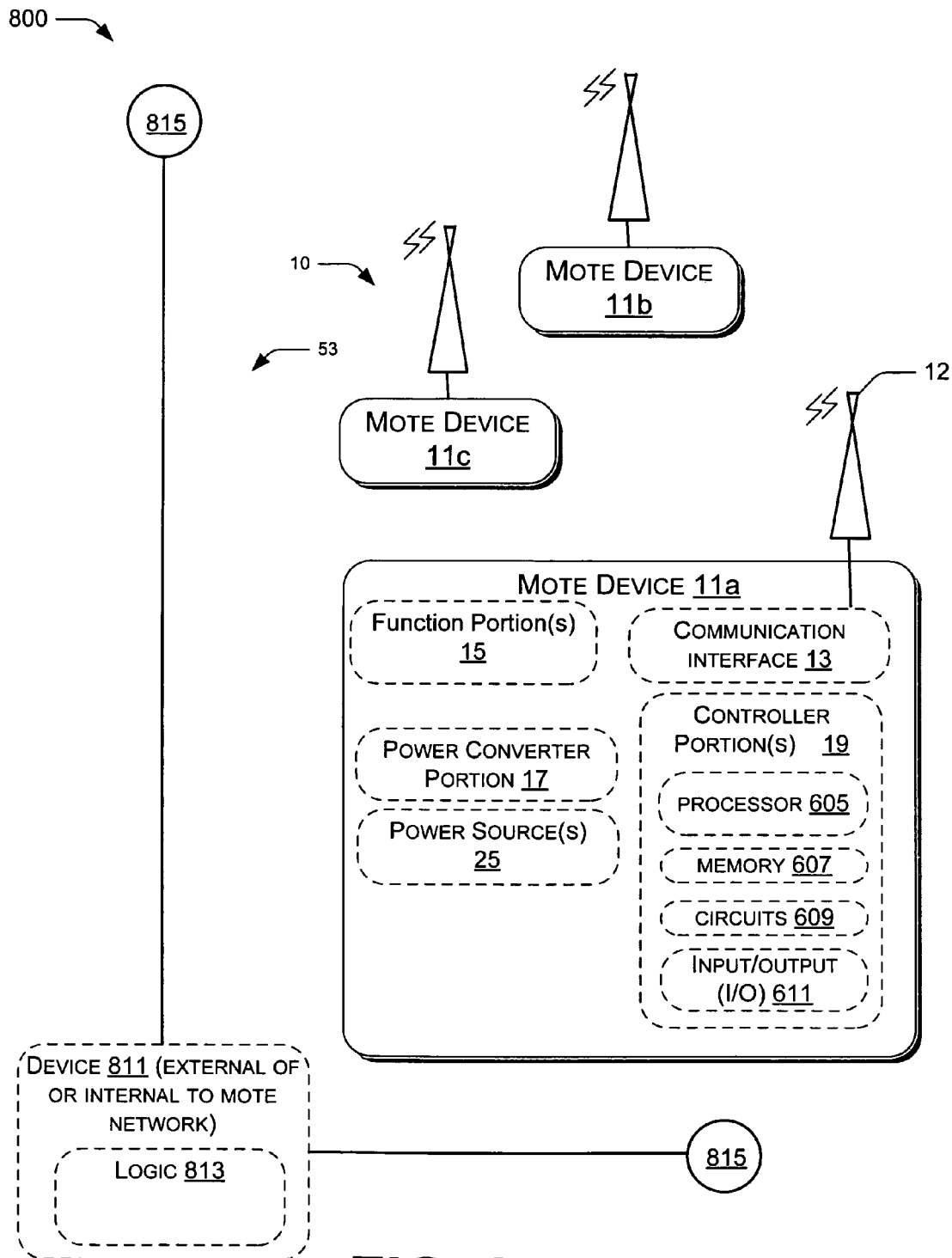
FIG. 8 shows a view of another embodiment of the mote network including multiple mote devices.
Figure 10:
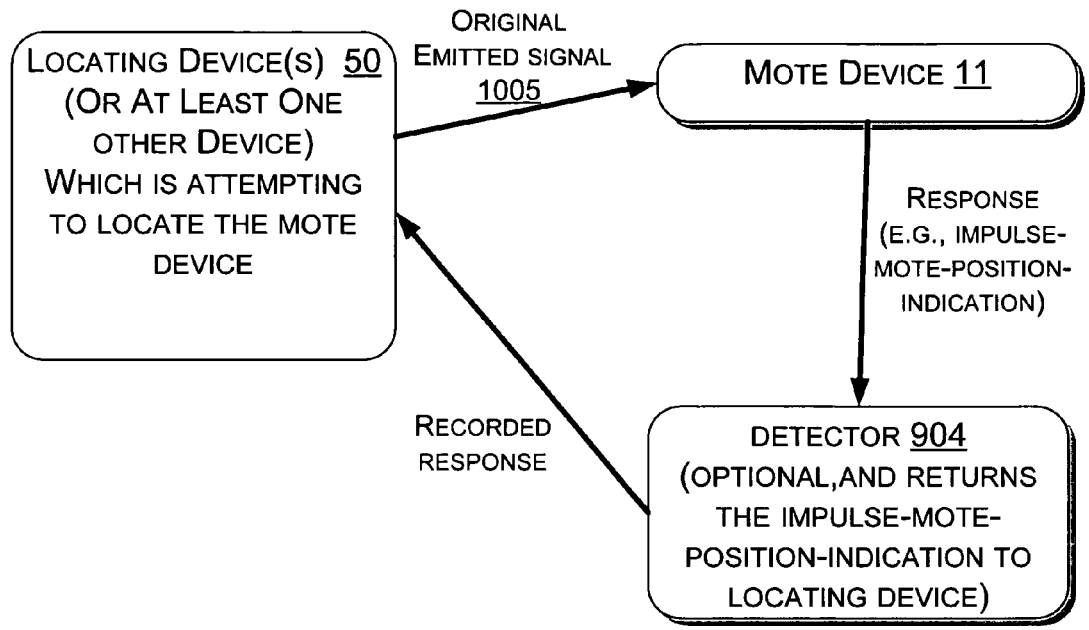
FIG. 10 shows a diagram of one embodiment of the mote device(s) that can transfer a impulse-mote-position-indication, which can be used to locate the mote device(s)

While the FIG. 10 embodiment illustrates the signal 1005 that charges the mote device(s) 11 (which may charge the power source(s) 25 using the power converter portion 17 as described with respect to FIG. 1 or 8). The signal 1005 can originate from the locating device 50, or the signal 1005 can also be provided by a variety of suitable devices such as a charging device (not shown). For example, in certain embodiments, the locating device 50, a person using the locating device (or a person acting alone) can locate those mote device(s) 11 that need to be charged. Thereupon, in certain embodiments, the locating device 50 (or a locating person) can locate a signal-charging device (not shown) that emits a charging signal, and position the signal-changing device in sufficiently close proximity to the rechargeable mote device(s) (or vice versa) for a sufficient duration to charge the power source(s) 25 of the mote device(s) 11 using the signal 1005. Alternatively, the mote device(s) 11 can be returned to a remote location for charging either using traditional charging techniques or using a signal-charging technique. Within this disclosure, the signal 1005 can by configured as any type of electromagnetic radiation (including radio, electric, optical, infrared, ultraviolet) whose energy can be converted into a form which can at least partially charge the power source(s) 25, perhaps using the power converter portion 17, unless otherwise indicated by the context.

By periodically utilizing the locating device 50 and/or charging device to charge the mote device(s) 11, the energy levels of the mote device(s) in a mote network can be located to ensure and monitor for substantially continual operation. As such, the reliability of operation of certain embodiments of mote device(s) and their networks can be ensured. The locating device 50 can thereby be configured to perform a wide variety of operations with respect to the mote device(s) 11, that can include, but are not limited to: locating the mote device, identifying those mote device(s) that need locating, and/or charging an undercharged rechargeable mote device(s) 11.

II. Examples of Interactions Between Mote Device(s) and Other Devices

In certain embodiments, a relative location or a geographic location of the mote device(s) 11 can be located, determined, or indicated relative to some position, structure, landmark, organism, organ, or another device (such as the locating device 50, the computer/controller 18 or base station, or another mote device(s) 11 as described with respect to FIG. 1). Such locating devices are generalized within this disclosure as the locating device 50. A variety of techniques can be used by the locating device 50 to locate the mote device(s) 11, such as one or more transmitted signals as generally described with respect to FIG. 9, a change in color of the mote device(s), a change in a reflective characteristic of the mote device(s), an emitted burst locating signal from the mote device, etc.

By using the techniques as described herein (e.g., the impulse-mote-position-indication) the locating device 50 to precisely locate the mote device(s), the positional information of the various mote device(s) 11 within the mote network can be utilized to perform a variety of operations. More particularly, certain embodiments of the mote device(s) that are located with respect to each other can be utilized to provide a variety of sensory operations, display operations, and/or device actuating operations relying at least in part on their relative positions. As such, locating and position deriving concepts, such as have been developed relative to computer, control, and/or communications systems, can be applied to the mote network 10 including mote device(s) 11, as described in this disclosure.

There are a variety of techniques by which the mote device(s) 11 can locate itself relative to other devices (e.g., a locating device), such that the mote device(s) 11 can be, or is configured to be, located, identified to be located, and/or attended to. The particular shape or surface configuration of the mote device(s) 11 (and the associated antenna to the mote device(s)) as illustrated in FIGS. 4-7 are intended to be illustrative in nature, while the locating configurations are not intended to be limiting in scope.

Certain embodiments of mote device(s) can be formed in a desired and/or suitable shape and configuration that would simplify locating the mote device(s) 11. The embodiment of the mote device(s) 11, as described with respect to FIG. 4, can be configured such that at least one of its surfaces changes some indicator as described herein that can be used by the locating device 50 or locating person to indicate where the mote device(s) 11 is located. In one embodiment of the mote device(s) 11 as described with respect to FIG. 4, the color, light emitted, reflectivity, or signal generated could indicate the geographic or relative location of the mote device(s). Such change in the location indication of the mote device(s) can be used by a person or a mechanism to locate the mote device(s).

As such, the location indications can transmit signal(s), change color(s), alter reflective characteristic(s), etc. (based for example on some chemical, fluorescent, phosphorescent, mechanical, or other technique), to assist the locating device 50 to locate the mote device(s) 11. One example of a mechanical change in color on the mote device(s) may be effected by, but is not limited to, physically "pumping" some colored liquid, or liquid having controllable optical characteristics, into a chamber of the mote device(s) that is visible from the outside of the mote device.

Another embodiment of the mote locating technique that can be implemented, which can detect a change in color of the mote device(s) 11, may include painting or otherwise coloring distinct surfaces of the mote device(s) 11 in two or more colors such that a change between the different colors may be easily detected. As such, during normal operation, one color of the mote device(s) that is typically facing upwards will be colored or painted a first color. As particular mote device(s) are identified as those to be located, those mote device(s) can be displaced such as being "flipped over" using, e.g., a displacement portion of the locating devices, an identifying device, or even a positional actuator located within the mote device(s) itself. After the mote device(s) is reoriented such as by being flipped over, the newly exposed surface thereupon being exposed on the mote device(s) can be of a different color, reflectivity, etc. and can thereupon be identified by the locating device and/or an individual.

Another embodiment of the locating device 50 can rely upon some sound, audio or other indication by the mote device(s) 11. As such, certain embodiments of mote device(s) could provide some detectable action such as vibrating, clicking, buzzing, providing a voice signal, providing an electromagnetic signal of some frequency (e.g., which may or may not be audible by human ears or eyes but might be to the locating device or controller), providing a light signal, emitted a voice recording or sound, changing color, changing shape and/or position of the mote device(s) to be located, etc. Such change of an outward appearance of certain embodiments of the mote device(s) can be detected by a human, or alternatively a mechanism that can sense color, vibration, reflectance, or the particular characteristic being identified by the locating device 50 or individual.

With certain embodiments of the locating device 50, image processing and/or filtering techniques can be used to identify locations of those mote device(s) that have changed color or positional orientation. In certain embodiments, the locating device 50 can be configured to automatically recognize those colors of the mote device(s) 11 that can be used to locate the mote device. For example, consider in certain embodiments, the mote device(s) can transmit a signal, turn a particular color, etc. when it's power and/or energy level is low; and perhaps the mote device(s) can turn another color when data-storage or transfer becomes an issue.

As such, it may be beneficial for the locating device to be capable of recognizing mote device(s) 11 having a particular color and thereupon may be used to locate the mote device(s). In certain embodiments, a filtering device can be used by a locating device to monitor an area that mote device(s) are located for a particular color that would assist in locating the mote device(s). When that particular color (that has been filtered or un-filtered) is received by the locating device, then the locating device can locate that particular mote device(s) either to itself, to a person, and/or some other mechanism or device. This scenario represents an illustration of one embodiment of the locating device or mechanism that can be used to locate at least one mote device(s), while it is to be understood that other embodiments of locating devices can also be utilized that also rely upon the appearance, reflectivity, color, shape, etc. of one or more surfaces of the mote device(s).

Figure 4:
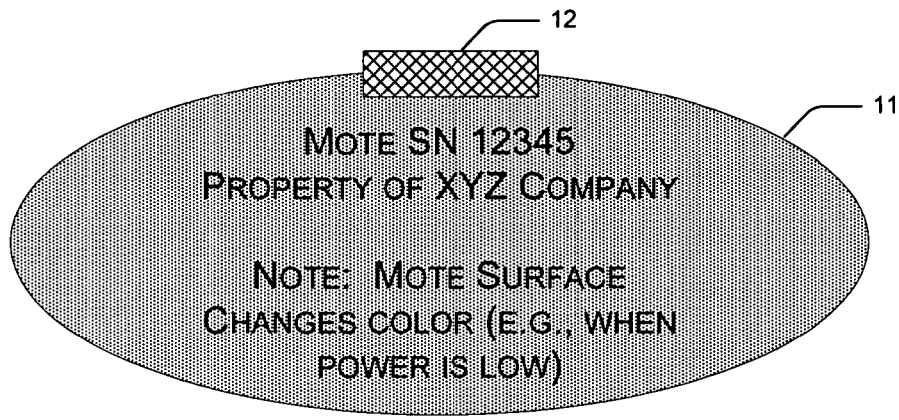
FIG. 4 shows a view of one embodiment of the mote device that is configured to be located.
Figure 5:
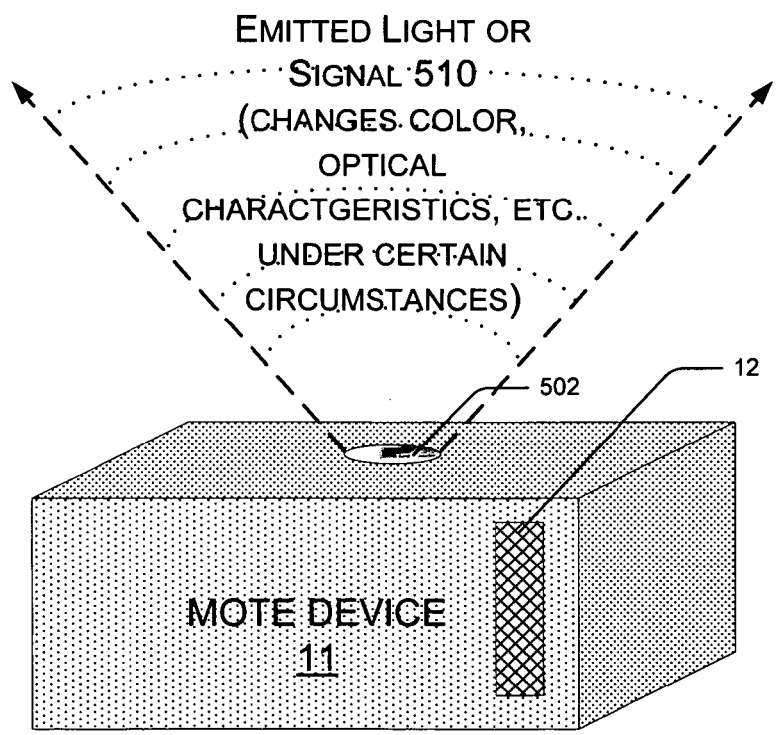
FIG. 5 shows a view of another embodiment of the mote device that is configured to be located.

A number of embodiments of location indications can be utilized to change the color, reflective characteristics, or other optical characteristics of a surface of one or more mote device(s) 11, as described with respect to FIG. 4. Certain embodiments of techniques that can be used to change the color, reflectiveness, etc. of the surfaces of the mote device(s) can include, but are not limited to: a chemical location indication or a fluorescent location indication, which can be utilized to change color of a surface upon some prescribed operation condition that can be detected by the mote device. The structure and operation of a chemical location indication and/or fluorescent location indication are generally understood, and will not be described in further detail herein. Certain embodiments of mote device(s) can change color, reflectivity, shape, etc. from their natural background (e.g., green for mote device(s) located in or on a grassy field, or gray or black for mote device(s) located in or on a roadway) to an easily-detectable color (e.g., orange for mote device(s) in a field) to ease locating by a person or optical-based locating device.

Other embodiments of the mote device(s) 11 can be configured to emit light or signal of a recognizable color, brightness, blinking rate, etc. when it is desired that the mote device(s) 11 be located by the locating device 50. In certain embodiments, the locating device 50 can utilize the emitted light in locating the mote device(s), such as by considering a time that it would take an initial signal, and a response to signal, to travel along, for example, a two-way communication pathway that extends between the locating device 50 and the mote device(s) 11. As such, the emitted light or signal can be utilized (for example by a person or the locating device 50) to locate the one or more mote device(s) based, at least in part, on the appearance of the at least one mote device(s).

In certain embodiments, a light emitting diode (e.g., LED) or other display element can be actuated to be located based on the operating condition sensing, for example, that the mote device(s) has relatively low-power. As such, the mote device(s) 11 can be configured to emit a particular color if it is desired that mote device, for example, be located by the locating device based, at least in part, on the color of the mote device. In certain embodiments, for example as described with respect to FIG. 5, the mote device(s) 11 includes a light source 502, that can be configured to generate light of a desired color, blink at a desired rate, or to provide another desired color, reflectiveness, or optical characteristic, etc. when it is desired to have the mote located or attended to. In certain embodiments, the light source 502 can include at least one light emitting diode(s) (LED), liquid crystal display (LCD), etc. which has been designed to provide an emitted signal 510 such as light that can, in this embodiment, include a detectable amount of light that preferably utilizes relatively little power. As such, the locating device, a person locating the mote device, or alternatively a user of the locating device should be able to locate certain embodiments of the mote device(s) 11 based at least in part on the emitted signal 510 (that can include light from the light source 502). As such, the emitted signal 510 emitted from the light source 502 can be selected to indicate one or more conditions of the mote device(s) 11. In certain embodiments, the light source 502 can be a relatively low-powered device, such that the mote device(s) 11 will be able to emit a light even under certain circumstances that the mote device(s) itself has insufficient power to operate properly.

A variety of techniques may be utilized to approve the locating or attending to the mote device(s) 11 (which are of a particular color or are emitting light to be easily identified). For example, if a user is monitoring mote device(s) within an interior space such as a building, then it may be desired to turn out other lights within the room, building, outdoor area, etc. where the mote device(s) is located to determine which ones of the mote device(s) are generating light from the light source 502. Alternatively, light of a particular frequency may be generated from the light source, that is not a similar frequency to the light in the area around the mote device(s) 11. For example, the light source 502 can be configured to emit infrared or ultraviolet light; and a suitable filter can thereupon be used by the locating device to filter out light that does not correspond to that emitted by the light source 502 to readily identify the desired mote device(s). Alternatively, the mote devices can turn on-and-off, or "flicker" at a prescribed rate to allow for easier identification.

As such, in certain embodiments the ambient light of the region (that differs in frequency or color from the light of the light source 502) does not hide the location of the light source and mote device, and thereupon the location(s) of the light source(s) and mote device(s) can be readily detected. In certain embodiments, light of a different frequency and/or color than provided by the light source 502 can be filtered out to allow a user, or a detecting portion associated with the locating device, to determine whether one or more of the light sources from the mote device(s) 11 are emitting light of that particular frequency. Such filtering techniques can be utilized by a person or imaging portion of the locating device to improve locating and/or identifying such mote device(s) that should be located.

Some implementations shown/described herein include various separate architectural components. Those skilled in the art will appreciate that the separate architectural components are so described for sake of clarity, and are not intended to be limiting. Those skilled in the art will appreciate the herein-described architectural components, such reporting entities, logs, and/or device entities, etc. are representative of substantially any architectural components that perform in a similar manner. For example, while some implementations show reporting entities obtaining information from logs created with device entity data, those skilled in the art will appreciate that such implementations are representative of reporting entities obtaining the data directly from the device entities. As another example, while some implementations show reporting entities obtaining information produced by device entities, those skilled in the art will appreciate that such implementations are representative of executing sensing of parameters, or some other operation, at the mote device(s) 11 or 200. In certain embodiments, the mote device(s) 11 or 200 can extract and/or transmit similar information as that described in the relation to the reporting entities and/or device entities. For example, some multi-mote log creation agent making a query of a database location entity resident at the mote device(s) within the mote network, where the database entity would perform in a fashion similar to that described in relation to reporting entities, logs, and/or device entities, etc. based at least in part on locating the mote device(s). Changes of locations of certain mote device(s) 11 within the mote network 10 would be reflected in certain embodiments of the multi-mote log creation agent and/or database. Thus, those skilled in the art will appreciate that the architectural components described herein are representative of virtually any grouping of architectural components that perform in a similar manner.

Figure 6:
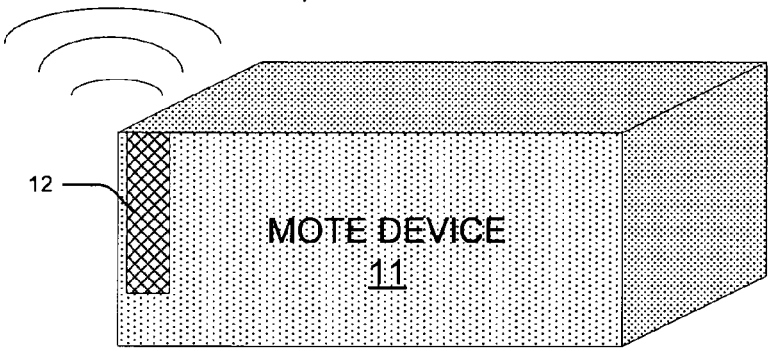
FIG. 6 shows a view of yet another embodiment of the mote device that is configured to be located.

As described with respect to FIG. 6, certain embodiments of mote device(s) 11 can provide a location indication as described herein by generating a signal (optical, acoustic, vibration, or other) using the antenna 12 or other suitable portion of the mote device. In certain embodiments, the emitted signal 510 can thereby act as a location indication by indicating the location of the mote device(s) for any of the reasons described in this disclosure, and substantial equivalents thereto. For example, perhaps the mote device(s) receiving the signal is reaching a relatively low energy and/or power state, and could be located to be recharged and/or replaced; the locating device 50 could locate the mote device(s) which may simplify recharging, servicing, maintaining, replacing, repositioning, or performing some other operation with respect to the mote device(s). In another embodiment, perhaps the memory storage capabilities of the mote device(s) is reaching its filled state, and thereby the locating device 50 could assist in locating the mote device(s).

Figure 7:
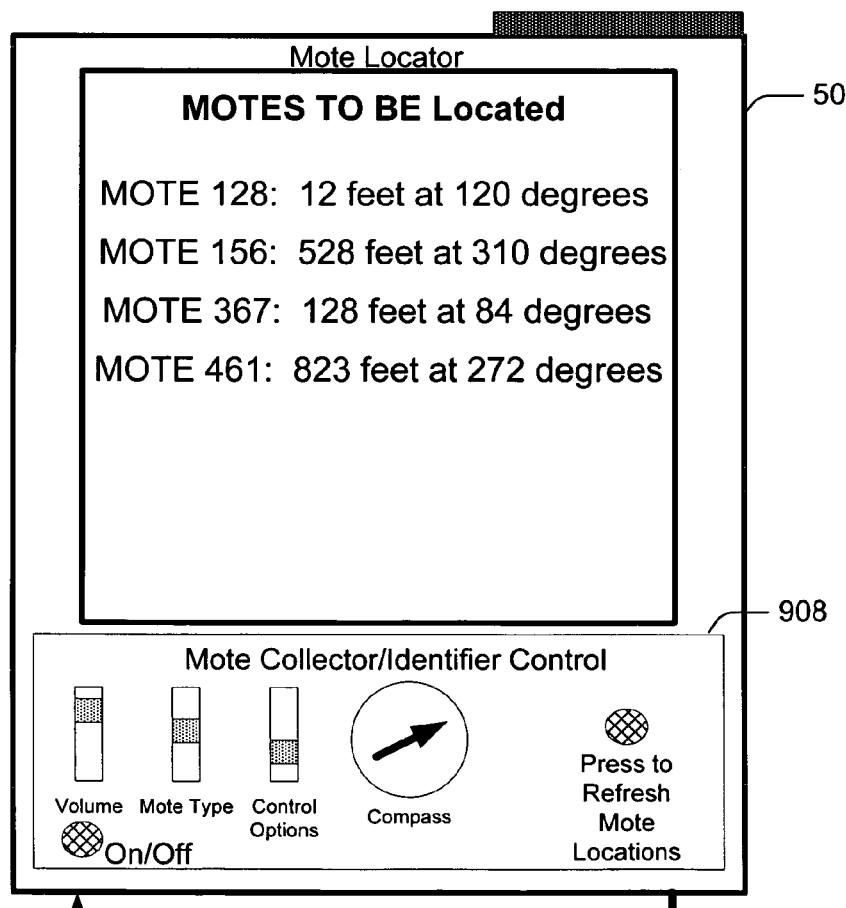
FIG. 7 shows a front view of one embodiment of a locating device that can be used to locate mote devices.

This disclosure provides certain embodiments of the locating device 50, as described with respect to FIG. 1. FIG. 7 shows an embodiment of the locating device 50. Certain embodiments of the locating device 50 can be designed to locate mote device(s). The embodiment of the locating device 50 as described with respect to FIG. 7 can be used by an individual, and identify the individual identities and/or locations of the mote device(s) 11. The embodiment of the locating device 50 as described with respect to FIG. 7 is intended to be programmed to automatically locate the mote device(s) 11, which can rely on interrogation signals to the mote device(s) to locate the mote device(s).

Certain embodiments of the locating device 50 that can rely on earth-based coordinates can utilize positional information, such as provided by global positioning systems (GPS, many of which are commercially available), RNAV, very-high-frequency omni-directional range (VOR), radio locating/ranging, or other positioning devices. In other embodiments, the locating device can locate mote device(s) with respect to some other coordinate axis. For example, certain embodiments of the locating device 50 that locates mote device(s) 11 that are located at within a vehicle or some fixed-structure, such as within an automobile engine or an interior of a power plant, could rely upon some coordinate axis defined respectively with respect to that automobile engine or interior of the power plant. Additionally, certain embodiments of the locating device 50 that locates those mote device(s) that are positioned within a room, building, parcel of land, etc. can conveniently establish the coordinate axis with respect to that room, building, or parcel of land. As such, the selection of a particular coordinate axis by which the locating device 50 operates may depend largely upon the location of the mote device(s) 11 themselves, and any associated users of the mote device(s). In certain embodiments, a user or designer of the mote device(s) could thereby determine a convenient coordinate axis depending upon the location of the mote device(s). These examples of relative coordinates between the locating device 50 and the mote device(s) 11 are intended to be illustrative in nature, and not limiting in scope.

In certain embodiments, similar to those described with respect to FIG. 8, the operations of the locating device, or a mote locating portion, can be largely automated. Such automation techniques can be used to identify each mote device(s) 11 to be located by the locating device 50. As such, the locating device 50 can rely upon a variety of automated techniques (e.g., such as noted to be understood to those skilled in the robotics arts), to locate those particular mote device(s) 11 either based on an identity of the mote device, or some classification of the mote device. An example of such a classification may be all mote device(s) that are associated with a particular mote network and are located within a particular geographic region.

Certain embodiments of the locating device could be operationally "directed" at those mote device(s) 11 that could be located using, for example: emitted signals 510 or optical sensable color that could be output by the mote device(s) 11 (e.g., as described with respect to FIG. 4 or 5), positional and/or locating information that could be provided by the mote device(s), an audio, light, or other signal that could be output by the mote device(s) and/or thereupon detected by the locating device, and/or any other type of signal or indicator that could indicate the relative location, or the geographic location, of the mote device(s).

Such automated or manual locating of mote devices could rely upon the locating device 50 moving around an area where mote device(s) are located, until they come in contact with those mote device(s) that are to be located. For instance, certain embodiments of the locating device to be capable of propelling itself in a manner to more easily ascertain locating of one or more mote device(s). As such, certain embodiments of the locating device 50 could be mounted on wheels, tracks, skids, or other propelling device, and could thereby be propelled to ease in their moving towards the located mote device(s) 11 during their locating process.

II. Examples of Locating Devices, and Locating Mote Devices

Certain embodiments of this disclosure relates, in general as described with respect to FIGS. 4 to 7, to techniques that can be used to locate one or more mote device(s) 11 as described with respect to FIGS. 1 to 3. Such locating can utilize a variety of accordance systems, such as, but not limited to: locating some absolute geographic position (e.g., using GPS or other positional techniques), or locating the mote device or other device relative to some other device, structure, individual, landmark, etc. Certain mote device(s) can be operated either individually or within the mote network 10. As described in this disclosure, certain embodiments of the mote device(s) 11, or simply "motes", can provide a wide variety of parameter sensing operations for one or more devices. Additionally, certain embodiments of mote device(s) 11 can perform a large variety of actuating operations for non-mote devices and/or other mote device(s) by which one or more mote device(s) can actuate other device(s). Also, certain embodiments of the mote device(s) can actuate one or more devices such as display element(s), as described within this disclosure. Such mote device operations may rely on, and be improved by, relatively precise locating of the mote device(s). This disclosure thereby provides a technique by which the one or more mote devices may be located such location of the mote device(s) can occur either in a stand-alone configuration and/or as a part of the mote network 10.

A variety of wireless communication techniques can thereby be applied to a variety of networked mote devices. Certain embodiments of mote device(s) 11 can be configured to sense one or more of a variety of parameters such as, but not limited to, temperature, pressure, certain electrical/magnetic characteristics, position, velocity, inertia, presence or absence of individual persons, objects, vehicles, moisture, etc. Such data or information can relate to sensed parameters which can be transmitted and received (utilizing wireless and/or wired-based communication techniques), between mote device(s) 11, one or more computers/controllers 18, and/or one or more locating device(s) 50 as described with respect to FIG. 1.

Mote devices can be arranged in a variety of operational configurations, perform a variety of operations, be constructed utilizing a variety of techniques and/or technologies (discrete component miniaturization, VLSI, ULSI, semiconductor fabrication, etc.), and be sized in a variety of dimensions. The embodiments of mote devices as described with respect to FIGS. 1 to 3, and throughout the remainder of this disclosure, can be controlled by a variety of the computer/controller 18 and are therefore intended to be illustrative in nature and not limiting in scope.

One embodiment of the mote devices 11, as configured with respect to FIG. 1, can include a communication interface 13, a sensor portion 15, a power source 25, and a controller portion 19. In certain embodiments, the communication interface 13 can be configured to provide communications of signals and/or transfer of sensed data with other devices that can include, but are not limited to, the mote device(s) 11, the locating device 50, and/or the computer/controller 18. In one embodiment, the communication interface 13 can include an antenna 12. Certain embodiments of the antenna 12 may operate at radio frequencies, optical frequencies, infrared frequencies, etc. to provide a wireless link between mote devices, computer/controllers 18, etc. The communication interface 13 can thereby provide a transfer of such signals and/or information to other mote devices 11, the locating device 50, and/or the computer/controller 18.

Certain embodiments of function portion 15 can be configured to perform one or more operations at the mote device(s) 11, such as sensing one or more parameters, actuate a device, or control or serve as at least one display element as described in this disclosure. A variety of such parameters that can be sensed are described with respect to the various devices 140, 142, 144, 156, 158, and/or 160 as described with respect to FIGS. 2 and 3. These parameters that can be sensed, the devices to sense the parameters, the devices that can be actuated, and the display elements that can be provided are intended to be illustrative in nature, and not limiting in scope. It is envisioned that the rate at which each of these individual parameters are sensed may be controlled depending upon the particular configuration of the mote device 11 that can include, but is not limited to: sensed parameter(s) for the mote device, user input to the mote device, general operational speed of the mote device(s) 11, etc. In certain embodiments, the operating characteristics of certain embodiments of the mote device(s) can be controlled and/or determined by the computer/controller 18.

Certain embodiments of the controller portion 19 can include, but is not limited to, a processor 605, a memory 607, a circuit 609, and an input/output (I/O) 611. The controller portion 19, as well as its component, can rely on computing architecture and technologies, such as utilized by a computer processor, a microprocessor, or a microchip, etc. FIG. 1 also illustrates two other devices (the computer/controller 18 and the locating device 50) that include similarly referenced components: 605, 607, 609, and 611. The devices 11, 18, and 50 are each provided with similar component reference characters 605, 607, 609, and 611 that are recognizable as pertaining to computer/controller components that can be included in each of the devices 11, 18, or 50, and can rely on similar computer architecture to provide their computer and/or controller technology. For example, each device 11, 18, and 50 can rely on any combination of hardware, software, and/or firmware as is generally understood by those of ordinary skill in the computer, microprocessor, and/or controller technologies. As such, certain mote sensing and/or operation processes can be performed by any one of, or any combination of, the devices 11, 18, and/or 50.

Many embodiments of the mote device 11 can be configured to be quite small (e.g., in many embodiments less than an inch, and perhaps utilizing miniaturized device processing techniques (e.g. VLSI down to and including the nanoscale or the picoscale), and thereby mote devices can be distributed in relatively large numbers within an area to be sensed. As such, the mote device(s) 11 can be configured to perform their sensing or operation functionality relatively unobtrusively. Additionally, many embodiments of mote devices can be configured to be powered by a relatively low-power device such as, for example, a battery (e.g., double-A) or power cell as a power source. For many of the reasons described in this disclosure, ensuring a longevity of operation (or a reliable intermittent or sporadic operation) for the power source, when desired, can become an important consideration for many embodiments of this disclosure.

Locating many embodiments of mote devices with considerable precision can be challenging, especially considering the relatively small dimensions, large numbers, imprecision of distribution, and varied applications, etc., of the mote device(s). Many embodiments of mote device(s) 11 can be operationally positioned in a variety of dangerous and/or difficult for a human to reach, access, and/or locate locations. As such, it may be difficult to serve as such mote device(s) 11 such as by ensuring that they are operating properly, are properly configured, and are therefore capable of sensing a variety of parameters or performing a variety of operations.

Certain embodiments of the mote device(s) 11 can be located at various difficult to reach locations such as, but not limited to: an operating automobile or aircraft, along a roadway or field, within a nuclear power plant, at various locations in the human body such as may be desired to access during surgery, underseas at a variety of locations, deep in a forest or high on a mountain, etc. As such, many embodiments of mote device(s) can, in general, perform a variety of operations as described above at a variety of locations. Some of the locations that the mote device(s) are to be located may be remote and/or hostile for individuals. Due to the relatively low cost of certain embodiments of the mote devices, it is envisioned that the mote devices can be distributed in relatively large numbers such as to provide a gradient of sensed parameters or provide a variety of operations (such as within a relatively small area). Many of the applications for mote devices can demand a considerable amount of reliability from the power source 25 and/or can be exceedingly difficult to replace the power source 25 thereto (as described with respect to FIG. 1) or other important component(s).

Certain embodiments of the power source 25, depending upon their intended use and design, can be configured to provide power to the mote device 11, as well as the communication interface 13 and the sensor portions contained therein. In different embodiments, the power source 25 can be configured as a battery (chargeable and/or disposable, or other), a power supply, and/or a power reception device that can receive power from outside of the mote device. In certain embodiments, a power reception device can convert the power received; for example, a solar panel can be attached to the mote devices 11, and the energy received from the solar panel can be converted using the power converter portion 17 to one that can be used to power the mote device(s) 11. In an alternate embodiment as described in this disclosure, energy contained in a received signal can be converted into frequency and/or form of energy that can be utilized by the mote device(s) 11 to power the mote device(s). These and other configurations of operations of the communication interface 13, the sensor portion 15, and the power portion 17, are provided as illustrated within this disclosure, and are not intended the limiting in scope.

The computer/controller 18 can be configured as a variety of computers and/or controllers to control or provide at least some sensing operations of the mote devices 11 (and/or the other devices 18 or 50, as described with respect to FIG. 1), and/or receive, store, of otherwise process at least some sensed output parameters from the mote devices 11 and/or the other devices 18 or 50. In different embodiments, the computer/controller 18 can be configured as a standalone computer, a laptop computer, a desktop computer, a microprocessor, a microcomputer, a mainframe computer, and/or any other type of computer that can process data or other information relating to sensed parameters such as provided by the mote devices 11 and/or the other devices 18 or 50. The configuration of the computer/controller 18, as described with respect to FIG. 1, is intended to be illustrative in nature and not limiting in scope; more detail relating to the devices 11, 18, and/or 50 are provided in this disclosure.

The positioning of the mote devices 11 can be determined by the user, owner, other person, machine, computer, etc. depending upon the particular parameters that are desired to be sensed. In certain embodiments, after the mote devices 11 have been positioned, a location of the mote device(s) can be determined using certain techniques, and the position utilized to provide communications between the particular mote devices. In certain embodiments, for example, mote devices 11 can be distributed within a building, house, or other structure to determine particular sensed parameters with respect to that structure. In certain embodiments, it may be desired to locate other devices 18 or 50 that are associated with the mote device(s) 11 and operational proximity to the mote device(s) 11 (as described with respect to FIG. 1). In other embodiments, for example, mote devices 11 can be distributed along roadways, walkways, runways, etc. to determine sensed parameters relating to vehicle or personal travel thereupon, actuate a device, or perform some other operation. For example, mote devices 11 could be laid upon the ground, a floor, a walkway, etc.; integrated into structures that are laid upon the ground, a floor, a road, a walkway, etc., or physically embedded within the ground, a floor, a road, or a walkway. In other embodiments, for example, mote device(s) 11 can be distributed across a field, a crop area, in the ground, in a garden, around a families yard, around a secured business or personal area, within forest, etc. to sense parameters or perform some functionality with respect to each particular area. Mote device(s) 11 can, in certain embodiments, therefore be utilized to sense a variety of parameters and/or perform a variety of operations as described within this disclosure.

Certain embodiments of this disclosure relate to the use of one or more of the locating devices 50, as described with respect to FIG. 1. The locating device 50 can determine those mote devices that should be collected, as well as in certain embodiments physically collect one or more mote devices 11. In other embodiments, the locating device can determine those mote devices to collect, and indicate a position of the mote device for another device(s) and/or a user to collect.

Mote devices may be desired to be collected for a variety of purposes that are intended to be illustrative, but not limiting. The variety of reasons can include, but are not limited to: reducing mote device(s) power or battery power, repairing damage to the mote device(s), retrieving certain sensed data or sensed information from the mote device(s), updating sensing operations of the mote device(s), updating other operations of the mote device(s), repositioning of the mote device(s), reconfiguring the mote device(s), and/or repositioning the mote device(s) within an existing mote network, etc.

III. Examples of Computers/Controller(s) with Mote Device(s)

Mote device(s) 11 can be applied to a large variety of sensing, measuring, operation performing, and/or controlling applications, including but not limited to, sensing a variety of parameters as described with respect to FIGS. 1 to 3. It is envisioned that the role of a single mote device(s) 11 can be changed, such as by reconfiguring the user interface, downloading different software, hardware, and/or firmware into the mote device, etc. Changing the role of the mote device(s) 11 can provide different sensing applications and/or actuating applications based at least in part on varying the configuration or operation of software, hardware, or firmware of a computer/controller 18 that can be configured to interface with the mote device(s) 11. This portion describes certain embodiments of the computer/controller 18 that may be configured to allow such functionality and alterability with respect to the mote device(s) 11, the computer/controller(s) 18, and/or the locating device(s) 50. As such, the processor 605, the memory 607, the circuits 609, and/or the input/output 611 are illustrated as components of the mote device(s) 11, the computer/controller(s) 18, and the locating device(s) 50 since each of these devices can be configured to perform processing operations and/or sense parameters at least partially using the mote device(s) 1. It is to be understood that the components 605, 607, 609, and/or 611 can be configured to perform similar or different task(s) in the mote device(s) 11, the computer/controller 18, and the locating device 50.

Certain embodiments of the mote device(s) 11 utilize processing, timing, filtering and/or other techniques when performing a variety of sensing operations. Such processing, timing, filtering, and/or other techniques can be at least partially performed and/or controlled within each individual mote device(s) 11 by using the controller portion 19. In many embodiments, the processing, timing, filtering, and/or other techniques can be at least partially controlled, externally of the mote device(s) 11, using the computer/controller 18. In many embodiments, the controller portion 19 integrated in certain embodiments of the mote device(s) 11 can interoperate with the computer/controller 18 using known networking techniques. As such, depending upon the particular mote design, application, configuration, etc., a certain amount of the control or performing the operations of each mote device(s) 11 can be provided either within the controller portion 19, or alternatively within the computer/controller 18.

FIG. 1 shows one embodiment of the computer/controller 18 (which can be embodied as a computer, microprocessor, microcontroller, electromechanical controller, etc.) as can be integrated within certain embodiments of the mote device(s) 11 to assist in providing the sharing of at least portions of data and/or other information associated with those mote device(s). In certain embodiments, the computer/controller 18 can alternatively be referred to as a base station. Certain operations and/or structures, as described with respect to the computer/controller 18 which is distinct from the mote device(s) 11; can also apply to the controller portion 19 that is integrated within the mote device(s) and/or the locating device 50. As such, the particular location of software, hardware, and/or firmware that controls operation of the mote device(s) 11 can be distributed across the mote network, at least to those locations including the mote device(s) 11, the locating device 50, and/or the computer/controller 18. Certain sensing-related aspects such as synchronization and/or designation of aspects (as may be described within this disclosure) can be performed by the computer/controller 18, the controller portion 19, and/or the locating device 50. As such, in different embodiments, the mote device(s) can be operably coupled to each other, the locating device 50, and/or the computer/controller 18 and much of the associated processing can be performed by any one of these devices, in a manner known by those skilled with the computer-networking technologies.

As described within this disclosure, multiple embodiments of the mote device(s) 11 may be able to transfer a variety of data and/or information, etc. to each other via the antennas 12. One embodiment of the computer/controller 18 (that therefore may also be included in the controller portion 19 and/or the locating device 50) includes a processor 605 such as a central processing unit (CPU), a memory 607, circuit or a circuit portion 609, and an input output interface (I/O) 611. In certain embodiments, the I/O 611 may include a bus (not shown). In certain embodiments, the processor 605 can have a more limited capacity than perhaps a CPU, such as would occur if the computer/controller 18 included a microprocessor or microcomputer. Different embodiments of the computer/controller 18 can be a general-purpose computer, a specific-purpose computer, a microprocessor, a microcontroller, a personal display assistant (PDA), and/or any other known suitable type of computer or controller that can be implemented in hardware, software, electromechanical devices, and/or firmware. Certain portions of the computer/controller 18 can be physically or operably configurable in each mote device(s) 11 such as described with respect to FIGS. 1 to 3. In certain embodiments of the mote device, the processor 605 as described with respect to FIG. 1 performs the processing and arithmetic operations for the computer/controller 18. The computer/controller 18 controls the signal processing, database querying and response, computational, timing, data transfer, and other processes associated with the mote device. In certain embodiments, one or more simplified versions of the computer/controller 18, the controller portion 19, and/or a similar controller in the locating device 50 (not illustrated) can be provided with respect to FIG. 1, and could be configured to provide a transfer of data or other information and/or data between multiple mote device(s), the computer/controller 18, and/or the locating device 50.

Certain embodiments of the memory 607 include random access memory (RAM) and read only memory (ROM) that together store the computer programs, operands, and other parameters that control the operation of the mote device. In certain embodiments, the memory can include flash memory or other similar memory components. The memory 607 can be configurable to contain the data or information obtained, retained, or captured by that particular mote device(s) 11 (that may be configurable in different embodiments as the peripheral mote device(s) of the obtaining mote device) such as are used to sense or measure a variety of parameters. Certain embodiments of mote device(s) can also be configured to actuate a variety of operations, such as turn a light (e.g., light emitting diode) on or off or control or serve as the display element(s), computer monitor element(s), etc.

In certain embodiments, the bus (not illustrated) can be configurable to provide for digital information transmissions between the processor 605, circuits 609, memory 607, and/or the I/O 611 as described with respect to FIG. 1. In this disclosure, the memory 607 can be configurable as RAM, ROM, flash memory, semiconductor-based memory, or any other type of memory that is configurable to store data or other information pertaining to motes. The bus also connects I/O 611 to the portions of the mote device(s) that either receive digital information from, or transmit digital information to, other devices (e.g., mote device(s) or other devices) of the mote network 10 or associated mote network.

Many embodiments of the antenna 12 can be configured as both transmitting and receiving devices. As such, each one of the mote device(s) 11, the locating device 50, and/or the computer/controller 18 can be configured to transmit information to other devices, as well as to receive information from other devices. Each antenna 12 can be configured to provide effective communications to other devices, and therefore can include, but are not limited to, the radio frequency signals, wireless signals, optical signals, infrared signals, etc.

The memory 607 can provide one example of a memory storage portion that can, for example, store information or data relating to mote sensing, and/or computer instructions relating to device operations, etc. In certain embodiments, the monitored value includes, but is not limited to: a percentage of the memory 607, a certain amount of mote information that is stored in the memory 607, or at other locations associated with the mote information.

The memory 607 can be configured to provide for overflow, primary, secondary, or additional ability for the memory 607 of certain embodiments of the mote device(s) 11, the locating device, and/or the computer/controller 18 (e.g. when the monitored value of data within the memory 607 exceeds a prescribed value). Other embodiments of the memory 607 can be configurable as a mobile random access memory (RAM) device, a flash memory device, a semiconductor memory device, or any other memory device (that may or may not be distinct from the memory 607) that can store data or other information within the memory 607.

In certain embodiments of the mote device(s) 11, the particular elements of the computer/controller 18 (e.g., the processor 605, the memory 607, the circuits 609, and/or the I/O 611) can provide a monitoring function to monitor the amount of data or information therein. Such a monitoring function by the mote device(s) can be compared to a prescribed limit, such as whether the sensed information or data contained in the memory 607, the amount of data contained within the memory 607, or some other measure relating to the memory is approaching some level or value. In certain embodiments, the memory 607 stores data or information relating to the mote device. In certain embodiments the measure relating to the memory approaching some value may pertain to some sensed parameter, such as may be associated with the mote operation.

In certain embodiments, the I/O 611 provides an interface to control the transmissions of digital information between each of the components in the computer/controller 18. The I/O 611 also provides an interface between the components of the computer/controller 18 and different portions of the mote device. The circuits 609 can include such other user interface devices as a display element and/or a keyboard (which can be varied, miniaturized, and/or be provided in a variety of graphical-based user interfaces for certain embodiments of mote device(s)).

IV. Examples of Determining Location(s) of Mote Device(s), and Signaling

FIG. 8 is a block diagram of one embodiment of a system 800 that can be the associated with, or even integrate at least a portion the mote network 10. Certain embodiments of the system 800 can be used to determine locations of the mote device(s) 11, and/or alternately layout of the mote network 10. The mote network 10, as described with respect to FIG. 8, can include one or more mote device(s) 11*a*, 11*b*, and/or 11*c*. Certain embodiments of the mote device(s) can be configured as mote sensors, mote actuators, mote display elements, or other such applications of mote device(s) 11.

Certain embodiments of the mote device 11*a*, as described with respect to FIG. 8, can be similar to as described in this disclosure as the mote device(s) 11 with respect to FIG. 1. Other embodiments of the mote device(s) 11 may be configured differently from that described in this disclosure. One embodiment of the mote device 11*a* can include, but not limited to, logic 813 (which may integrate those elements described with respect to the controller portion 19 in FIG. 1). Certain embodiments of the mote network 10 may be applied to cause the mote device(s) 11 to facilitate similar or additional acts to those as described herein.

Certain embodiments of the mote device 11*a* can include the communication interface 13, as described above. The mote device 11*a* may employ this interface to communicate with other mote device(s) and/or other non-mote devices (either internal of, or external to, the mote network). Communication between multiple ones of the mote device(s) within and outside of the mote network may be accomplished wirelessly using electromagnetic radiation (via radio frequency, using light, using sound, or by other frequency); or alternately using a wired-based communication mechanism such as known in the art.

Certain embodiments of the mote device 11*a* can further comprise the function portion 15, similar to as described above with respect to FIG. 1. The function portion 15 may sense and/or produce light, sound, temperature, pressure, particular molecules, or other such actions as described in this disclosure. Certain embodiments of the function portion 15 can also generate signals that can be used to locate the mote device.

Certain embodiments of a device 811 can provide an example of a device (external device or internal device to the mote network, which may be mote-based or non-mote-based) that may interact with certain one(s) of the mote device(s) 11 or other devices within the mote network. The device 811 may be configured as a personal/laptop/desktop computer, hand-held computing device, wireless device such as digital assistant or phone, or industrial or test equipment, etc. to name just some of the possibilities. Certain embodiments of the device 811 can include logic 813 (similar to the controller portion 19 as described herein with respect to FIGS. 1 and 8) to facilitate certain interactions and/or acts as described within this disclosure.

Certain embodiments of the mote device(s) 11, such as located within the mote network 10, may include image capture device(s) (e.g. cameras—not shown) at different locations. The use of certain embodiments of the image capture device(s) are generally well understood, and will not be described in greater detail.

Considering the relatively small size of certain embodiments of the mote device(s), it may be desired to maintain precise and up-to-date information (e.g., data) about the location, layout, and/or other particulars of the mote network and/or mote device(s) thereof. In other embodiments, it may be desired to be able to locate mote device(s) in a less frequent and/or perhaps a less precise basis. To facilitate determination of device(s) location and/or layout, a signal may be communicated to certain devices within the mote network (henceforth, 'signaling the mote network'), which can thereupon cause at least one mote device(s) of the mote network to provide one or more return signals. Certain embodiments of the return signals may be indicative of locations of certain mote device(s) with respect to the mote network.

Signaling of the mote device(s) within the mote network 10 may cause the mote device(s) to transmit return signals that can be used to derive locations of the mote device(s). For example, in a plant growing environment, mote device(s) 11, 11*a*, 11 *b*, and/or 11*c* may be signaled (e.g., using light, radio-frequency, or other electromagnetic radiation). The mote device(s) 11 may utilize their light actuators/sensors and/or their communications interface 13, as described with respect to FIG. 1 or 8, to communicate with their nearest neighbors and/or perform some operation. Although the mote device(s) may not have sufficient power to communicate back to an external source, it may be possible for their nearest neighbors to detect the response signals.

Certain embodiments of the signaling may be accomplished wirelessly as described above, or alternatively using wire-based transmission mechanisms. In the certain signaling embodiments, the mote device(s) may utilize the energy provided within the signals used during signaling to provide energy or power that can be utilized by one or more return signals. For example, certain embodiments of the mote device(s) 11 may produce a wireless, visual, or acoustic echo of the incident signal. In other embodiments, the mote device(s) may provide a phosphorescent response to signaling with light such as may be useful when the mote device(s) 11, 11*a*, 11*b*, and/or 11*c* are present in a dark nighttime or an underwater environment. When stimulated by a quick, intense light pulse, the mote device(s) 11, 11*a*, 11*b*, and/or 11*c* may phosphoresce, thus providing a marker to their location which could be detected by a person and/or cameras or other image capture devices.

The mote network 10 may be signaled from one or more locations external and/or internal to the at least one mote network, e.g. by the device 811. The signal may be provided to all motes more or less simultaneously, or may propagate through certain ones of the mote device(s) across the mote network 10. Thus, certain location-transferring mote device(s) may receive a signal containing information or data to derive a location of an original mote device, and these location-transferring mote device(s) may provide one or more return signals to one or more neighbor mote device(s), or other device, to provide a location of the original mote device.

The neighbor to mote device(s) may thereupon provide one or more additional return signals, and so on, that can be utilized to derive locations of a number of mote devices across the mote network 10.

For example, certain embodiments of the mote device(s) 11, 11a, 11 b, and/or 11c may operate as a portion of a security system over a large outdoor area. The device 811, that may be configured as an external control device, may communicate to the nearest mote device(s) 11a, 11b, or 11c using the communication interface 13 of the mote device(s) as described with respect to FIGS. 1 and 8, thereby causing the mote device(s) 11c to respond with location information and signal its nearest neighbor 11a. The nearest neighbor mote device 11a may then respond to mote device 11c with its location information, which information will pass on to the device 811. The mote device(s) 11c may signal the neighboring mote device 11a, resulting in the mote device 11c communicating its location.

Signaling the mote network may cause at least one mote device(s) 11a, 11b, and/or 11c to return at least one mote id (and/or certain information such as the impulse-mote-position-indication or other "burst" type signal as described below) that can be used to derive one or more location(s) of the mote device(s). Certain embodiments of the mote id may be used to uniquely identify those mote device(s) 11 that are responding.

In general, certain embodiments of the mote device(s) 11 may respond to the signaling in any manner that can distinguish that mote device(s) across the mote network. For example, mote device(s) may respond with (a) one or more wireless identifiers, (b) one or more identifying light patterns change in reflectivities, and/or colors, or (c) one or more identifying sounds and/or tones. For example, certain embodiments of the mote device(s) can communicate its relative position or location wirelessly by transferring data and/or information that may include a uniquely identifying name, such as their wireless device identifier. Certain embodiments of mote device(s) responding with a light signals may flash in a recognizable identifying pattern. For example, if the last two digits of a particular mote device number is 21, then the mote device could flash 21 times, or alternatively transmit the number 21 using a radio signal. Certain embodiments of the mote device(s) that can be configured to respond using sound may respond to a request to locate themselves by emitting a particular identifiable tone. These identification techniques are considered to be illustrative in nature, but not limiting in scope. For example, by modifying the frequency of response from a base tone by adjusting an amount dependent on the identifier of the mote device(s) 11a, 11b, and/or 11c.

In some cases, the type, characteristics, or state of the mote device(s) may be indicated by the mote device(s) response. For example, mote device(s) configured with temperature sensors might respond to a signal by generating light having a particular desired spectra wavelength. Mote device(s) having pressure sensors might respond by generating light at yellow wavelength, etc. In certain embodiments, the signaling may cause at least one mote device(s) of the mote network to provide return signals indicative of the location of the mote device(s) relative to other mote device(s) as was discussed in the example where mote device(s) 11, 11a, 11 b, and/or 11c returned information identifying their neighbor mote device(s). In certain embodiments, signaling the mote network may cause mote device(s) to provide return signals indicative of an absolute location of mote device(s). For example, mote device(s) 11, 11a, 11 b, and/or 11c used for wildfire sensing may have GPS location capability. In other embodiments, the return information can be used by the receiving device to derive the geographic location, or relative location or distance, of the mote device(s).

Certain implementations of mote networks may tend to involve both types of information; some motes may provide signals indicative of their location relative to other mote device(s), and some mote device(s) may return signals indicative of an absolute location. For example, mote device(s) 11, 11a, 11b, and/or 11c that can be used in a security system monitoring a large outdoor area may be of two types. Some mote device(s) may comprise GPS location capability, sensors, and communication interfaces. Other mote device(s) 11a, 11b, and/or 11c may comprise various sensors and a communication interface. The location of the mote device(s) may be inferred by the known location of their reference neighbor mote device(s), at least partially relying upon calculations of their approximate distance to that neighbor made by using ultrasound or using some other technique.

Some implementations of mote device(s) 11, 11a, 11 b, and/or 11c may interface with the mote network 10 to provide return signals indicative of offsets from one or more previous locations of mote device(s) that have moved or been displaced. For example, in some implementations of the mote device(s) 11, 11a, 11 b, and/or 11c may be provided with a capability for directed movement, such as with mote networks including "robot mote device(s)", in which the robot mote devices can transport or propel themselves. Certain embodiments of mote device(s) that can interface with the mote network 10 may also provide the mote device(s) with a capability to calculate how far and/or in what direction they have moved. Thus, the mote device(s) may, as required, return information on their movement from an initial or previous (perhaps known) location.

To limit occurrences of false return signals within certain embodiments of the mote network 10, a "prep" signal may be provided to the mote network 10, to prepare mote device(s) of the network for a subsequent signal to report location. Thus, a first signal to the mote network may cause the mote device(s) to be responsive to at least one subsequent signal to report location. For example, mote device(s) that can sense sounds propagated within an oil pipeline may detect a sound pattern which indicates, if it is repeated a certain number of times within a prescribed time interval, that they should report their location (and possibly other information at the same time). In certain embodiments, the first two occurrences of the sound pattern can act as an identifying prep signal, and the third signal can act as a trigger.

If frequent shifts in mote location/layout are expected, periodically (possibly automatic) signaling may be applied to cause mote device(s) to periodically provide return signals indicative of their location. For example, the mote device(s) 11, 11a, 11 b, and/or 11c having neutral buoyancy may have been spread over a large lake, whereby they might be expected to follow currents throughout the lake. Certain embodiments of the mote device(s) 11, 11a, 11b, and/or 11c may be queried periodically, whereupon each mote device might identify (or provide information or data that can be used to identify) their current location.

In certain embodiments, the locations/layout of the mote device(s) within the mote network may be expected to shift under certain conditions. In these situations signaling the mote network 10 may involve signaling to cause the mote device(s) to indicate their locations upon occurrence of one or more events and/or conditions associated with changes in location/layout of the mote device(s) (henceforth, "conditional signaling of the mote network"). For example, the mote network 10 may be signaled for location indications for the mote device(s) 11 that provide out-of-range measurements.

Such embodiments of the mote device(s) 11 may have shifted beyond the functional boundaries of the mote network.

Certain embodiments of signaling of the mote network 10 (that may be considered as "conditional signaling") may involve signaling to cause mote device(s) to return information indicative of their location. Signaling may also be used to determine whether the overall mote network overall has changed from an existing configuration, such as if some or all of the mote network has moved and/or been displaced. Conditional signaling of the mote network may be desired upon an occurrence of turbulence that could displace a medium which may support one or more mote device(s) of the mote network 10. For example, if the mote device(s) are suspended in air such as by an air curtain, balloon, mechanism; detecting a change in the prevailing winds that may trigger the signaling. If the mote device(s) are located in water, a change in certain currents or waves may be used to trigger the signaling.

It may be advantageous for conditional signaling of the mote device(s) to occur when it is particularly desired to locate the mote device(s), such as may occur when: a) at least certain ones of the mote device(s) fail, b) when mote device(s) provide out-of-range readings, c) when mote device(s) are removed from the network, or d) when one or more aggregate readings of the mote network (e.g. averages, statistical metrics, etc.) are out-of-range, etc. Certain mote device(s) 11, 11a, 11b, and/or 11c that are included in the mote network 10 with the actuator, sensor, or display function portion 15 may be considered as static, such that once the motes are in place, they are expected to "stick" at their location unless some unexpected event occurs. There may be a variety of other expectable or unexpected scenarios that could re-locate mote device(s) in some manner. For example, certain mote device(s) may have been adhered to a static ductwork structure for a structure such as a building (or bridge). A break in the water pipes for the building may result in water entering the ductwork system, changing the configuration and/or position of mote device(s) within the mote network both by moving or displacing certain mote device(s), and/or by harming the actuator, sensor, or display function portion 15. Wind may also be able to relocate certain mote devices. The mote device(s) within the mote network may thereby be reconfigured by some expected or unexpected event, and locating the mote devices within the mote network may be used for such reconfiguring. Such mote device(s) 11 may be configured to communicate that it has moved, and the readings from the actuator, sensor, or display function portion 15 of mote device(s) 11. Recognition that the mote device(s) 11, 11a, 11b, and/or 11c may have moved or otherwise changed may occur by logic such as provided by the controller portion 19 as described in this disclosure within the mote network 10, or alternately by a logic 813 that may in certain embodiments be integrated into the device 811 (which may be positioned external to the mote network 10 is indicated by reference character 53 of FIG. 8). Similarly, the signal which may result in determining the relative position or location may utilize a response, which may originate either from somewhere within the mote network, or alternatively external to the mote network.

Certain embodiments of mote device(s) may be configured to provide other applications, such as monitoring other such parameters as temperature, pressure, location, dampness, etc. For particular applications, such additional parameters may be useful such as a particular mote device recognizing temperature, pressure, or other such parameters. Signals returned by mote device(s) 11, 11a, 11b, and/or 11c as described with respect to FIG. 8 may be received and processed by one or more mote device(s) that can either be located external to the mote network or within mote device(s) which can be configured to process location information. Certain embodiments of the mote device(s) 11 may employ external processing of the location information, whereas other mote device embodiments may involve internal processing of the location information by the mote network itself. In certain embodiments, both internal and external (to the mote network) processing techniques may be employed. As mote device usage increases, it may be desirable to apply many networking techniques to mote devices.

Certain embodiments of the return signals may be processed to determine which mote device(s) of the mote network could have changed its position (henceforth, 'mote movement determination'). In certain embodiments (where internal processing may be employed), mote device(s) movement determination may involve at least one mote device(s) of the network processing the one or more return signals of their neighbor(s) to facilitate determining whether they (or their neighboring mote device(s)) have changed location. For example, certain embodiments of the mote device(s) 11, 11a, 11 b, and/or 11c may report a location obtained from their neighbor mote device(s), and this location information can also be passed between certain embodiments of the mote device(s). In certain embodiments, the signal strength of the received messages could be identified by each receiving mote. In certain embodiments, the signal strength/distance analysis could be performed either by the receiving mote device(s) or elsewhere, possibly at a central information gathering point such as by the device(s) 811. A determination of little or no movement of the mote device(s) may result whenever the received signal strength was very close in value to that previously received.

In certain embodiments, signals may be repeatedly applied to the mote device(s) or other device(s) within the mote network 10. Capturing (such as by photographing, or otherwise imaging in one, two, or three dimensions) emitted light or other response indications of mote location may be utilized. When light is emitted in response, one or more combined photos may be created that include the captured information. In this manner, a visual record may be compiled indicating which motes have changed location, and their relative layout. A measured topology (layout) of the mote network 10 may be compared with desired or expected network topologies, to determine deviations from the expected or desired layout.

Certain embodiments of stereoscopic imaging applications may involve mote device(s) that are responding to signals using light (e.g. the mote device(s) may light up in response to the signaling). Return signals may also be captured using two or more cameras (or other image capture devices) to provide stereoscopic functionality. The captured return signals may be applied to facilitate one-dimensional, two-dimensional, or three-dimensional location analysis or determinations of the responding motes. Other techniques (e.g., involving microphones and acoustic responses) can also be utilized to assist in multi-dimensional locating of the mote device(s).

Certain embodiments of a device within the mote network 10 (e.g., the computer/controller 18, the locating device 50, or at least one other mote device(s)) may monitor changes in the location or layout of the mote device(s) and/or within the mote network 10. Certain embodiments of the mote device(s) of the mote network may signal other mote device(s) 11 of the mote network for location information (henceforth, 'mote signaling').

Mote signaling may involve mote device(s) signaling neighboring mote device(s) to provide return signals indicative of location, when the neighboring mote device(s) provide out-of-range readings. Out-of-range readings by a neighboring mote device(s) may indicate the mote device(s) has shifted position and is no longer within the functional bounds of the mote network. For example, if mote device(s) 11a is positioned within a building ductwork, and becomes dislodged from its position such as being blown into a room, it may provide lower or higher temperature readings than expected or desired, and its reading(s) upon evaluation may no longer be considered useful. This dislodging and repositioning of some of the mote device(s) 11, 11a, 11b, and/or 11c in the mote network 10 may result in certain mote device(s) utilizing signaling as described herein to locate the mote device(s).

If the neighboring (or other) mote device(s) fail to respond as expected, and/or when the neighbor mote device(s) provide a signal that is below an expected signal strength then one or more of the mote device(s) 11, 11a, 11b, and/or 11c may signal their neighbor mote device(s) for location information. These conditions may indicate that the neighbor mote device(s) have been located, such as by being shifted out of bounds. Within this disclosure, the term "neighboring" or "neighbor" mote device may be intended to apply to nearly proximate mote devices, and not only the directly adjacent mote devices, unless otherwise indicated by the context. For example, several mote device(s) that are closely proximate or neighboring to an inoperative mote device may be utilized to compensate for an inoperable or mal-functioning mote device. If mote devices actuate devices, then the neighboring mote device may be the nearest, a nearby, or a set of nearby mote devices that actuates a similar type device (such as a consistent-parameter sensor or a similarly-colored display element) or performs a similar or related function (e.g. measures a similar or related parameter, or contributes to a related display or the display of related information), and not necessarily the physically closest of any mote device. The term "neighboring" or "neighbor" mote device(s) may also include multiple ones of the nearest mote devices, or multiple ones of the nearest mote devices that are similarly configured or that can perform a similar operation or are members of the same collection or set of motes (e.g. the same network or associated by configuration or function), so that, for example, in the case of more than one such collections or sets that physically overlap, the physically 'nearest' mote device may not necessarily be a directly adjacent mote device. The term "neighboring" or "neighbor" mote device(s) 11 may thereby be applied to multiple mote devices, such that when one mote device becomes inoperable or malfunctions, multiple other neighbor mote device(s) (which may or may not be similarly configured) may each act as a neighbor mote device, and thereupon each act in some manner to compensate for the inoperative mote device.

In the building ductwork scenario described above, for example, certain mote device(s) 11a may be repositioned from its previous neighboring mote device(s) 11b or 11c as to not be able to communicate with its neighboring mote device(s). In other instances, the mote device(s) may be relocated to a new position that is sufficiently distant from its previous neighboring mote device such that the transmitted or received signals therebetween may be weak. Either of these situations may result in the neighboring mote device(s) 11b or 11c initiating signaling by the mote device 11a in an attempt to ascertain their current locations.

The mote network 10 may be signaled for more than just location information. For example, certain or all of the mote device(s) in the mote network may be signaled to cause mote device(s) to provide return signals indicative of their status and/or condition (which can be separate of or include, location signaling). Examples of status/condition include whether the mote device(s) are functioning normally, whether the mote device(s) have stored data available, or whether the mote device(s) are in communication with their neighbors.

There are a wide variety of graphical mapping techniques that can be used to locate mote devices. A visual map and/or layout including graphical indications of locations of mote device(s) may be constructed and/or refined according to received indications of mote device(s) locations. One or more 2D and/or 3-D maps and/or models of the mote network may be formed according to the received indications of the mote device(s) location, and may themselves be useful and locating the mote device(s). This modeling may involve overlaying mote device(s) location indications representing the mote network environment. The graphical location indications may in some implementations be displayed via a projection system, via glasses that a person can wear to display, on a screen, or via a heads-up display, or other display, etc. The information or data that can be used to derive such graphical location indications can be obtained from the mote device(s) during locating the position(s) of the mote device(s). Such information or data can be transmitted using wireless communication techniques, wired data transfer techniques, and/or other network data transfer techniques, as is generally known in the art. Such mapping techniques (that may be used to graph or project the graphical location indications) are known, and commercially available, from the networking mapping arts, and will not be further described herein.

Received indications of mote device(s) location may include location information, data values, images, photographs and/or other representations of the mote network. The mote device(s) 11 may respond to signaling with light, and these light responses may be captured by a camera and used to construct a map/layout of mote locations. For example, certain embodiments of the mote device(s) 11, 11a, 11 b, and/or 11c with the actuator, sensor, or display function portion 15 that are being used to locate fish, for example, can provide phosphorescing response that may be injected into a dark underwater area, such that some are expected to attach themselves to one or more fish which frequent the area. Certain embodiments of mote device(s) which do not attach to the fish may thereupon depart the area along with the current. Strobes of light (which may vary in intensity and rate to be identifiable) may be flashed frequently enough to maintain the fluorescing effect; and image capture device(s) such as imagers, capturing devices, and/or cameras may obtain moving images and/or periodic stills. The resulting images may be analyzed to provide a changing map of mote positions, and thus the fish.

Graphical location indications may indicate which mote device(s) have changed position or which are in a wrong or unexpected position. The graphical indications may also indicate which mote device(s) is absent (or not functioning) at an expected location. For example, in the ductwork application provided above, a two-dimension representation of the horizontal ductwork with sensing mote locations may be available for each building floor. Normally working mote device(s) 11, 11a, 11b, and/or 11c may be shown in with differing color (e.g., green, yellow, or orange) circles, depending on the temperatures they are reporting. A suspect or non-working mote device(s) 11, 11a, 11b, and/or 11c may appear in its last known location as a distinctive color and/or shape such as a flashing red triangle.

With certain embodiments of graphical mote device locating techniques, the resulting graphical indications may reflect one or more received indications of mote status and/or condition, and/or overall statuses and/or conditions of the mote device(s) within the mote network itself. In the example where mote device(s) are secured within a ductwork of the building, indications of both suspect mote device(s) data values and suspect mote device(s) locations may be distinctively imaged or captured by using the graphical mote device locating technique. When suspect conditions are found to be pervasive or prevalent, for example if several of the mote device(s) 11, 11*a*, 11 *b*, and/or 11*c* in a mote network are no longer reporting data or are reporting suspect data, an overall network graphic or menu might be shown having different color, flashing, with more bold, or in any other visually distinctive manner. For example, a map displaying mote device(s) locations might have its borders and easily detectable color such as a flashing red. As such, it should be evident that locating mote device(s) can be utilized in a variety of mote device scenarios. Certain embodiments of the device 811 may be associated with a transceiver 815, which can be utilized in transmitting or receiving signals as described with respect to FIG. 9 that may be utilized to locate one or more of the mote device(s) 11. Such transceivers 815, many of which are commercially available, may utilize RF, optical, and/or other electromagnetic frequencies to transmit or received signals.

Figure 9:
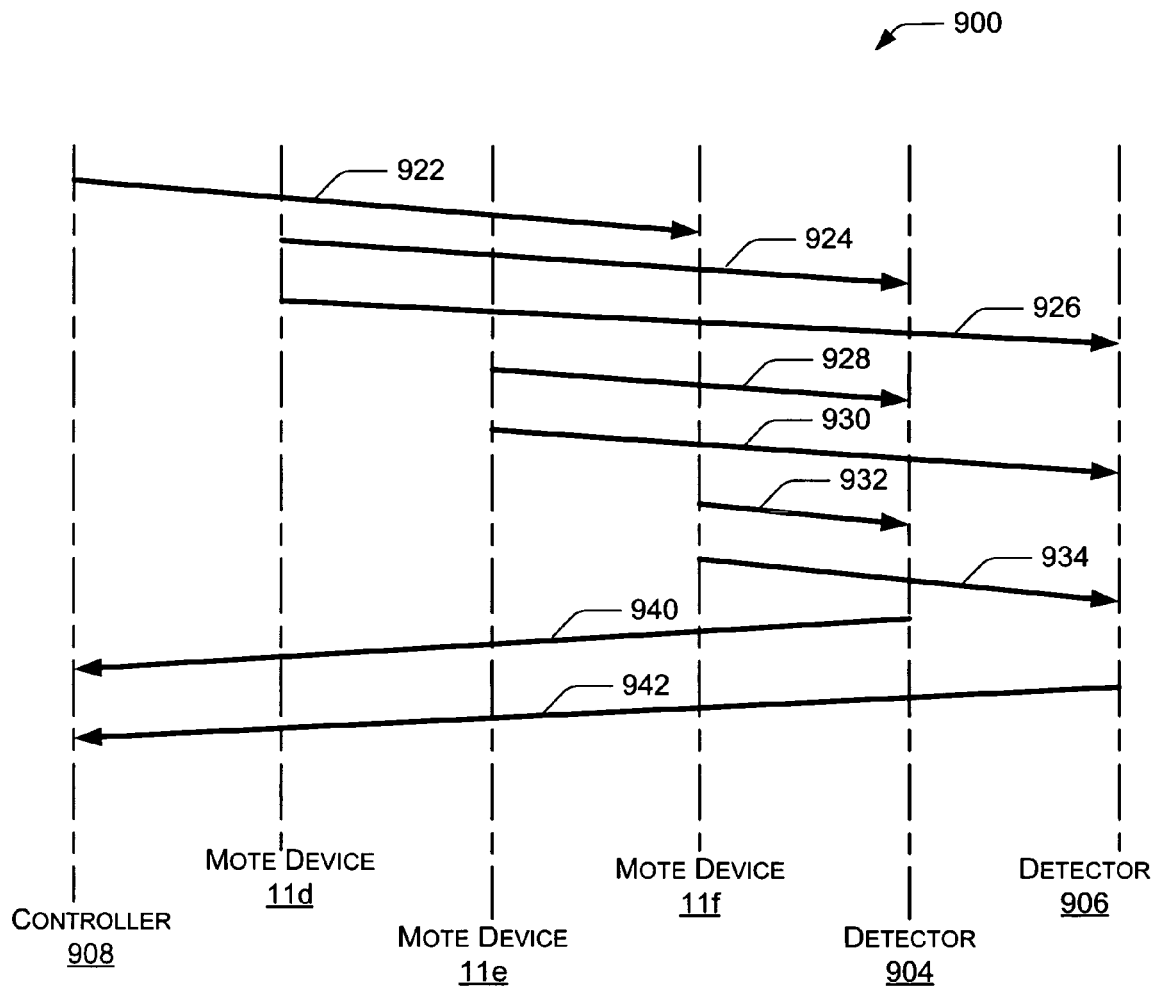
FIG. 9 shows a signal diagram of one embodiment of communications between mote device(s) or other devices to locate the mote device(s)

FIG. 9 shows a flow diagram of one illustrative (but non-limiting) embodiment of a process of determining mote locations and/or mote network layout, and one illustrative embodiment of the signaling that can be associated therewith. Other embodiments, which are within the scope of the appended claims can be considered as within the scope of the present disclosure. In one embodiment, the controller 908 as described with respect to FIG. 9 may generate a signal 922 that indicates an attempt to locate one or more mote device(s) 11. With signal 922, the controller 908 as described with respect to FIG. 1 (which may be integrated within the device 811 of FIG. 8; or alternatively one or more computers/controller 18 such as the base station, locating device(s) 50, and/or other controller motes of the mote network as described with respect to FIG. 1) can provide a signal to the mote device(s) of the mote network. In some cases, the signal 922 may be provided to those mote device(s) 11 that are located closest to the controller, or to mote device(s) that are specifically enabled to recognize the controller signal. Other scenarios of signaling selected or unselected mote device(s) may also be utilized. In some implementations, the controller 908 may in fact form a part of the mote network signaled, or alternatively may be remote from the mote network.

Certain embodiments of the mote device(s) 11*d*, 11*e*, and/or 11*f* that receive the signal 922 can thereupon respond with location information, such as by transmitting data that can indicate their relative location within the mote network, their geographic locations; or alternatively activating a light-emitting diode at their present location that can be detected by a locating device or an individual locating the mote device(s) 11. Certain embodiments of the response(s) (e.g., 924, 926, 928, 930, 932, and/or 934) may be recorded or detected by various detectors at different locations. For example, certain embodiments of the respective response(s) 924, 926 that can be generated by the respective mote device 11*d*, 11*e* may be recorded by respective detectors 904, 906. Additionally, certain embodiments of the respective response(s) 928, 930 as generated by the respective mote device 11*d*, 11*e* may be recorded by respective detectors 904, 906. Also, the certain embodiments of the respective response(s) 932, 934 as generated by the respective mote device 11*e*, 11*f* may be recorded by the respective detectors 904, 906. The respective detectors 904 and 906 can thereupon receive the responses to the controller 908 using the signals as described with respect to FIG. 9.

Certain embodiments of the respective detectors 904 and 906 may provide respective recorded responses 940, 942 (that pertain to the mote device(s)) that are to be received by the controller 908. In certain embodiments, as described above, the controller 908 may be included alternatively in the mote device 11, the computer/controller 18, and/or the locating device 50 as described with respect to FIG. 1. In certain embodiments, the controller 908 may then thereupon process the recorded responses 940, 942 into graphical indications of mote location and/or layout. Upon consideration of FIG. 9.

Certain embodiments of locating of the mote device(s) 11 within the mote network 10 may be useful of determining that the mote device(s) still form a regular pattern in which they had been configured. Alternatively, locating of the mote device(s) 11 within the mote network may also be useful if the mote devices are arranged in a more irregular pattern. Locating the mote device(s) may also be useful to determine if a relative or geographic position of the mote device(s) within the mote network have been modified, or have changed. As such, it is to be understood that there are a variety of reasons why it may be desired to locate one or more mote device(s) 11 within a particular mote network 10.

One embodiment of the locating technique as described with respect to FIG. 9 is applied in FIG. 10 to certain ones of the devices that had been described with respect to FIG. 1. For example, the locating device 50 that is intending to locate the mote device(s) 11 transmits an original signal thereto. Thereupon, the mote device 11 transmits its response (in one instance in the form of the impulse-mote-position-indication) that is illustrated as being received by the detector 904. In certain embodiments, the detector 904 may be an optional device, and the response may be returned directly from the mote device 11 to the locating device 50. Many embodiments of the impulse-mote-position-indication can represent a relatively low energy/power signal containing relatively little data, but which may be transmitted at a precise time such that it may be used in locating the mote device(s) 11.

In certain embodiments, the detector 904 upon receipt of the response thereupon transmits the recorded response to the locating device 50. The recorded response, similar to the response, can in many embodiments contain sufficient locating information to be used by the locating device 50 to locate the mote device 11 with respect to the locating device 50, with respect to some geographic location, or with respect to some alternative coordinate axis. In certain embodiments, the recorded response can be an exact copy of the response, and thereby contain a copy of the impulse-mote-position-indication. In other embodiments, the recorded response can be modified to compensate for a relative position between the mote device 11 and the detector 904. As such, the detector 904 may transmit relative information of a number of mote device(s) 11 with respect to the detector 904, and the locating device 50 can thereupon compensate for differences in location between the detector 904 and the locating device 50.

Those skilled in the art will recognize that it is known in the art to implement devices and/or processes and/or systems in the fashion(s) set forth herein, and thereafter engineering and/or business practices can be used to integrate such implemented devices and/or processes and/or systems into more comprehensive devices and/or processes and/or systems. As such, it should be understood that locating a number of the mote device(s) 11 can be valuable depending upon an intended operation, goal, or function of the mote device(s) with respect to the mote network 10. In certain embodiments, at least a portion of the devices and/or processes and/or systems described herein can be integrated into comprehensive devices and/or processes and/or systems by using a reasonable amount of experimentation. Those having skill in the art will recognize that examples of such comprehensive devices and/or processes and/or systems might include, as appropriate to context and application, all or part of devices and/or processes and/or systems of a large variety of technologies including, but not limited to (a) an air conveyance (e.g., an airplane, rocket, hovercraft, helicopter, etc.), (b) a ground conveyance (e.g., a car, truck, locomotive, tank, armored personnel carrier, etc.), (c) a building (e.g., a home, warehouse, office, etc.), (d) an appliance (e.g., a refrigerator, a washing machine, a dryer, etc.), (e) a communications system (e.g., a networked system, a telephone system, a Voice over IP system, etc.), (f) a business entity (e.g., an Internet Service Provider (ISP) entity such as Comcast Cable, Quest, Southwestern Bell, etc.); (g) a wired/wireless services entity such as Sprint, Nextel, etc.); (h) a display device or system, etc.

V. Examples of Impulse-Mote-Position-Indication

While certain generalized embodiments of the locating of the mote device(s) 11 with respect to the mote network 10 have been described herein, particularly with reference to FIGS. 1, 8, and 9, this disclosure also describes a number of embodiments of locating a mote device that can utilize one or more impulse-mote-position-indication techniques. In general, certain embodiments of the mote device(s) 11, as described with respect to FIG. 10, can be capable of providing an impulse-mote-position-indication that can be used by another device (e.g., another mote device, the computer/controller 18, etc.) to derive the location or position of the mote device. The impulse-mote-position-indication can be used by other mote device(s) 11, the computer/controller 18, the locating device 50, and/or other processor-based devices (located either within or external of the mote network) to derive a position of the mote device(s).

Certain embodiments of the impulse-mote-position-indication can be considered an impulse or burst type signal that is generated from the mote device(s) 11 to be located. Certain embodiments of the impulse or burst type signals forming the impulse-mote-position-indication can provide a similar type of location information utilizing a relatively small amount of power or energy. Considering that in many embodiments of mote device(s), energy and/or power can be important in determining those types of operations that certain embodiments of the mote device(s) can perform, as well as a duration that the mote device(s) can perform those operations within the mote network 10.

Certain embodiments of locating mote device(s) within mote networks can rely on the mote device(s) precisely responding as instructed by another device in providing the impulse-mote-position-indication. For example, locating of certain mote devices can be performed using triangulation techniques by which multiple mote devices can commit an original interrogation signal, and other mote devices can respond to each interrogation signal by a uniquely identifiable impulse-mote-position-indication, which may take the form of a burst signal. Provided that the time that each mote device 11 can transmit their impulse-mote-position-indication in response to the original interrogation signal is known, the distance between each interrogated mote device from the interrogating mote device can be determined.

Thereupon, another mote device can assume the role of interrogator, and transmit its own interrogation signal. Depending upon the desired precision, a number of mote devices can act as an interrogator to determine the distance they are away from each interrogated mote device. Triangulation can be performed by considering distances between multiple ones of the mote device(s), utilizing techniques known in geometry and utilized by a variety of computer-processing programs such as GPS programs, to determine relative positions of multiple mote devices. In certain embodiments, the interrogating device can be one of the mote device(s) 11, one of the computer/controller 18, one of the locating device 50, or alternatively another device.

With certain embodiments of impulse-mote-position-indication, relatively little power has to be utilized to generate the impulse-mote-position-indication and/or the interrogation signal. For example, consider that certain embodiments of mote device(s) can reflect light, ornamental light of a prescribed color or frequency, etc. As such, it may not be necessary to transmit large amounts of information and/or data relating to location to mote device(s).

VI. Examples of Power Conversion

Certain embodiments of the mote device(s) 11 can thereby include the power converter portion 17 that may be configured as a power source. Certain embodiments of the power converter portion 17 can thereby be configured to provide power or energy to the mote device(s) during its normal operations. Different embodiments of the power converter portion 17 can be located internally to, or external of, the mote device(s). Certain embodiments of the power source can be rechargeable in such a manner that upon recharging, the power or energy contained within the mote device(s) can be increased, thereby be potentially acting to increase an energy-limited normal operating duration of the mote device(s).

Certain embodiments of this disclosure concern converting power or energy (e.g., from a signal) into a form that can be used by the mote device(s) 11. Such power conversion may take a variety of forms that could include recharging a rechargeable power supply of the mote device(s). Within this disclosure, adding power to the mote device(s) may include, but is not limited to: a) recharging a rechargeable power source in active mote devices, b) adding power to the mote device(s) to thereby act as at least a partial power source for passive mote device(s) to provide operational power to the mote device(s), and/or c) adding additional power to the active mote device(s) to allow the mote device(s) to perform some action (e.g., sensing, communicating, activating, etc.) that the mote device(s) would not be able to perform (or would lose undesired energy in performing) based on the energy contained in their power source.

It is not necessary that each mote device(s) utilize energy directed particularly to that mote device, or even to mote device(s) in general. Instead, both active mote devices and passive mote devices can rely on the energy of a signal transmitted to another mote device(s), or indeed a signal that is transmitted to another device that is not a mote device. As such, certain embodiments of the mote device(s) 11 can rely on a high level of energy or power from signals (e.g., electromagnetic radiation) that exists where the mote device(s) is located, such as from power transmission lines. Within this disclosure, the terms "signal" or "power" may be intended to apply to some transmission of electromagnetic radiation that may or may not be used for communication purposes, unless otherwise indicated by the context. The electromagnetic radiation can include, but is not limited to, optical, infrared (both deep and narrow), ultraviolet (both deep and narrow), radio-frequency, acoustic, voice, etc. Adding power to the mote device(s) may allow those embodiments of the mote device(s) that are passive, or underpowered, to perform some mote action such as being able to sense parameters, actuate devices, and/or control or serve as display elements, etc.

VII. Examples of a Mote Device Affecting a Presentation

This disclosure describes a number of embodiments of affecting at least one presentation based at least in part on the at least one position or location of the at least one mote device.

Certain aspects of the affecting the presentation can be utilized to guide, attract, repel, or otherwise influence an inanimate object or organism to be displaced relative to the mote device(s) are an associated object. Within this disclosure, it is envisioned that a number of mechanisms which can be used can be actuated by the mote device(s) to affect the presentation. For instance, a number of mote device(s) to be configured to affect the presentation by: emitting light or some other visible or invisible electromagnetic radiation, changing its reflective characteristics, producing a sound, vibration, or a voice, etc. Whichever technique is utilized to affect the presentation should be discernible by the person, organism, or inanimate object to which this directed.

It is thereby also envisioned that certain embodiments of the mote device(s) that extend within the mote network 10 can affect the presentation to either organisms or inanimate objects. For instance, certain embodiments of mote device(s) can be directed by humans, and as such humans should be somehow attracted to, directed or, guided by, repelled by, etc. the affected presentation. A number of mote device(s) can be dispersed across a field, a road, etc., and these mote devices can locate themselves such that they are aware of their relative locations as described herein. It is also envisioned that affecting a presentation to an organism or inanimate object that can have a variety of affects on the organism or inanimate object including, but not limited to: attraction, guidance, direction, repulsion, etc. While in certain embodiments such attraction, guidance, direction, repulsion, etc. may be conscious to the subject, in other embodiments the attraction, guidance, direction, repulsion, etc. may not be conscious or may be subtle in some manner. For example, if certain fish are attracted to certain colors, then mote devices may affect the presentation formed of that color for that particular type of fish. Similarly, presenting affects that are intended to attract humans may by "subconsciously" attractive to humans.

Figure 15:
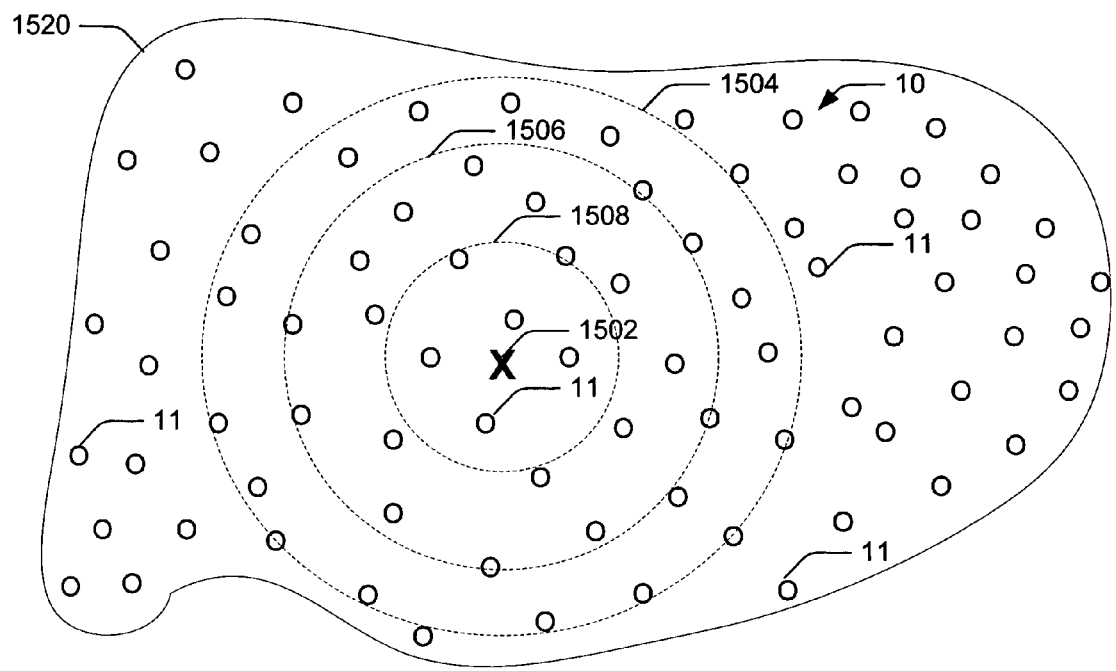
FIG. 15 shows one embodiment of the mote device affecting a presentation.

In certain embodiments, the manner in which the mote device will operate can depend largely upon its physical location. Consider, for example, that the at least one mote device could be used to affect the presentation to effectively guide a user to some location. For example, FIG. 15 shows one embodiment of mote affecting presentation system by which users (humans in this instance) are guided toward a particular location. In FIG. 15, a considerable number of mote devices are spread across some area, such as a field, a road, a floor, etc. At least certain ones of the mote device(s) can be configured to emit electromagnetic radiation, such as light, that can be sensed by a person. The affecting the presentation allows an associated inanimate object or organism to be guided within the mote networks utilizing the mote device(s).

There are a variety of techniques, as described in this disclosure, by which organisms such as humans, for example, can utilize affecting a presentation to be attracted to some presented region. FIG. 15 shows one embodiment of affecting a presentation that could be detected by humans, for instance. As described with respect to FIG. 15, the presented region 1502 (as indicated by an "x") can represent an area to which people, in this embodiment, are to be guided. In certain embodiments, the presented region may itself include, or be adjacent to, a mote device 11 (as described for example with respect to FIG. 19) that can be configured to sense a condition such as to be able to report on other motes. The mote device(s) of, as described in this disclosure, are illustrated as the small circles, only some of which are numbered as 11. As a result of the locating of the mote device(s), the mote device(s) can determine those mote device(s) 11 that can be of a first mote device group 1504, which are approximately a first prescribed distance from the presented region 1502. As such, those mote device(s) 11 that are within some prescribed distance of the dotted line of FIG. 15 indicated in the first mote device group 1504 will be actuated to produce some light at some particular time. Provided there are a suitable number of mote device(s), the first mote device group 1504 will appear as a circle with the center situated in the presented region 1502. With certain embodiments of mote networks 10, those mote device(s) in the first mote device group 1504 can continue to remain illuminated, whereupon the user can locate the presented region 1502 as being the center of the first mote device group 1504.

With other embodiments of the mote network 10, the dimension or shape of the first mote device group 1504 can change over time. For example, also as a result of the locating, the mote device(s) 11 can determine those mote device(s) that belong within a second mote device group 1506; which as illustrated in FIG. 15 have a similar shape, but smaller dimension, within the first mote device group 1504. As such, those mote devices included in the second mote device group 1506 can be considered as being approximately a second prescribed distance from the presented region 1502. Similarly, a third mote device group 1508 can be included within the second mote device group 1506, as described within this disclosure. In certain embodiments, the mote device(s) that are within the first mote device group 1504 can be sequenced with those of the second mote device group 1506 (and perhaps those on the third mote device group 1508) to guide a person ever more precisely to the presented region 1502.

Figure 16:
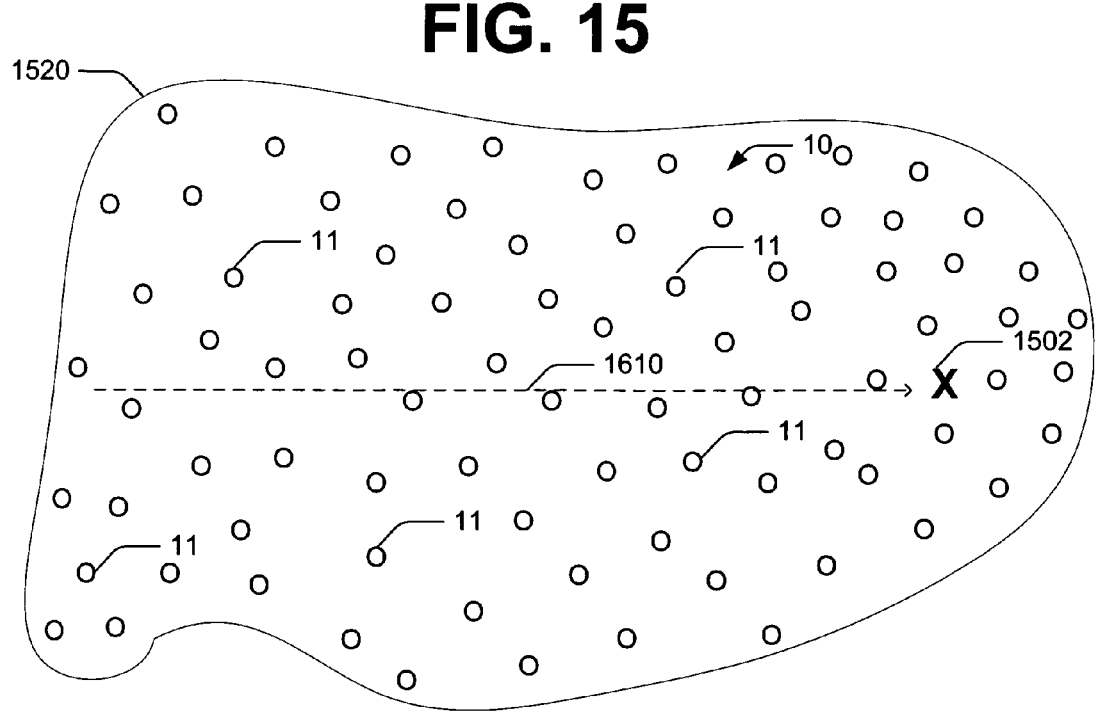
FIG. 16 shows another embodiment of the mote device affecting the presentation.
Figure 17:
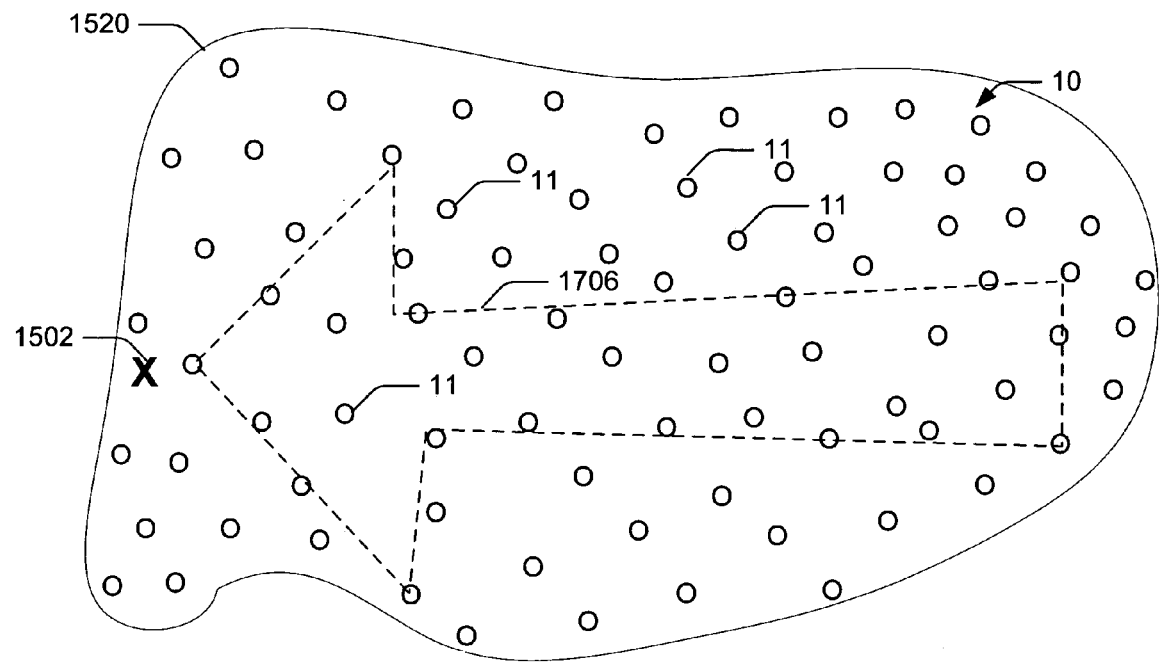
FIG. 17 shows yet another embodiment of the mote device affecting the presentation.

While relatively few mote devices 11 are located on a supporting member 1520 as described with respect to FIGS. 15-17, certain embodiments of the mote network 10 can include more, or fewer, mote devices. In those embodiments of mote networks 10 in which the mote device group(s) form a relatively complex pattern or shape to guide a person, an organism, or an inanimate object to the presented region 1502, it is envisioned that more mote device(s) may have to be included in a more dense configuration. Different embodiments of the supporting member 1520 can include a solid member (e.g., a field, a road, a room), a liquid, a gas, a fluid, or any other mechanism that can support the mote device(s) (or the mote device(s) adapted to be supported) for the suitable duration depending upon the particular application. The configuration of the mote device(s) 11, the presented region(s) 1502, and/or the mote device group(s) during the affecting the presentation, as described with respect to FIG. 15, is intended to be illustrative in nature and not limiting in scope.

For example, mote device(s) 11, as described with respect to FIG. 16, can be oriented along a substantially straight line that forms a mote device group 1610. In certain embodiments, those mote device(s) that are arranged along the substantially straight mote device group 1602 can be sequenced to guide a user, such as a human, toward the presented region 1502. Sequencing illumination of multiple ones of the mote device(s) 11 can readily lead the user towards, or away from, some desired location (corresponding to the presented region 1502). Certain embodiments of the sequencing may be considered as providing a time-varying pattern. Since many embodiments of the mote device(s) 11 within the mote network 10 are processor-based, configurations of the mote device groups, as well as the locations of the presented region 1502, can be modified and altered as appropriate. By following a process of locating the mote device(s) 11, and then illuminating those mote device(s) within a particular time that fall within a desired mote device group, motes can provide an effective technique of guiding or leading individuals as desired to, from, or relative to modifiable presented region(s) 1502.

While certain mote device groups as described herein can be sequenced, certain other mote device groups, are described with respect to FIGS. 15 and 16, may not be sequenced to provide guidance to the presented region 1502. For example, FIG. 17 illustrates one embodiment of the mote device group 1706 that assumes the form of a pattern (e.g., an arrow) that may not change over some duration (and thereby may not be sequenced). The pattern of the mote device group 1706 points directly to the presented region 1502 in a manner easily understandable by people. This disclosure presumes that each mote device group is associated with a sufficient number of mote device(s) to when those mote device(s) are illuminated, the pattern is easily discernible by people. Note that while the pattern of the mote device group 1706 of FIG. 17 does not form a perfectly uniform arrow, the arrow certainly is sufficient to guide people as desired.

Figure 18:
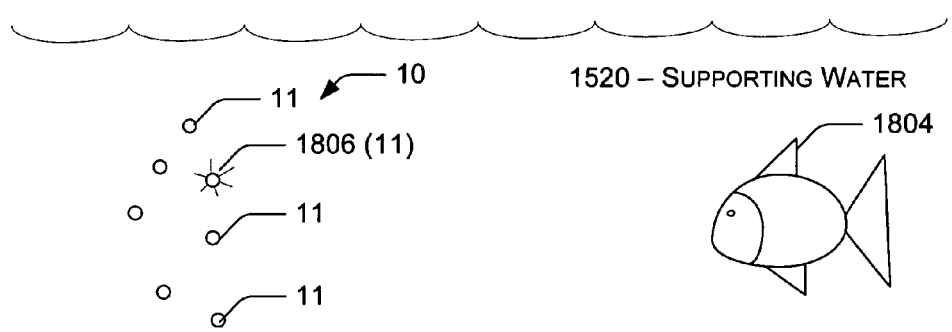
FIG. 18 shows still another embodiment of the mote device affecting the presentation.

The embodiment of mote network 10, as described with respect to FIG. 18, indicates that organisms can be attracted to, or repelled from, certain embodiments of the presented region 1502 utilizing a variety of mote device groups. For example, the fish 1804 can be attracted to the presented region 1502 by illuminating the mote device(s) 11 located within the mote device group 1806. Over the centuries, those lures that reflected in certain manners, or provided certain colors or types of light, have been recognized as being capable of catching large number of certain types of fish. As such, by illuminating change(s) of reflectivity of the mote device 11 within the mote device group 1806, a similar optical characteristic can be produced by the mote device, and thereby hopefully attract fish in a desired manner.

Not all mote device groups 1806 that are utilized for fishing are intended to attract the fish 1804. For example, certain mote device groups 1806 can be illuminated to guide certain fish in a desired direction, such as into a fishing net. As such, mote device groups driving away fish may also be highly effective. Other types of organisms than fish, as described in this disclosure, such as people, other mote device(s) or computer(s), bacteria, virus, etc. can be influenced by the use mote device groups. For instance, certain mote device groups can be illuminated to attract insects, such as mosquitoes, to some remote location away from where people are gathered. Similarly, mote device groups can be effectively used to attract or drive-back animals. Consider that mote device groups can be located on the border of national parks, and the likes, to reduce the tendencies of wild animals from roaming from the national parks onto adjacent private lands. Perhaps certain sequencing of certain patterns of mote device(s), or emission of light of a particular wavelength by certain mote device(s), would tend to attract or scare away certain types of animals. Experimentation would be useful to determine the particular parameters of emitted light (or other electromagnetic radiation) that might attract or repel the particular animals. Perhaps such sequencing of certain patterns by the mote device(s) could be actuated upon the mote device sensing a presence of the animals, or other organisms. In different embodiments, the presence of organisms can be sensed either directly or indirectly, e.g. using chemical signatures or characteristic patterns of alterations to the environment.

Figure 19:
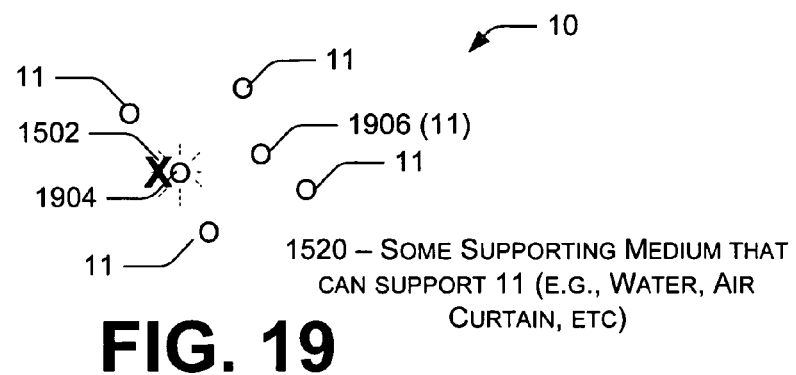
FIG. 19 shows still another embodiment of the mote device affecting a presentation.

FIG. 19 shows another embodiment of the mote network 10 that can be configured such that a first mote device 1904 guides (attracts, repels, relocates, directs along a circuitous route, etc.) a second mote device 1906 (instead of guiding a person, an organism, an inanimate object, etc.). As such, it is envisioned within this disclosure that the mote device(s) can guide each other, as well as other people, organisms, etc. The mote device(s) 11 within the mote network 10 (as described with respect to FIGS. 1 to 3, etc.) can be considered to operate using network communication and inter-mote-device techniques. As such, the terms "affecting a presentation", "guiding", etc. can occur (including transmitting information or data) from the first mote device 1904 in a form that can be received by the second mote device 1906 utilizing a relatively simplistic transmission of light, color (which may correspond to the color of the first mote device itself), reflection, etc. as compared to the affecting the presentations from the mote device to an organism, inanimate object, etc. as described with respect to FIG. 15-18.

Certain embodiments of the mote device groups can be actuated to guide inanimate objects. For instance, certain robot devices can be programmed to follow certain light, sound, voice, or other electromagnetic signals. The mote device(s) 11 of the mote network 10 can thereby guide the robot, or other inanimate object, to or away from a particular presented region 1502 by suitable actuation or the actuation of the mote device(s) 11. Different embodiments of the mote device(s) should attract or repel (or at least have an affect on) that particular organism or inanimate object that is being guided to or away from the presented region 1502.

Figure 20:
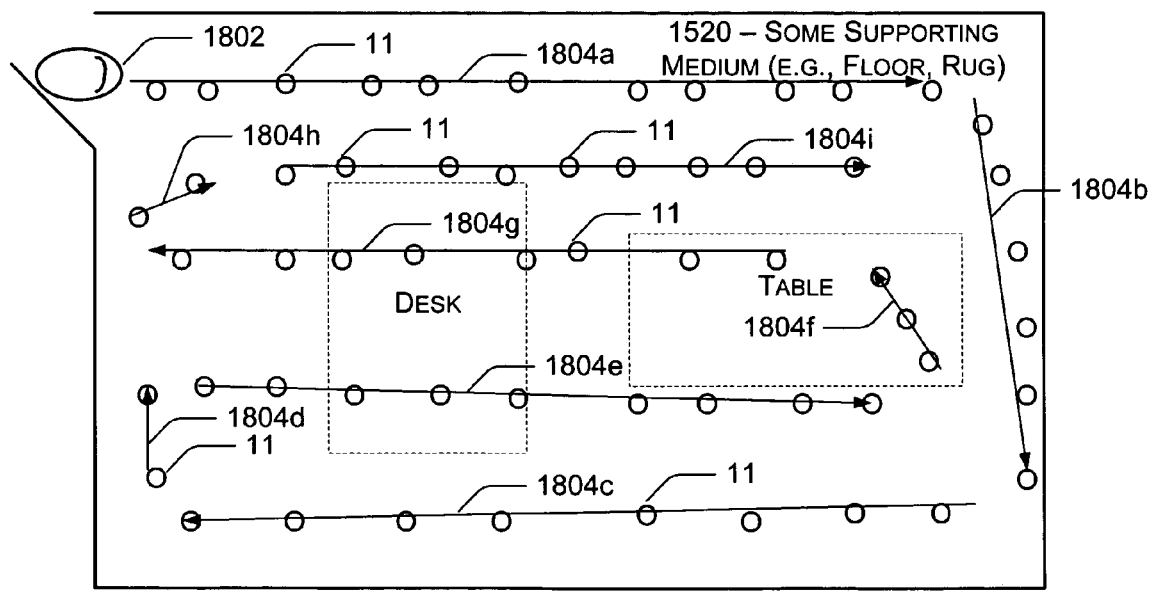
FIG. 20 shows an embodiment of a cleaning robot that can be actuated, controlled by, or scheduled by certain embodiments of the mote device(s) that are actuating a presentation.

FIG. 20 shows one embodiment of multiple mote device(s) that are configured to form a mote-pathway that can be followed by some inanimate object such as a robot, and more particularly a cleaning robot 1802. Certain embodiments of the cleaning robot 1802 as described with respect to FIG. 20 can operate without human interface, such as by having mote device(s) 11 affect the presentation to guide the cleaning robot to a home or office surface, or built into a floor or other such location. For example, one embodiment of the cleaning robot 1802 operates similar to an iRobot Roomba vacuum, which is commercially available. Certain mote devices could be located such that when actuated could be utilized to guide the cleaning robot to various positions or locations, as described herein. In certain embodiments, the cleaning robot 1802 could be programmed to present different paths 1804*a* to 1804*i*, which could be maintained or modified according to schedules as set by the owner or user. The paths 1804*a* to 1804*i* may represent that followed by the cleaning robot during cleaning or vacuuming the floor of the room. For example, one or a number of mote device(s) could be configured to guide the robot from its dock along the paths within the at least one room at a prescribed time (e.g., 10:00 am daily or on particular days). In one embodiment, each mote device(s) 11, though few are numbered, may affect the presentation such as becoming illuminated in a sequenced order, which determines the path that the cleaning robot 1802 can follow. As soon as one mote along each path is reached, the mote device can de-affect the presentation to allow the next mote device to affect the presentation (as allowed by inter-mote device communications and signaling between the mote device(s) as described in this disclosure. The mote device(s) do not have to be arranged along the path in an exact order, but instead in general can be loosely deposited along the respective paths 1804*a* to 1804*i*.

Certain embodiments of mote device(s) 11 could thereby detect the location of the cleaning robot (by sensing a position of the cleaning robot, as described herein), and transmit a signal that could guide the cleaning robot 1802 from its current location to a desired or scheduled location, provide information that would allow the cleaning robot to guide itself from its current location to a desired or scheduled location, or achieve another goal. Another embodiment of the mote device(s) 11 could detect dirt and guide the cleaning robot to the dirt. By using motes applied to a home surface or built into a home, for example, different motes could be programmed to follow different paths according to schedules, so that, for example, motes guiding the robot from its dock to the living room come on at 10:00 AM. Further, such motes could detect the location of the robot and guide it from its current location to a scheduled or other goal. Such schedules of goals can be modified, as desired. In another embodiment, the motes could detect dirt or sense another condition, and guide a robot, inanimate object, or organism to the location of the mote to clean up the dirt or handle the condition. While the cleaning robot 1802 is described with respect to FIG. 20 as a particular robot mechanism, other types of robots, mobile mote devices as described with respect to FIGS. 21 and 22, or automated mechanisms such as mechanical tool guiding and/or machining mechanisms are also envisioned to be within the scope of the present disclosure. No embodiments of the internal workings to the robot devices, other automated devices, or other inanimate object is illustrated in the figures since there are a variety of robotic systems that can be utilized, and additionally such devices are generally well-known and understood by those skilled in the art, and are commercially available.

VIII. Examples of Affecting a Presentation Using Mote Device(s)

A number of embodiments or configurations of locating devices 50 are now described that can locate one or more mote device(s) 11 to affect the presentation, as described in this disclosure. In general, there may be a variety of reasons why certain mote device(s) should affect the presentation that include, but are not limited to, a) mote device(s) failing to signal that they are still working such as by having insufficient energy and/or power, b) mote device(s) signaling that they are operating outside normal operating parameters (e.g., not working such as by having insufficient energy and/or power), c) mote device(s) indicating that they have been working properly (e.g., the mote device(s) has located data correctly over some prescribed time), but there is a reason to locate the mote device(s) (such as routine locating such as by ensuring the mote device(s) has a sufficient energy and/or power), and/or d) the mote device(s) attempting to transfer information such as data.

In certain embodiments, the mote device(s) can interface with the locating device to indicate that, for at least one of the reasons described above, the mote device(s) is requesting attention and is ready to be located. As such, in many embodiments, the mote device(s) 11 can (e.g., by transmitting locating attention requested signals), indicate to the locating device that it is ready to be located.

Certain embodiments of failing mote device(s) 11, such as those that have insufficient power and/or energy, may signal to be located for a variety of reasons using a variety of techniques. In certain embodiments, a last known location (using absolute geographic position or location with respect to another mote device(s) within the mote network) of the failing mote device(s) may be transmitted based on information transmitted to (or inferred or calculated by) other motes. This disclosure is intended to apply to one roe more mote device(s) communicating standard operating conditions (as well as failure conditions) therebetween, that can, for example, be conveyed to yet other mote device(s), organism(s), inanimate object(s), etc. In certain instances, a failing or normally operating mote can broadcast its failure or condition and its location to neighbors, with the neighbor mote device(s) then storing the received location, and the mote device(s) can thereupon indicate (e.g., using a location indication such as a tag) that they can provide information to locate or provide the status of another mote device(s). Therefore, certain mote device(s) can act as a referral device by utilizing a "referral" location indication for other mote device(s). Other mote device(s) or other devices that are searching to locate the failed mote device(s) can obtain the last known location from the referral device in an effort to locate the failed mote device. Other similar modified-networking techniques can also be applied to the mote device(s) within the mote network.

Flowcharts that can be associated with the mote device(s) are also described. Within the disclosure, flowcharts of the type described in this disclosure can apply to method steps as performed by a computer or controller. The flowcharts can also apply to computer/controller 18 that interfaces with the mote device(s) 11. In certain embodiments, the computer/controller 18 (that includes, e.g., a general-purpose computer or specialized-purpose computer whose structure along with the software, firmware, electro-mechanical devices, and/or hardware), can, perform the process or technique described in the flowchart.

Figure 11:
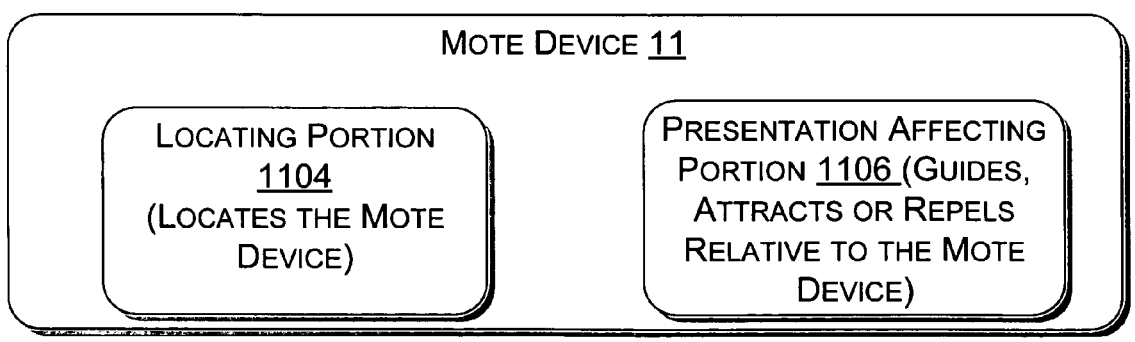
FIG. 11 shows a diagram of another embodiment of the mote device that can transfer the impulse-mote-position-indication.

FIG. 11 shows one embodiment of a mote device(s) 11 that can be used to affect the presentation, as described within this disclosure. In one embodiment, the mote device(s) 11 can be configurable to generate at least one impulse-mote-position-indication that can be used by at least one other device (which may include, but is not limited to, the locating device 50) to affect the presentation. In certain embodiments, the impulse-mote-position-indication can provide a relatively low-powered communication technique (from the viewpoint of the mote device(s) 11). The locating devices 50, at least one other device, and/or the computer/controller 18 may be used by the mote device(s) 11 to affect the presentation. Considering that certain embodiments of the mote network 10 may include a large number (perhaps in the hundreds or thousands) of the mote device(s), power aspects provide a considerable design consideration among mote device(s) during the affecting the presentation and/or perform other operations. Many embodiments of the impulse-mote-position-indication can provide reliable locating information while using a relatively low amount of power or energy compared to traditional techniques associated with locating such devices as mote device(s). Existing networking techniques can be modified to be utilized by the mote device(s) 11, the locating device 50, the computer/controller 18, and/or other devices in locating the mote device. Such modifications may include, but are not limited to, utilizing the impulse-mote-position-indication to reduce energy and/or power consumed by the mote device(s) and/or other devices within the mote network; modifying network techniques to compensate for relatively large numbers of the mote device(s) 11 within the mote network 10; and/or modifying networking techniques to compensate for relatively simple operations and/or low data transfers such as may be prevalent within mote networks. One skilled in networking techniques will understand that FIG. 11 represents a simplified locating technique as compared with FIG. 10. It is to be understood, the locating technique as described with respect to FIGS. 11 and 12 may vary considerably in complexity while remaining within the scope of the present disclosure.

This disclosure thereby provides a mechanism that allows for affecting the presentation using the mote device(s), as described in this disclosure. Certain embodiments of the mote device(s) 11 can include a locating portion 1104 and a presentation affecting portion 1106, In certain embodiments, the at least one mote device(s) 11 should utilize the locating portion 1104 that can be operable to locate at least one position of at least one mote device as described in this disclosure. Certain embodiments of the mote device(s) can further include the presentation affecting portion 1106 that can be operable to affect the at least one presentation based at least in part on the locating portion operable to locate the at least one position of the at least one mote device as described in this disclosure. As described in this disclosure, the mote device(s) can affect the presentation, which can be configured to have the effect of guiding a person, organism, and/or inanimate object towards or away from a particular region (described herein as a "presented region"). In certain embodiments, the region to which mote device(s) are drawing attention by affecting the presentation may, or may not, actually lie outside of where the motes that are affecting the presentation are located (e.g., 1506 can be outside of 1706 as illustrated in FIG. 17, in certain embodiments). The affecting the presentation can take a variety of forms including, but not limited, providing a pattern (time invariant or time varying), providing a sequence of lights, etc. In certain embodiments, the mote device(s) can even utilize an amount of electromagnetic radiation contained within a region as the signal as described in this disclosure.

One embodiment of a high-level flowchart of a processing and/or sharing technique 2000 is described with respect to FIGS. 12*a* to 12*c* and includes, but is not limited to, operations 2002 and/or 2004, as well as optional operations 2006, 2008, 2012, 2014, and/or 2016. Operation 2002 can include, but is not limited to, optional operations 2020, 2022, 2024, 2026, 2028, 2030, 2032, 2034, and/or 2036. Operation 2004 can include, but is not limited to, optional operations 2050, 2052, 2054, 2056, 2060, and/or 2062. The high-level flowchart of FIGS. 12*a* to 12*c* should be considered in combination with the mote device(s) 11, as described with respect to FIG. 11. One embodiment of operation 2002 can include, but is not limited to, locating at least one position of at least one mote device. For example, the mote device(s) 11, as described with respect to FIGS. 1 to 3, are located either geographically, with respect to a room, building, or lawn, or alternatively with respect to some other coordinates system using such techniques as described with respect to FIGS. 4 to 9. One embodiment of operation 2004 can include, but is not limited to, affecting at least one presentation based at least in part on the at least one position of the at least one mote device. For example, the mote device(s) affects the presentation such as can be used to guide a person, an organism, or an inanimate object such as a robot either towards or away from the presented region 1502, as described with respect to FIGS. 15 to 18. One embodiment of the locating at least one position of at least one mote device of 2002 can include operation 2020, that can include, but is not limited to, locating the at least one position of the at least one mote device with respect to at least one other device. For example, the location of the mote device is determined with respect to the at least one other device, such as the computer/controller 18, the base station, and/or the locating device 50 as described with respect to FIG. 1. One embodiment of the locating at least one position of at least one mote device of 2002 can include operation 2022, that can include, but is not limited to, locating the at least one position of the at least one mote device with respect to at least one other mote device. For example, the location of the mote device is determined with respect to at least one other mote device, as described with respect to FIG. 1. One embodiment of the locating at least one position of at least one mote device of 2002 can include operation 2024, that can include, but is not limited to, locating the at least one position of the at least one mote device with respect to at least one other computer/controller device. For example, the location of the mote device is determined with respect to the computer/controller 18 of FIG. 1. One embodiment of the locating at least one position of at least one mote device of 2002 can include operation 2026, that can include, but is not limited to, locating the at least one position of the at least one mote device with respect to at least one other locating device. For example, location of the mote device is determined with respect to the locating device 50. One embodiment of the locating at least one position of at least one mote device of 2002 can include operation 2028, that can include, but is not limited to, locating the at least one position of the at least one mote device with respect to at least one absolute spatial location. For example, the location of the mote device is determined with respect to some geographic coordinate axes (such as provided by GPS, LORAN, radar, and/or a variety of other location driving techniques). Consider, in one embodiment, the mote devices being distributed in a similar manner as confetti to be briefly supported in air. The relative location of the mote devices can be instantaneously determined in a manner to provide an ephemeral mote network. Consider another embodiment, the mote devices are distributed in a medium such as water, or a gel, in which the locations of the mote devices can be sustained for a longer duration. One embodiment of the locating at least one position of at least one mote device of 2002 can include operation 2030, that can include, but is not limited to, locating the at least one position of the at least one mote device with respect to at least one structure. For example, location of the mote device is determined with respect to some structure, such as a building, a stadium, and office, a school, etc. One embodiment of the locating at least one position of at least one mote device of 2002 can include operation 2032, that can include, but is not limited to, locating the at least one position of the at least one mote device with respect to at least one landmark. For example, the location of the mote device is taken with respect to some landmark building, business, theater, etc. One embodiment of the locating at least one position of at least one mote device of 2002 can include operation 2034, that can include, but is not limited to, locating an at least one absolute position of the at least one mote device. For example, locating an absolute (e.g., with respect to a fixed geographic location or feature) position of the mote device. One embodiment of the locating at least one position of at least one mote device of 2002 can include operation 2036, that can include, but is not limited to, locating an at least one relative position of the at least one mote device. For example, locating a relative position of the mote device with respect to another device. In certain embodiments, the mote device(s) that are locating a presentation may be location within an organism such as the human body. For example, mote device(s) may include be used to monitor the presence of an infection or a disease, and the mote device(s) may operate to allow affecting the presentation (e.g. at the skin surface) an indication of the presence of that infection or disease. One embodiment of the affecting at least one presentation based at least in part on the at least one position of the at least one mote device of operation 2004 can include operation 2050, that can include, but is not limited to, affecting the at least one presentation to a person based at least in part on the at least one position of the at least one mote device. For example, affecting the presentation using the position of the at least one mote device to a person, such as by providing concentric circles, arrows, shapes, patterns, etc. as described with respect to FIGS. 15 to 17. One embodiment of the affecting at least one presentation based at least in part on the at least one position of the at least one mote device of operation 2004 can include operation 2052, that can include, but is not limited to, affecting the at least one presentation to an organism based at least in part on the at least one position of the at least one mote device. For example, affecting the presentation using the position of the least one mote device to an organism such as an insect, a person, an animal, a fish as described with respect to FIG. 18. One embodiment of the affecting at least one presentation based at least in part on the at least one position of the at least one mote device of operation 2004 can include operation 2054, that can include, but is not limited to, affecting the at least one presentation to an inanimate object based at least in part on the at least one position of the at least one mote device. For example, affecting the presentation to the inanimate object (which could be machine, robot, etc.). One embodiment of the affecting at least one presentation based at least in part on the at least one position of the at least one mote device of operation 2004 can include operation 2056, that can include, but is not limited to, producing a pattern using multiple ones of the at least one mote device. For example, producing a pattern such as the arrow as described with respect to FIG. 17. One embodiment of the affecting at least one presentation based at least in part on the at least one position of the at least one mote device of operation 2004 can include operation 2060, that can include, but is not limited to, producing a temporally variable pattern using multiple ones of the at least one mote device. For example, producing the temporarily variable pattern using a number of mote device groups as described with respect to FIGS. 15, 16, and 18. One embodiment of the affecting at least one presentation based at least in part on the at least one position of the at least one mote device of operation 2004 can include operation 2062, that can include, but is not limited to, sequencing multiple ones of the at least one mote device. For example, sequencing between multiple ones of the mote device groups, such as described with respect to FIG. 15. One embodiment of operation 2006 can include, but is not limited to, wherein the at least one mote device includes a plurality of mote devices that have non-uniform distribution. For example, assuming that the mote device(s) are not distributed uniformly, as described with respect to FIGS. 15-17. One embodiment of operation 2008 can include, but is not limited to, wherein the at least one mote device includes a plurality of mote devices that have non-uniform operative capabilities. For example, certain mote devices may have non-uniform capabilities, such as allowing less-densely packed mote device(s) to generate more light than more-densely packed mote device(s), or alternatively allowing neighboring mote devices to compensate for non-operative capabilities. Note that such compensation may occur where the mote device(s) are distributed across 1, 2, or 3 dimensions. One embodiment of operation 2012 can include, but is not limited to, wherein the at least one mote device can determine their location with respect to a type of enumerated property or feature. For example, a mote device(s) could determine where it is located with respect to oil or water located below the ground, such as to establish oil or water wells, where the mote device(s) acts using a sensing technology that may be similar to SONAR, RADAR, or other similar sensing technique to locate properties or features. In the another embodiment, mote device(s) can determine the amount of surface water to assist in automated irrigation system. In certain embodiments, where mote device(s) determine their location with respect to a mineral deposit, the mote network can indicate the location of the mineral deposit. One embodiment of operation 2014 can include, but is not limited to, wherein the at least one mote device can determine their location with respect to a type of enumerated property or feature, wherein the at least one mote device is informed about the type of enumerated property or feature. For example, the mote device is informed about the relative location of the enumerated property or feature, and the mote device indicates the location of the enumerated property or feature. One embodiment of operation 2016 can include, but is not limited to, wherein the at least one mote device can determine their location with respect to a type of enumerated property or feature, wherein the at least one mote device determines the type of enumerated property or feature. For example, the mote device determines the relative location of the enumerated property or feature, and the mote device indicates the location of the enumerated property or feature. The order of the operations, methods, mechanisms, etc. as described with respect to FIGS. 12*a* to 12*c* are intended to be illustrative in nature, and not limited in scope.

Figure 13:
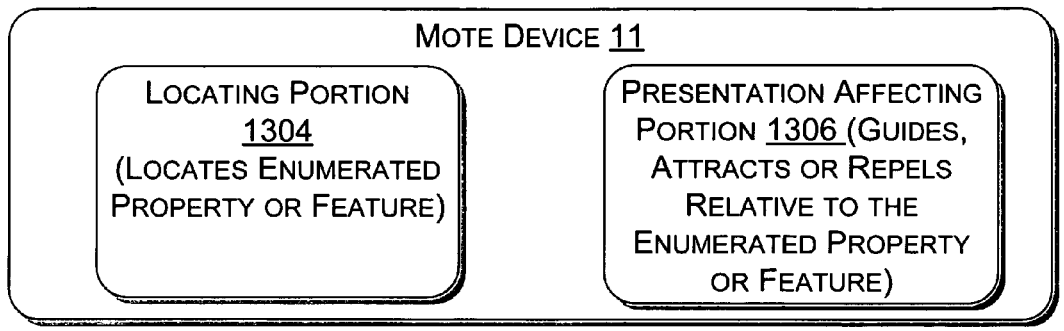
FIG. 13 shows a diagram of an embodiment of a controller device that can receive the impulse-mote-position-indication, which can be used to locate the mote device(s)

Certain embodiments of the mote device(s), as described with respect to FIG. 13 and the remainder of this disclosure, can include a locating portion 1304 and a presentation affecting portion 1306. In certain embodiments, the locating portion 1304 can be configurable to determine at least one position of an item at least partially using at least one mote device. For instance, the determining the position can utilize the locating techniques as described above. In certain embodiments, the presentation affecting portion 1306 can be configurable to affect the at least one presentation of the at least one position, as described in this disclosure, at least partially in response to the locating portion configurable to determine the at least one position of the item at least partially using the at least one mote device.

Figure 14:
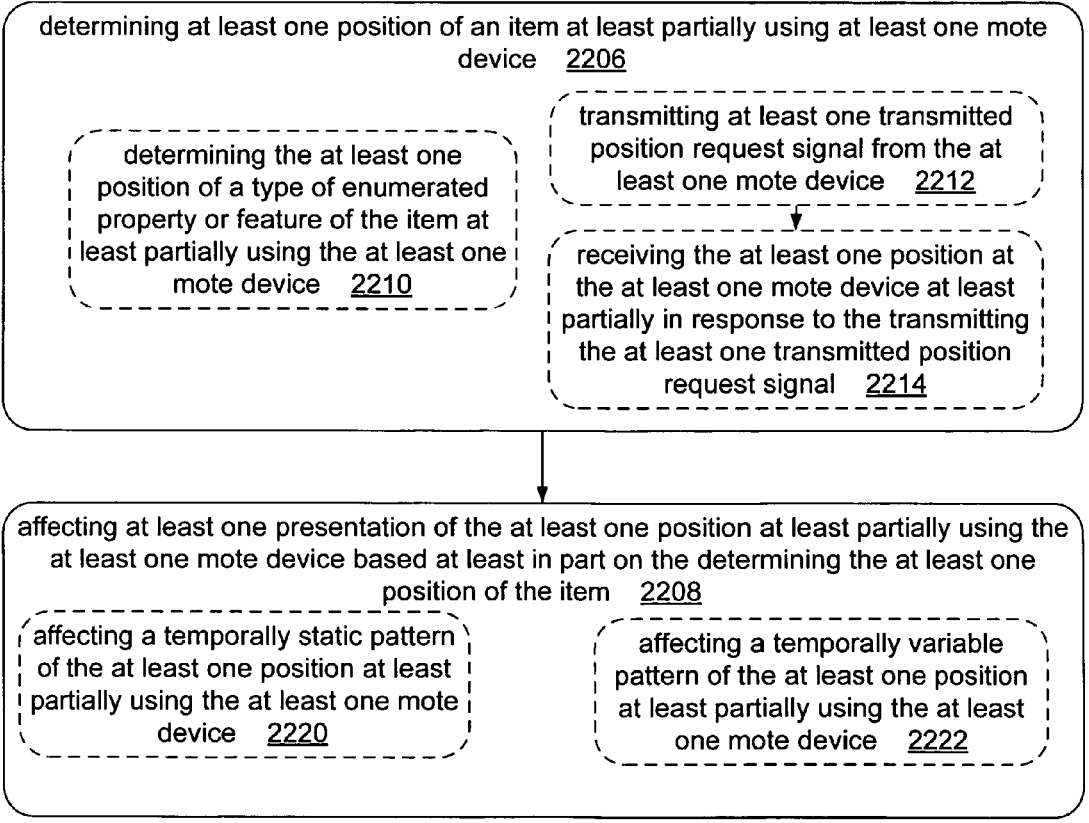
FIG. 14 is a flow diagram of another embodiment of the mote locating technique.

One embodiment of a high-level flowchart of a processing and/or sharing technique 2200 is described with respect to FIG. 14 and includes, but is not limited to, operations 2206 and/or 2208. Operation 2206 can include, but is not limited to, optional operations 2210, 2212, and/or 2214. Operation 2208 can include, but is not limited to, optional operations 2220 and/or 2222. The high-level flowchart of FIG. 14 should be considered in combination with the mote device(s) 11, as described with respect to FIG. 13. One embodiment of operation 2206 can include, but is not limited to, determining at least one position of an item at least partially using at least one mote device. For example, to at least one position of an item using locating techniques, such as described with respect to the mote device of FIGS. 1-3. One embodiment of operation 2208 can include, but is not limited to, affecting at least one presentation of the at least one position at least partially using the at least one mote device based at least in part on the determining the at least one position of the item. For example, affecting the presentation of at least one position of the object at least partially using the mote device, as described with respect to FIGS. 15-18. One embodiment of the determining at least one position of an item at least partially using at least one mote device of operation 2206 can include operation 2210 that can include, but is not limited to, determining the at least one position of some type of enumerated property or feature of the item at least partially using the at least one mote device. For example, determining some enumerated property or feature, such as water, minerals, etc. using the mote device. One embodiment of the determining at least one position of an item at least partially using at least one mote device of operation 2206 can include operation 2212 and 2214; and operation 2212 can include, but is not limited to, transmitting at least one transmitted position request signal from the at least one mote device. For example, the mote device transmitting at least one transmitted position request signal. Operation 2214 can include, but is not limited to, receiving the at least one position at the at least one mote device at least partially in response to the transmitting the at least one transmitted position request signal. For example, receiving at least one position indication of the mote device in response to the transmitting the transmitted position request signal. One embodiment of the affecting at least one presentation of the at least one position of operation 2208 can include operation 2220, that can include but is not limited to, affecting a temporally static pattern of the at least one position at least partially using the at least one mote device. For example, the mote device(s) 11 as described with respect to FIGS. 1 to 3 affecting a temporally static pattern, such as the arrow as described with respect to FIG. 17. One embodiment of the affecting at least one presentation of the at least one position of operation 2208 can include operation 2222, that can include but is not limited to, affecting a temporally variable pattern of the at least one position at least partially using the at least one mote device. For example, the mote device(s) affecting a temporally variable pattern, such as the concentric circles and/or line as described with respect to FIGS. 15 and 16.

In one or more various aspects, related systems include but are not limited to circuitry and/or programming for effecting the herein-referenced method aspects; the circuitry and/or programming can be virtually any combination of hardware, software, electromechanical system, and/or firmware configurable to effect the herein-referenced method aspects depending upon the design choices of the system designer.

IX. Examples of Mobile Mote Device(s)

Figure 21:
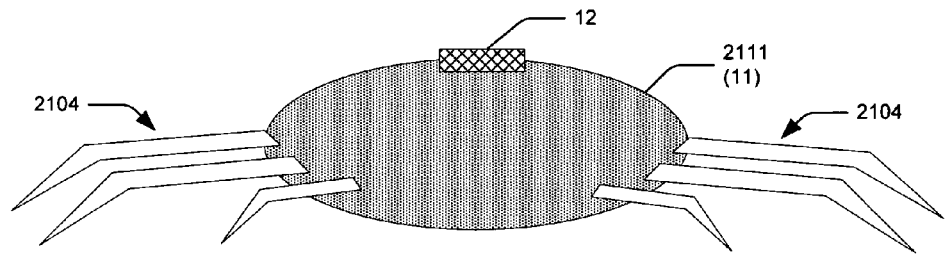
FIG. 21 shows a view of another embodiment of the mote device, that includes a mobile mote device.

FIG. 21 shows another embodiment of the mote device(s) that can be used to propel the mote in some desired direction, which are referred to herein as mobile mote device(s) 2111. As described with respect to FIGS. 1 to 3, certain embodiments of mote device(s) can be configured to actuate "other" devices. In the embodiment of the mote device as described with respect to FIG. 21, the "other" device that is being actuated by the mobile mote device 2111 can include a mote propelling portion 2104. The mote propelling portion 2104 of the mobile mote device 2111 can include legs, track, rollers, air-cushions, electromagnetic fields, or any known technology that can be used to propel the mobile mote device 2111. The mote propelling portion 2104 of the mobile mote device 2111 can be fabricated to be relatively simple in design (similar in complexity to a child's wind-up toy) or more complex depending upon the function, purpose, desired expense, number and other factors of the mobile mote device. The embodiment of the mobile mote device 2111 as illustrated in FIG. 21 includes six legs that may operate similar to a spider. It is envisioned that fewer or more legs may be used, or a different leg configuration may be used. The six legs of the mobile mote device 2111 or the mote propelling portion 2104 as described with respect to FIG. 21 would be able to propel the mobile mote device 2111 forwards, backwards, rotate about a vertical axis extending through the mobile mote device, and/or turn right or left as the mobile mote device moves forward or backwards. As such, certain embodiments of the mote propelling portion 2104 can be configured to propel the mobile mote device(s) 2111 in a highly controllable fashion.

Figure 22:
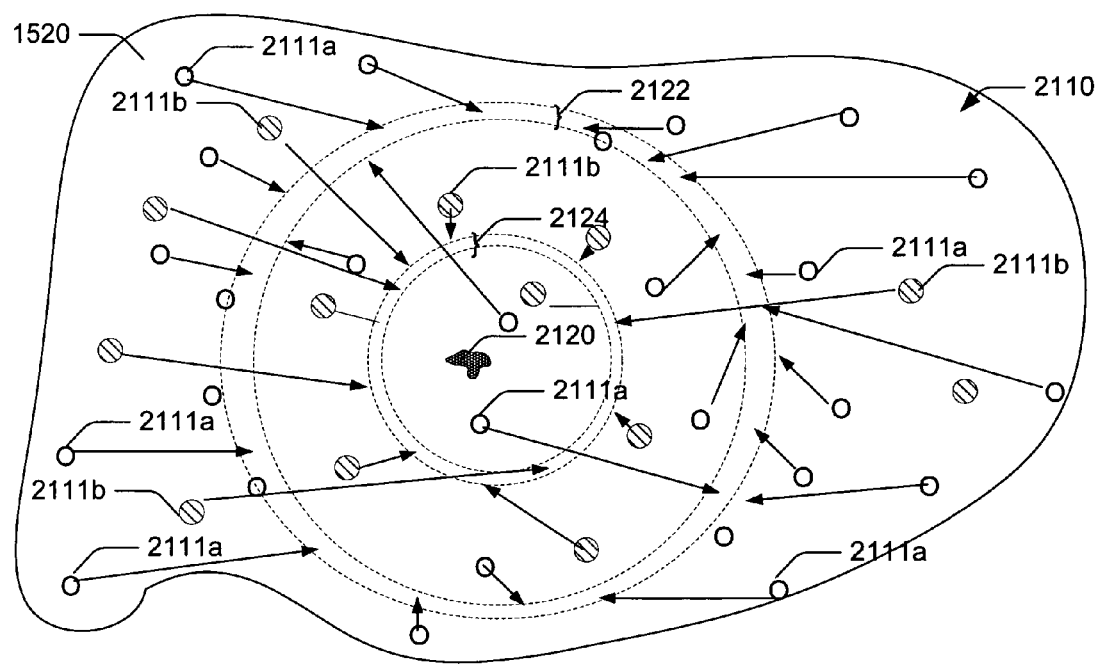
FIG. 22 shows a number of the mobile mote device(s) of FIG. 21 prior to their respective motion.
Figure 23:
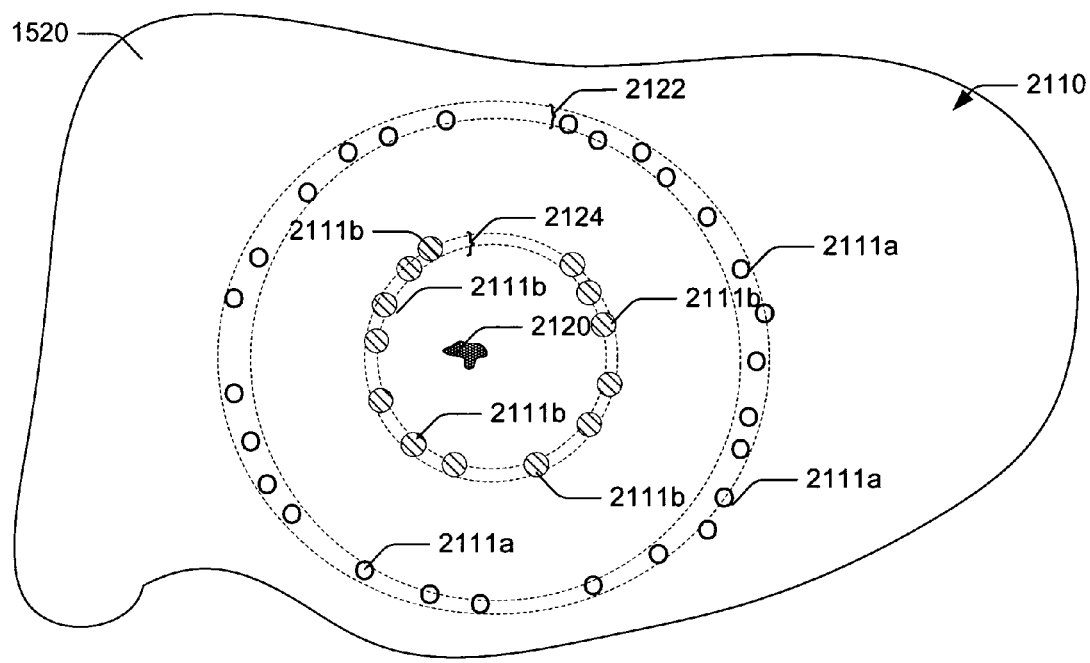
FIG. 23 shows the mobile mote device(s) of FIG. 22 following the motion of the mobile mote device(s)

FIG. 22 shows one embodiment of a mobile mote network 2110 that can include a number of mobile mote devices 2111 that can be grouped into two groups, as referenced as 2111a (shown as white-filled) and 2111b (shown as hatched). FIG. 23 shows the mobile mote devices 2111a and 2111b following their displacement as indicated by the arrows of FIG. 22. The mobile mote device(s) 2111a can be, for example, configured to be attracted to an area of a particular range of chemical concentration (e.g., 10%-11% of chemical A), and mobile mote device(s) 2111a would therefore tend to move close to such a chemical concentration. By comparison, the mobile mote device(s) 2111b can be, for example, configured to be attracted to an area of a particular range of chemical concentration (e.g., 20%-21% of chemical A), and mobile mote device(s) 2111b would therefore tend to move close to such a chemical concentration such as in FIG. 23. The arrows (not numbered) of FIG. 22 illustrate the general motion of the mobile mote device(s) 2111a and 2111b that results in the positioning of the mobile mote devices. While the arrows depicting the motion of the mobile mote device(s) 2111a and 2111b are relatively straight in FIG. 22, it is to be understood that in certain embodiments the motion of the mobile mote device may be curvilinear, disjointed, or another configuration. Communication between certain mobile mote device(s) may assist particular mote devices in determining a suitable direction for at least certain mobile mote devices to travel. For instance, if one particular mobile mote device 2111 is experiencing a lower chemical concentration then desired, then it may communicate with other mote device(s) (mobile as well as non-mobile) that are sensing the desired chemical concentration (that may be indicated as a result of a query), then the mobile mote device may travel generally towards the queried mote device(s) 11.

The mobile mote device(s) 2111a and 2111b can be configured to sense, and thereupon tend to move towards their particular respective chemical concentrations such as in FIG. 23. Consider that source 2120 represents a source or location of chemical A. Consider that the mobile mote device(s) 2111a would tend to move using techniques as described herein until they locate a 10%-11% of chemical A region 2122, while mobile mote device(s) 2111b would tend to move until they locate a 20%-21% chemical A region 2124. The 10%-11% of chemical A region 2122 can thereupon be differentiated from the 20%-21% chemical A region 2124 upon viewing a difference in light, wavelength, color, etc produced by the respective mobile mote device(s) 2111a or 2111b within the respective regions 2122 and 2124. The outlines of the regions 2122 and 2124 are delineated according to the affecting presentation colors of the respective mobile mote device(s) 2111a and 2111b following the motion of the mobile mote device(s) as illustrated in FIG. 23.

While the embodiment of the mobile mote device(s) 2111 as described with respect to FIG. 22 are attracted to one or more particular ranges of chemical concentration to affect the presentation as described herein, it is to be understood that other embodiments of the mote device(s) can be attracted to one or more different parameters, such as locating the mobile mote devices at different locations depending upon varying chemical or biological concentrations, particular electromagnetic fields, particular light levels, or any other physical characteristic that is desired to be indicated by the mobile mote device(s) affecting the presentation, etc.

As such, certain embodiments of the mote device(s) 10, as well as the mobile mote device(s) 2111, can affect the presentation by physically combining multiple motes of a similar surface color or reflectivity into a pattern, not only by the techniques as described above such as generating light or light of a particular color, altering reflectance, etc. For instance, an area having a large concentration of mote device(s) 11 or mobile mote device(s) 2111 may appear to glow orange because that is the color the surface of the mote device(s) 11 or 2111 is colored. While the mobile mote device(s) 2111a and 2111b are not necessarily illustrated as being evenly spaced within their respective regions 2122 and 2124, it is envisioned that with a larger number of mobile mote device(s) such as could occur in many embodiments, the spacing of the mobile mote devices within their respective regions would become more statistically even, and could in many embodiments provide a discernible and realistic contour, as desired.

Figure 24:
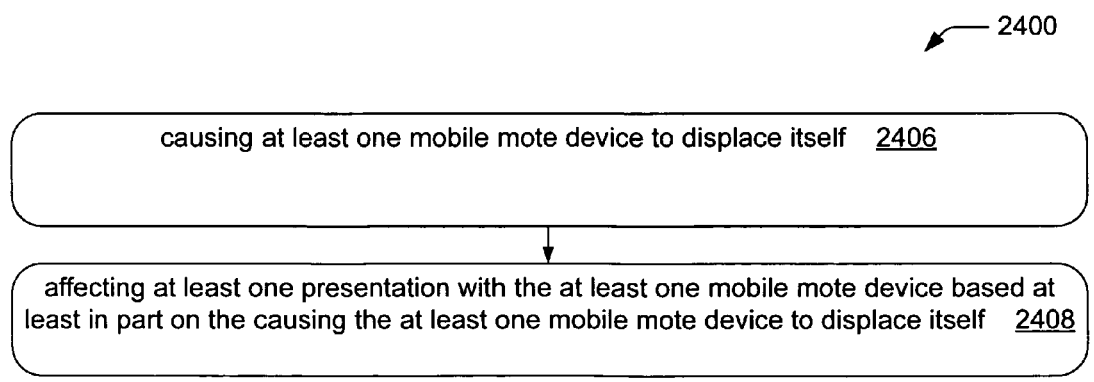
FIG. 24 shows a flowchart in which the mobile mote device(s) are affecting the presentation.

FIG. 24 shows a flowchart of one embodiment of the mobile mote device(s), as described with respect to FIGS. 21 to 23. One embodiment of a high-level flowchart of a processing and/or sharing technique 2400 is described with respect to FIG. 24 and includes, but is not limited to, operations 2406 and/or 2408. One embodiment of operation 2406 can include, but is not limited to, causing at least one mobile mote device to displace itself. One embodiment of operation 2408 can include, but is not limited to, affecting at least one presentation with the at least one mobile mote device based at least in part on the causing the at least one mobile mote device to displace itself. In one or more various aspects, related systems include but are not limited to circuitry and/or programming for effecting the herein-referenced method aspects; the circuitry and/or programming can be virtually any combination of hardware, software, electro-mechanical system, and/or firmware configurable to effect the herein-referenced method aspects depending upon the design choices of the system designer.

X. Scalability Aspects of Mote Devices

The various mote device(s) 11 as described in this disclosure are intended to be scalable. As such, the mote device(s) 11 can sense many or few parameters. The mote device(s) can actuate many or few other devices. Also, the mote device(s) can control or serve as many or few display elements for a display.

As a result of scalability, it is intended that the mote device (s) 11 as described with respect to FIG. 1 could be large or small. For instance, each mote device within a mote network could be a discrete component, that might utilize distinct power sources. Alternatively, each mote device 11 might be fabricated using integrated circuit technology, such as VLSI or ULSI. Considering that each mote device may be configured for a distinct activity (and there may be other mote devices within the mote network that are also configured for a similar activity), it is likely that a number of similarly-configured mote device(s) can be easily fabricated for the same purpose using the integrated circuit technology. As such, the components of the mote device(s) may be configured using hardware, firmware, or software techniques in a relatively easily configurable fashion. Allowing the mote device(s) to be readily and simply configured can greatly simplify fabrication of the mote device(s), and reduce the resultant expense.

Certain embodiments of the power source 25 as described with respect to FIG. 8 can be configured as an active device that provides power by itself (such as a battery or a power cell). Alternately, other embodiments of the power source 25 can be a passive source that relies on external power to "operate" the mote device 11. There can even be configurations of the mote device that can rely on a combination of active and passive power sources, such as a rechargeable battery. In certain embodiments, the dimension of the power source would limit the miniaturization of the mote device. It may be desired to use passive power sources for certain mote device applications to reduce the size of the mote device(s) 11.

Such miniaturization concepts that have been applied to microprocessor chip design can be applied to mote design, since certain mote device(s) 11 can be considered as operating in some aspects as a simplified integrated circuit. Utilizing repeatability of design, selecting appropriate power sources 25 for configuration and desired operation, and using existing integrated circuit techniques can be used by those skilled in the art to fabricate miniaturized mote device(s), particularly for those applications where intended.

XI. Conclusion

This disclosure provides a number of embodiments of the mote device(s). Different configurations of mote device(s) may be combined using networking techniques. The embodiments of the mote device(s) as described with respect to this disclosure are intended to be illustrative in nature, and are not limiting its scope.

Those having skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle can vary with the context in which the processes and/or systems and/or other technologies are deployed. For example, if an implementer determines that speed and accuracy are paramount, the implementer may opt for mainly a hardware and/or firmware vehicle; alternatively, if flexibility is paramount, the implementer may opt for mainly a software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle can be deployed and the specific concerns (e.g., speed, flexibility, or predictability) of the implementer, any of which may vary.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in standard integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies equally regardless of the particular type of signal bearing media used to actually carry out the distribution. Examples of a signal bearing media include, but are not limited to, the following: recordable type media such as floppy disks, hard disk drives, CD ROMs, digital tape, and computer memory; and transmission type media such as digital and analog communication links using TDM or IP based communication links (e.g., packet links).

All of the above U.S. patents, U.S. patent application publications, U.S. patent applications, foreign patents, foreign patent applications and non-patent publications referred to in this specification and/or listed in any Application Data Sheet, are incorporated herein by reference, in their entireties.

The herein described aspects depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", "operably linked", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

It is to be understood by those skilled in the art that, in general, that the terms used in the disclosure, including the drawings and the appended claims (and especially as used in the bodies of the appended claims), are generally intended as "open" terms. For example, the term "including" should be interpreted as "including but not limited to"; the term "having" should be interpreted as "having at least"; and the term "includes" should be interpreted as "includes, but is not limited to"; etc. In this disclosure and the appended claims, the terms "a", "the", and "at least one" located prior to one or more items are intended to apply inclusively to either one or a plurality of those items.

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that could have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that could have A alone, B alone, C alone, A and B together, A and C together, B and C together, and/or A, B, and C together, etc.).

Those skilled in the art will appreciate that the herein-described specific exemplary processes and/or devices and/or technologies are representative of more general processes and/or devices and/or technologies taught elsewhere herein, such as in the claims filed herewith and/or elsewhere in the present application.

Within this disclosure, elements that perform similar functions in a similar way in different embodiments may be provided with the same or similar numerical reference characters in the figures.

The invention claimed is:

1. A method, comprising:
    locating at least one position of at least one mote device, including locating the at least one position of the at least one mote device using a signal communicated to at least one other mote device;
    logging the located at least one position of the at least one mote device to form a log that includes a position of the at least one mote device, logging the located at least one position of the at least one mote device comprising:
        transferring a log creation agent, which is to log at least one position of the at least one mote device using the signal communicated to the at least one other mote device, to the at least one other mote device, the transferred log creation agent including instructions 1) to install at least a portion of the transferred log creation agent on the at least one other mote after the at least one other mote is deployed, and 2) to receive at least a part of the located position at the other mote; and
    affecting at least one presentation based at least in part on the logged located at least one position of the at least one mote device, including emitting a visual or an audio pattern using the at least one other mote device to guide movement of a person, an organism, a vehicle or an object in a direction or to a desired location.

2. The method of claim 1, wherein the locating at least one position of at least one mote device, including locating the at least one position of the at least one mote device using a signal communicated to at least one other mote device comprises:
    locating the at least one position of the at least one mote device with respect to at least one other device.

3. The method of claim 1, wherein the locating at least one position of at least one mote device, including locating the at least one position of the at least one mote device using a signal communicated to at least one other mote device comprises:
    locating the at least one position of the at least one mote device by communicating a first signal to at least one location-transferring mote device, and by providing a second signal from the at least one location-transferring mote device to the at least one other mote device.

4. The method of claim 1, wherein the locating at least one position of at least one mote device, including locating the at least one position of the at least one mote device using a signal communicated to at least one other mote device comprises:
    locating the at least one position of the at least one mote device with respect to at least one of a computer or a controller device.

5. The method of claim 1, wherein the locating at least one position of at least one mote device, including locating the at least one position of the at least one mote device using a signal communicated to at least one other mote device comprises:
    locating the at least one position of the at least one mote device with respect to at least one locating device.

6. The method of claim 1, wherein the locating at least one position of at least one mote device, including locating the at least one position of the at least one mote device using a signal communicated to at least one other mote device comprises:
    locating the at least one position of the at least one mote device with respect to at least one absolute spatial device.

7. The method of claim 1, wherein the locating at least one position of at least one mote device, including locating the at least one position of the at least one mote device using a signal communicated to at least one other mote device comprises:
    locating the at least one position of the at least one mote device with respect to at least one structure.

8. The method of claim 1, wherein the locating at least one position of at least one mote device, including locating the at least one position of the at least one mote device using a signal communicated to at least one other mote device comprises:
   locating the at least one position of the at least one mote device with respect to at least one landmark.

9. The method of claim 1, wherein the locating at least one position of at least one mote device, including locating the at least one position of the at least one mote device using a signal communicated to at least one other mote device comprises:
   locating an at least one absolute position of the at least one mote device.

10. The method of claim 1, wherein the locating at least one position of at least one mote device, including locating the at least one position of the at least one mote device using a signal communicated to at least one other mote device comprises:
   locating an at least one relative position of the at least one mote device.

11. The method of claim 1, wherein the affecting at least one presentation based at least in part on the logged located at least one position of the at least one mote device, including emitting a visual or an audio pattern, using including the at least one other mote device comprises:
   emitting a signal, using the multiple mote devices including the at least one mote device, in a human audio frequency detectable by a person, an organism, or an inanimate object, the signal being based at least in part on the at least one position of the at least one mote device.

12. The method of claim 1, wherein the affecting at least one presentation based at least in part on the logged located at least one position of the at least one mote device, including emitting a visual or an audio pattern using the at least one other mote device comprises:
   affecting the at least one presentation based at least in part on the logged located at least one position of the at least one mote device by changing a physical orientation or a physical arrangement of one or more of the multiple mote devices including the at least one other mote device.

13. The method of claim 1, wherein the affecting at least one presentation based at least in part on the logged located at least one position of the at least one mote device, including emitting a visual or an audio pattern using the at least one other mote device comprises:
   producing a temporally variable pattern using multiple ones of the multiple mote devices including the at least one mote device by changing a physical arrangement of one or more of the multiple mote devices including the at least one other mote device.

14. The method of claim 13, wherein the producing a temporally variable pattern using multiple ones of the multiple mote devices including the at least one mote device by changing a physical arrangement of one or more of the multiple mote devices including the at least one mote device comprises:
   forming at least a portion of the at least one presentation using the multiple ones of the multiple mote devices.

15. The method of claim 1, wherein the affecting at least one presentation based at least in part on the logged located at least one position of the at least one mote device, including emitting a visual or an audio pattern using the at least one other mote device comprises:
   sequencing multiple mote devices including the at least one other mote device.

16. The method of claim 15, wherein the sequencing multiple ones of the multiple mote devices including the at least one other mote device comprises:
   forming at least a portion of the at least one presentation using the sequenced multiple ones of the multiple mote devices that are emitting the visual or the audio pattern.

17. The method of claim 1, wherein the at least one other mote device includes a plurality of mote devices that have non-uniform distribution.

18. The method of claim 1, wherein the at least one other mote device includes a plurality of mote devices that have non-uniform operative capabilities.

19. The method of claim 1, wherein the at least one mote other device can determine their location with respect to a type of enumerated property or feature.

20. The method of claim 19, further comprising:
   locating the enumerated property or feature by the at least one other mote device.

21. The method of claim 1, wherein the at least one other mote device can determine their location with respect to a type of enumerated property or feature, wherein the at least one mote device is informed about the type of enumerated property or feature.

22. The method of claim 1, wherein the at least one mote other device can determine their location with respect to a type of enumerated property or feature, wherein the at least one mote device determines the type of enumerated property or feature.

23. The method of claim 1, wherein the affecting at least one presentation based at least in part on the logged located at least one position of the at least one mote device, includes emitting a visual or an audio pattern using multiple mote devices including the at least one mote device to guide movement of a person, an organism, a vehicle or an object in a direction or to a desired location comprises:
   emitting at least a portion of the visual or the audio pattern from the multiple mote devices including the at least one other mote device.

24. A method, comprising:
   determining at least one position of an item at least partially using at least one mote device;
   logging the determined at least one position of the item to form a log that includes a position of the item, logging the determined at least one position of the item comprising:
     transferring a log creation agent, which is to log at least one position of the item, to the at least mote device, the transferred log creation agent including instructions 1) to install at least a portion of the transferred log creation agent on the at least one mote device after the at least one mote device is deployed, and 2) to receive at least a part of the determined at least one position at the at least one mote device; and
   affecting at least one audio or visual presentation that indicates the at least one position of the item at least partially using the at least one mote device based at least in part on the logged determined at least one position of the item, including affecting a temporally variable audio signal or visual pattern that indicates the at least one position of the item, the audio signal or visual pattern emitted at least partially using the at least one mote device to guide movement of a person, an organism, a vehicle or an object in a direction or to a desired location.

25. The method of claim 24, wherein the determining at least one position of an item at least partially using at least one mote device comprises:
   determining the at least one position of some type of enumerated property or feature of the item at least partially using the at least one mote device.

26. The method of claim 24, wherein the determining at least one position of an item at least partially using at least one mote device comprises:
transmitting at least one transmitted position request signal from the at least one mote device; and
receiving the at least one position at the at least one mote device at least partially in response to the transmitting the at least one transmitted position request signal.

27. The method of claim 24, wherein the affecting at least one audio or visual presentation that indicates the at least one position comprises:
affecting a temporally static pattern of the at least one position of the item at least partially using the at least one mote device.

28. A method, comprising:
causing at least one mobile mote device to displace itself;
determining at least one position of an item at least partially using the at least one mobile mote device;
logging the determined at least one position of the item to form a log that includes the at least one position of the item, logging the determined at least one position of item comprising:
transferring a log creation agent, which is to log at least the determined at least one position of the item, to the at least one mote device, the transferred log creation agent including instructions 1) to install at least a portion of the transferred log creation agent on the at least one mote after the at least one mote is deployed, and 2) to receive at least a part of the determined position of the item; and
affecting at least one visual presentation with the at least one mobile mote device based at least in part on the logged at least one position of the item by causing the at least one mobile mote device to displace itself to guide movement of a person, an organism, or a vehicle in a direction or to a desired location.

29. An apparatus, comprising:
locating portion operable to locate at least one position of at least one mote device, including locating the at least one position of the at least one mote device using a signal communicated to at least one other mote device;
logging portion operable to locate at least one position of the at least one mote device to form a log that includes a position of the at least one mote device the logging portion operable to locate at least one position of the at least one mote device comprising:
a log creation agent, which is to log at least one position of the at least one mote device using the signal communicated to the at least one other mote device when transferred to the at least one other mote device, the transferred log creation agent including instructions 1) to install at least a portion of the transferred log creation agent on the at least one other mote after the at least one other mote is deployed, and 2) to receive at least a part of the located position at the other mote; and
presentation affecting portion operable to affect at least one audio presentation or visual presentation of the at least one other mote device, based at least in part on the logged located at least one position of the at least one mote device, to guide movement of a person, an organism, or a vehicle in a direction or to a desired location, wherein at least one of the locating portion or the presentation affecting portion is at least partially implemented using hardware.

30. An apparatus, comprising:
locating portion configurable to determine at least one position of an item at least partially using at least one mote device, including determining the at least one position of the item with a signal communicated between the at least one mote device and at least one other mote device;
logging portion operable to locate at least one position of the at least one mote device to form a log that includes the at least one position of the item, the logging portion operable to locate at least one position of the item device comprising:
a log creation agent, which is to log the at least one position of the item using the signal communicated between the at least one mote device and at least one other mote device when the log creation agent is transferred to the at least one other mote device, the transferred log creation agent including instructions 1) to install at least a portion of the transferred log creation agent on the at least one other mote after the at least one other mote is deployed, and 2) to receive at least a part of the located the at least one position of the item at the other mote; and
presentation affecting portion configurable to affect at least one presentation of the at least one position of the item at least partially in response to the logged the at least one position of the item to guide movement of a person, an organism, or a vehicle in a direction or to a desired location, wherein at least one of the locating portion or the presentation affecting portion is at least partially implemented by changing a physical orientation or a physical arrangement of one or more of the multiple mote devices including the at least one other mote device using hardware.

31. An apparatus, comprising:
a movable mote device configurable to displace itself;
the movable mote device configurable to determine at least one position of an item at least partially using the movable mote device, including determining the at least one position of the item;
the movable mote device configurable to log the determined at least one position of the item to form a log that includes the at least one position of the item, the movable mote device configurable to log the determined at least one position of item comprising:
a memory configurable to receive a transfer of a log creation agent, which is to log at least the determined at least one position of the item, to the movable mote device, the transferred log creation agent including instructions 1) to install at least a portion of the transferred log creation agent on the movable mote device after the movable mote device is deployed, and 2) to receive at least a part of the determined at least one position of the item; and
the movable mote device configurable to affect at least one visual presentation based on the logged the determined at least one position of the item, the movable mote device configurable to affect the at least one visual presentation emitted by the movable mote device as a result of the movable mote device displacing itself to guide movement of a person, an organism, a vehicle or an object in a direction or to a desired location, wherein the moveable mote device is at least partially implemented using hardware.

32. An apparatus, comprising:
locating means for locating at least one position of at least one mote device, including locating the at least one position of the at least one mote device using a signal communicated to at least one other mote device;

logging means for logging the located at least one position of the at least one mote device to form a log that includes a position of the at least one mote device, the logging means comprising:
- transferring means for transferring a log creation agent, which is to log at least one position of the at least one mote device using the signal communicated to the at least one other mote device, to the at least one other mote device, the transferred log creation agent including instructions 1) to install at least a portion of the transferred log creation agent on the at least one other mote device after the at least one other mote is deployed, and 2) to receive at least a part of the located position of the at least one mote device at the other mote device; and presentation affecting means for affecting at least one visual presentation based at least in part on the logged at least one position of the at least one mote device to guide movement of a person, an organism, a vehicle or an object in a direction or to a desired location, wherein at least one of the locating means or the presentation affecting means is at least partially implemented by changing a physical orientation or a physical arrangement of one or more of multiple mote devices including the at least one other mote device using mote connected hardware.

33. An apparatus, comprising:

locating means for locating at least one position of an item at least partially using at least one mote device;

logging means for logging the located at least one position of the item to form a log that includes a position of the item, the logging means comprising:
- transferring means for transferring a log creation agent, which is to log at least one position of the item, to the at least one mote device, the transferred log creation agent including instructions 1) to install at least a portion of the transferred log creation agent on the at least one mote device after the at least one mote is deployed, and 2) to receive at least a part of the located position of the item at the mote device; and presentation affecting means for affecting at least one audio or visual presentation that emits an indication of the at least one position of the item at least partially in response to the logging means logging the located position of the item, the presentation affecting means at least partially using the at least one mote device as part of the at least one audio or visual presentation to guide movement of a person, an organism, a vehicle or an object in a direction or to a desired location, wherein at least one of the locating means or the presentation affecting means is at least partially implemented using hardware.

* * * * *

UNITED STATES PATENT AND TRADEMARK OFFICE
CERTIFICATE OF CORRECTION

| | |
|---|---|
| PATENT NO. | : 8,306,638 B2 |
| APPLICATION NO. | : 11/291534 |
| DATED | : November 6, 2012 |
| INVENTOR(S) | : Edward K. Y. Jung et al. |

It is certified that error appears in the above-identified patent and that said Letters Patent is hereby corrected as shown below:

In the Specification

At Column 1, line 57:

Delete: "United States Application Not Yet Assigned" and insert: --United States Application No. 11/285,767--.

Signed and Sealed this
Thirteenth Day of August, 2013

Teresa Stanek Rea
*Acting Director of the United States Patent and Trademark Office*